United States Patent
Yoshida et al.

[11] Patent Number: 5,889,760
[45] Date of Patent: Mar. 30, 1999

[54] ATM SWITCHING SYSTEM CAPABLE OF EQUALLY DISTRIBUTING CALLS

[75] Inventors: Koichi Yoshida; Atsushi Tsukazoe; Hiroya Tomita, all of Fukuoka, Japan

[73] Assignee: Fujitsu Limited, Kanagawa, Japan

[21] Appl. No.: 680,685

[22] Filed: Jul. 17, 1996

[30] Foreign Application Priority Data

Oct. 30, 1995 [JP] Japan .................................. 7-282270

[51] Int. Cl.$^6$ .................................................. H04L 12/56
[52] U.S. Cl. ............................................ 370/230; 370/395
[58] Field of Search .................................. 370/231, 232, 370/230, 252, 431, 437, 395, 396, 397, 398, 399

[56] References Cited

U.S. PATENT DOCUMENTS

| | | | |
|---|---|---|---|
| 5,255,266 | 10/1993 | Watanabe et al. | 370/233 |
| 5,265,091 | 11/1993 | Van Landegem | 370/232 |
| 5,440,541 | 8/1995 | Iida et al. | 370/352 |
| 5,546,392 | 8/1996 | Boal et al. | 370/395 |
| 5,631,908 | 5/1997 | Saxe | 370/235 |
| 5,694,390 | 12/1997 | Yamato et al. | 370/230 |

Primary Examiner—Alpus H. Hsu
Attorney, Agent, or Firm—Helfgott & Karas, P C.

[57] ABSTRACT

In an ATM switching system, calls are equally distributed. The ATM switching system is arranged by a transmission path storing unit for storing therein a transmission path to which a first terminal is connected; a terminal storing unit for storing therein a plurality of second terminals which constitute a group and the representative of which group is predetermined; a communication time calculating unit for calculating communication time by subtracting a communication start time instant between the first terminal and the second terminals from a communication end time instant between the first terminal and the second terminal; a communication amount calculating unit for calculating a communication amount by multiplying the communication time calculated in the communication time calculating unit by a use bandwidth; and a communication amount accumulating unit for accumulating the communication amount calculated in the communication amount calculating unit with respect to each of the second terminals. In this ATM switching apparatus, such a second terminal the accumulated communication amount of which is the lowest among these second terminals is selected as a terminal for call receiving destination.

19 Claims, 63 Drawing Sheets

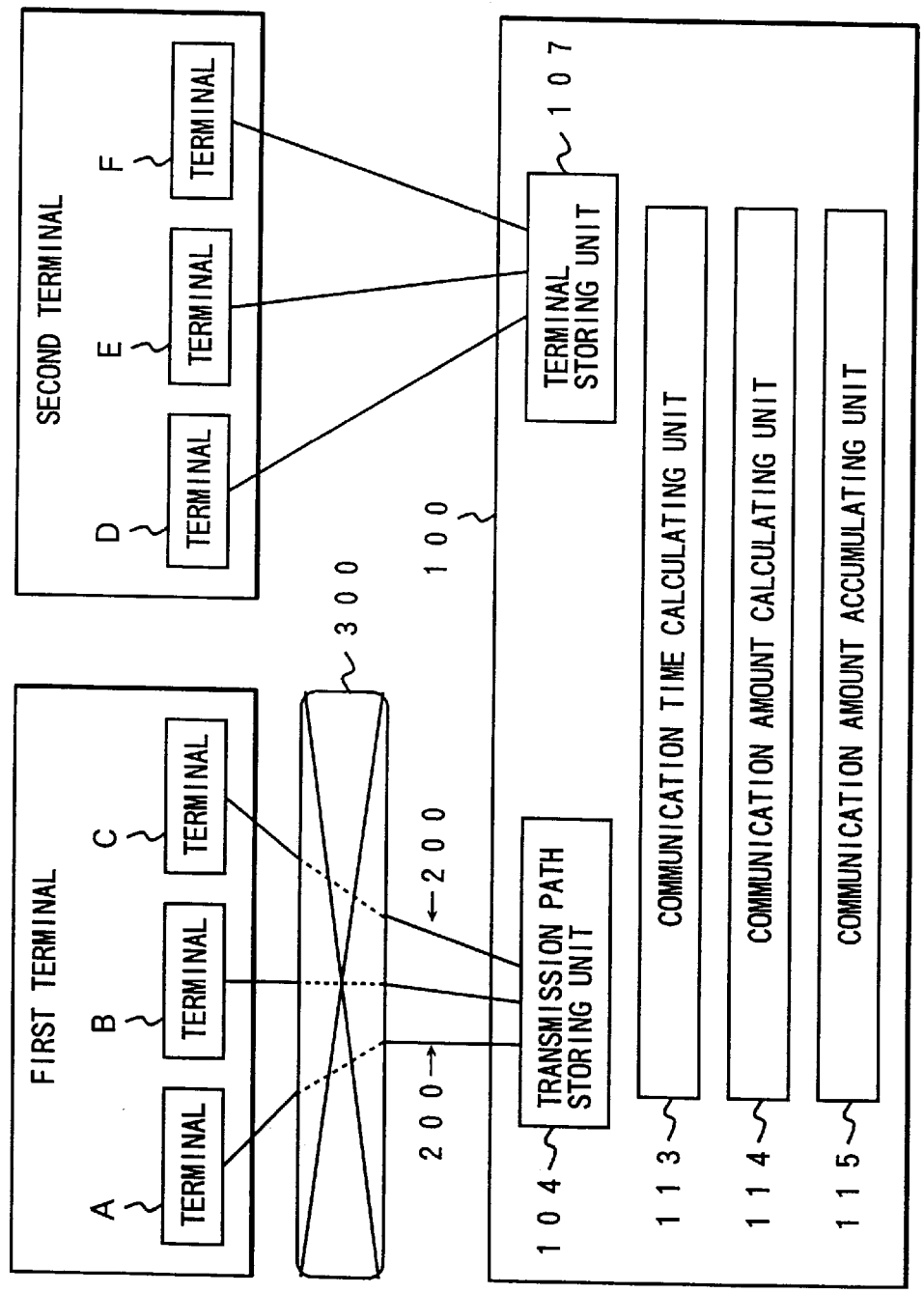

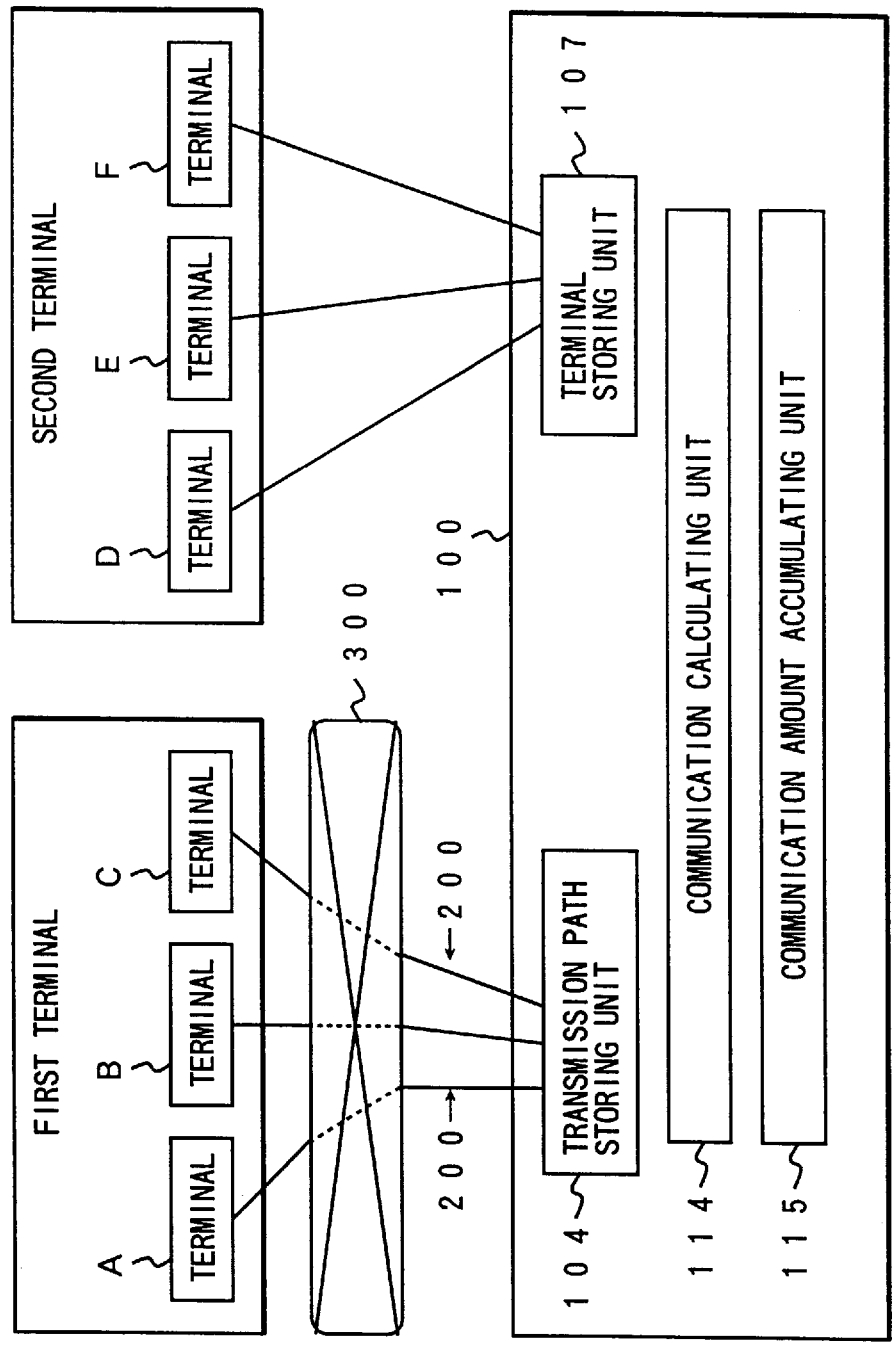

F I G. 1 4
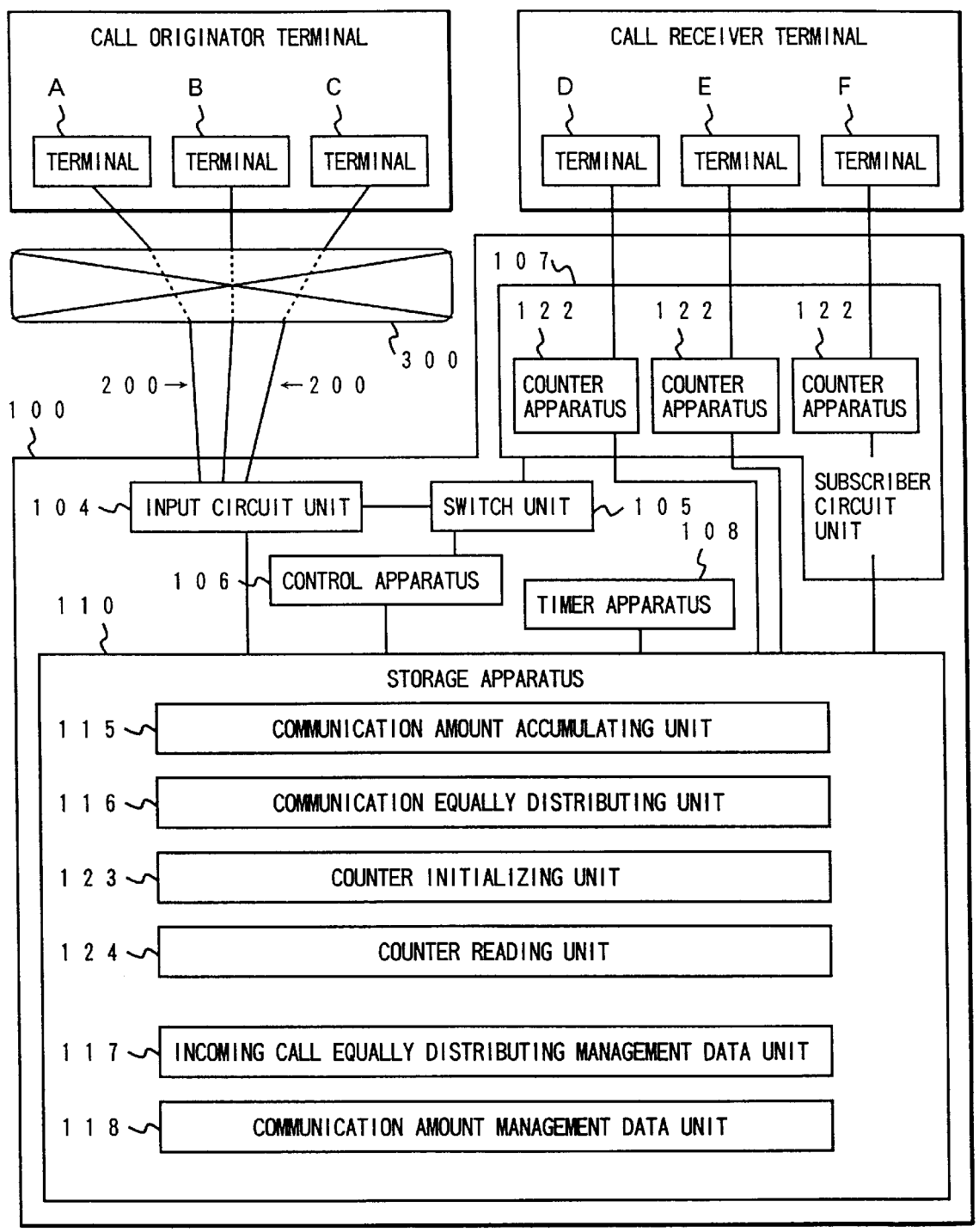

FIG. 31

| |
|---|
| HOUR |
| MINUTE |
| EXCLUSIVE USED BANDWIDTH FOR CALL RECEIVER TERMINAL D |
| EXCLUSIVE USED BANDWIDTH FOR CALL RECEIVER TERMINAL E |
| ⋮ |
| EXCLUSIVE USED BANDWIDTH FOR CALL RECEIVER TERMINAL X |
| |

FIG. 51

| |
|---|
| HOUR |
| MINUTE |
| MAXIMUM BANDWIDTH FOR FIRST INCOMING CALL GROUP |
| MAXIMUM BANDWIDTH FOR SECOND INCOMING CALL GROUP |
| ⋮ |
| MAXIMUM BANDWIDTH FOR N-TH INCOMING CALL GROUP |
| |

F I G. 6 1
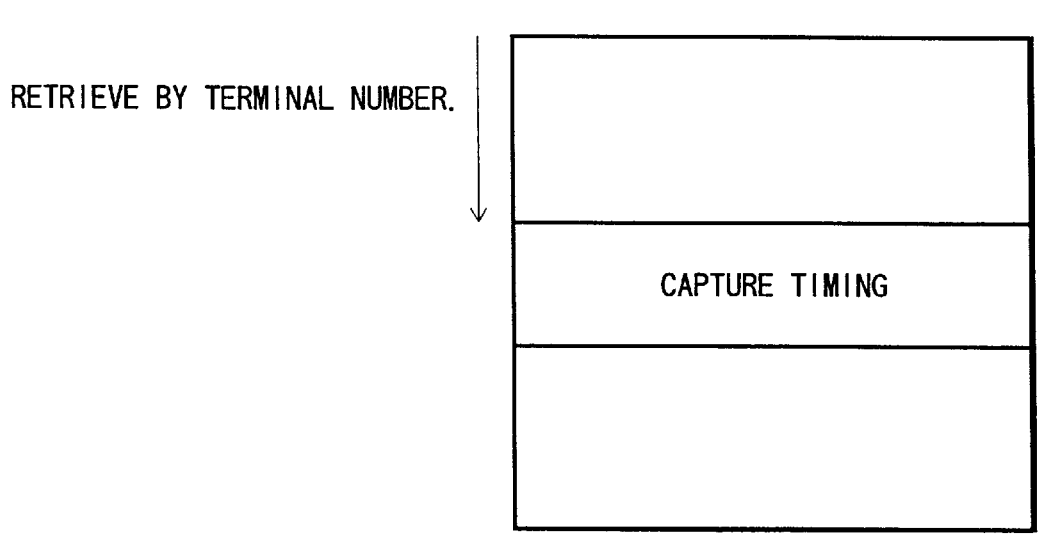

ATM SWITCHING SYSTEM CAPABLE OF EQUALLY DISTRIBUTING CALLS

BACKGROUND OF THE INVENTION

1. Field of the Invention

The present invention generally relates to an ATM (asynchronous transfer mode) switching system. More specifically, the present invention is directed to an ATM switching system capable of equally distributing calls so as to avoid call concentration.

2. Description of the Related Art

In an ATM switching system, when an incoming call (receiving) request is issued from a network, an incoming call receiving control is carried out so as to call a call receiving terminal only in the case that such a resource for satisfying a call reception request condition issued from this network can be secured. The call reception request condition contains, for instance, a band required to a call, and an identifier (ID) of a call receiving user.

The more the call receiving terminal which is requested to receive the call from the network is brought into busy condition, the larger the call loss rate would be increased. As a consequence, such a call loss rate lowering problem is solved by constituting a single group by employing a plurality of call receiving terminals, and further by executing the call receiving control to this single group in accordance with the below-mentioned method.

That is, in accordance with this method, when the incoming call request is issued to a representative call receiving terminal, a detection is made in the register sequence as to whether or not the call receiving terminal registered into this group is under busy state. Then, when such a call receiving terminal not under busy state is firstly detected, the incoming call receiving control is performed to this call receiving terminal. In other words, the incoming calls are distributed.

It should be understood that a "call loss rate" implies such a probability that since a counter party (call receiving destination) is under busy state, a call connection is refused.

On the other hand, in the above-described conventional incoming call control method, there is another problem that the incoming calls would be readily concentrated onto the incoming call receiving terminal the register sequence of which is low, and therefore, these incoming calls may not be equally distributed to other incoming call receiving terminals within the group.

To solve this problem, the quantity of incoming calls is counted with respect to each of the incoming call receiving terminals, and then these incoming calls are distributed in such a manner that the number of incoming calls for the respective terminals are equal to each other in the above-explained conventional incoming call control method.

However, even this solving manner would cause the below-mentioned problem. That is, there are incoming calls having short communication time, and incoming calls having long communication time. As a result, when the incoming call having a short or a long communication time is merely counted as one irrelevant to the actual communication time, there is such a problem that the incoming calls would be concentrated onto the incoming call terminal to which the call having long communication time has been distributed.

As a consequence, the Applicants could conclude that the above-described problem would be caused by such a condition that the incoming calls are not distributed while communication amounts become equal.

SUMMARY OF THE INVENTION

Therefore, a first object of the present invention is to provide such an ATM switching system capable of more equally distributing incoming calls, as compared with the conventional ATM switching system.

A second object of the present invention is to provide an ATM switching apparatus capable of more equally distributing these incoming calls, and also capable of not lowering a call loss rate, as compared with those of the conventional ATM switching system.

To achieve the above-described objects, the present invention may employ the following means:

To achieve the first object, a first ATM switching apparatus 100 employs such an arrangement as shown in a basic arrangement diagram of FIG. 1.

That is, the first ATM switching apparatus 100 is constructed by employing a transmission path storing unit 104, a terminal storing unit 107, a communication time calculating unit 113, a communication amount calculating unit 114, and a communication amount accumulating unit 115.

The transmission path storing unit 104 stores therein a transmission path to which a first terminal is connected.

The terminal storing unit 107 stores therein a plurality of second terminals which constitute a group and the representative of which group is predetermined.

The communication time calculating unit 113 calculates communication time by subtracting a communication start time instant between the first terminal and the second terminals from a communication end time instant between the first terminal and the second terminal.

The communication amount calculating unit 114 calculates a communication amount by multiplying the communication time calculated in the communication time calculating unit 113 by a use bandwidth.

The communication amount accumulating unit 115 accumulates the communication amount with respect to each of the second terminals.

In accordance with the first ATM switching system 100, since such a second terminal the accumulated communication amount of which is the lowest among the second terminals is selected as a terminal for call receiving destination based on the result accumulated in the communication amount accumulating unit 115, the incoming calls can be equally distributed.

The first ATM switching apparatus 100 may be arranged by the following second ATM switching apparatus 100.

That is, the second ATM switching apparatus 100 is further comprised of a holding time managing unit for managing such holding time during which the first terminal holds the communication in the first ATM switching apparatus 100. Then, the communication time calculating unit 113 subtracts the holding time, which is managed in the holding time managing unit, from the calculated communication time to thereby obtain time as new communication time.

To achieve the first object, a third ATM switching apparatus 100 employs an arrangement as shown in a basic arrangement diagram of FIG. 2.

That is, the third ATM switching system 100 is comprised of a transmission path storing unit 104, a terminal storing unit 107, a communication amount calculating unit 114, and a communication amount accumulating unit 115.

The transmission path storing unit 104 stores therein a transmission path to which a first terminal is connected.

The terminal storing unit 107 stores therein a plurality of second terminals which constitute a group and the representative of which group is predetermined.

The communication amount calculating unit 114 calculates a communication amount based upon a counted value of a quantity of an ATM call transmitted from the first terminal to the second terminal.

According to the third ATM switching system 100, since such a second terminal the accumulated communication amount of which is the lowest among the second terminals is selected as a terminal for call receiving destination based on the result accumulated in the communication amount accumulating unit 115, the incoming calls can be equally distributed.

The first ATM switching apparatus 100 may be arranged by the following fourth ATM switching apparatus 100.

That is, the fourth ATM switching apparatus 100 is accomplished as follows. In the first ATM switching system 100, in the case that all of the second terminals are operating under communication, the first terminal is brought into a queueing state, and only a voice line band is secured for the first terminal under queueing state, then, in the case that any one of the second terminals is operable for communication, a video line band is secured for the first terminal under queueing state.

The third ATM switching apparatus 100 may be arranged by the following fifth ATM switching apparatus 100.

That is, the fifth ATM switching apparatus 100 is accomplished as follows. In the third ATM switching system 100, in the case that all of the second terminals are operating under communication, the first terminal is brought into a queueing state, and only a voice line band is secured for the first terminal under queueing state, then, in the case that any one of the second terminals is operable for communication, a video line band is secured for the first terminal under queueing state.

The first ATM switching apparatus 100 may be arranged by the following sixth ATM switching apparatus 100.

That is, the sixth ATM switching apparatus 100 is accomplished by as follows. In the first ATM switching apparatus 100, the terminal storing unit 107 stores therein a third terminal which does not belong to the group constituted by the second terminals. Then, in such a case that a summation value of bandwidths used in the third terminal is subtracted from the bandwidth exclusively used to the group constituted by the second terminals, and then a subtraction result is smaller than, or equal to a preselected value, the call originating/receiving operations are restricted with respect to the first terminal, the second terminals, and the third terminal.

The sixth ATM switching apparatus 100 may be arranged by the following seventh ATM switching apparatus 100.

That is, the seventh ATM switching apparatus 100 is accomplished by that in the sixth ATM switching apparatus 100, the bandwidths exclusively secured to the group constituted by the second terminals are variably set in unit of day or time.

The sixth ATM switching apparatus 100 may be arranged by the following eighth ATM switching apparatus 100.

That is, the eighth ATM switching apparatus 100 is accomplished by that in the sixth ATM switching apparatus 100, an urgent communication identifier for indicating that an urgent communication is available is attached to any of the first terminals. Then the call originating/receiving operations are not restricted to the first terminal to which the urgent communication identifier is attached.

The eight ATM switching apparatus 100 may be arranged by the following ninth ATM switching apparatus 100.

That is, the ninth ATM switching apparatus 100 is accomplished by that in the ATM switching apparatus 100, the urgent communication identifier is variably attached to the first terminal in unit of day or time.

The fourth ATM switching apparatus 100 may be arranged by the following tenth ATM switching apparatus 100.

That is, the tenth ATM switching apparatus 100 is accomplished by that in the either the fourth or the fifth ATM switching apparatus 100, in such a case that the summation value of the bandwidth secured to the first terminal under queueing state is larger than, or equal to a predetermined value, the call originating operation from the first terminal is cut off.

The tenth ATM switching apparatus 100 may be arranged by the following eleventh ATM switching apparatus 100.

That is, the eleventh ATM switching apparatus 100 is accomplished by that in the tenth ATM switching apparatus 100, the predetermined value is variably attached to the first terminal in unit of day or time.

The fourth or fifth ATM switching apparatus 100 may be arranged by the following twelfth ATM switching apparatus 100.

That is, the twelfth ATM switching apparatus 100 is accomplished by that in the fourth or fifth ATM switching apparatus 100, in such a case that the summation value of the bandwidth secured to the first terminal under queueing state is larger than, or equal to a predetermined value, the call originating operation from the first terminal is once cut off, whereas when the summation value becomes equal to or less than a constant value, the first terminal the call originating operation of which has been cut off is called so as to be brought into the queueing state.

The first ATM switching apparatus 100 may be arranged by the following thirteenth ATM switching apparatus 100.

That is, the thirteenth ATM switching apparatus 100 is accomplished by that in the first ATM switching apparatus 100, no call receiving operation is carried out for a given time with respect to the second terminal which is selected as a call receiving destination.

The fourth or fifth ATM switching apparatus 100 may be arranged by the following fourteenth ATM switching apparatus 100.

That is, the fourteenth ATM switching apparatus 100 is accomplished by that in the fourth or fifth ATM switching apparatus 100, a sequential order to release the queueing state is determined based upon the communication amount for each of the first terminals with respect to the plurality of first terminals under queueing state.

The first ATM switching apparatus 100 may be arranged by the following fifteenth ATM switching apparatus 100.

That is, the fifteenth ATM switching apparatus 100 is accomplished by that in the first ATM switching apparatus 100, this ATM switching system is further comprised of a communication amount clear unit for clearing the communication amount accumulated in the communication amount accumulating unit.

The first ATM switching apparatus 100 may be arranged by the following sixteenth ATM switching apparatus 100.

That is, the sixteenth ATM switching apparatus 100 is accomplished by that in the first ATM switching apparatus 100, exclusively used identifiers are attached to the first terminals. The communication amount calculating unit manages such an identifier used to calculate the communication amount and also utilizes the identifier to thereby judge as to whether or not the first terminal operated under communication corresponds to such a terminal the communication amount of which is to be calculated; and when the communication amount calculating unit judges that the first terminal operated under communication corresponds to such a terminal the communication amount of which is to be calculated, the communication amount calculating unit calculates the communication amount.

The first ATM switching apparatus 100 may be arranged by the following seventeenth ATM switching apparatus 100.

That is, the seventeenth ATM switching apparatus 100 is accomplished by that in the first ATM switching apparatus 100, this ATM switching system is further comprised of an incoming call terminal capture control unit for restricting the call reception to the second terminal which has requested the call receiving operation restriction when the call receiving operation restriction is issued from the second terminal.

BRIEF DESCRIPTION OF THE DRAWINGS

For a better understanding of various preferred embodiments of the present invention, reference is made of a detailed description to be read in conjunction with the accompanying drawings, in which FIG. 1 is a diagram for schematically showing a basic structure, corresponding to a first ATM switching system;

FIG. 2 is a diagram for schematically showing a basic structure, corresponding to a third ATM switching system;

FIG. 14 is a structural diagram according to a third embodiment mode,

FIG. 31 is a data structural diagram for a time range incoming call equally distributing call exclusive band data unit of the eighth embodiment;

FIG. 51 is a data structural diagram for a time range queuing maximum band data unit of the fourteenth embodiment;

FIG. 61 is a data structural diagram for a capture timing management data unit of the seventeenth embodiment;

DETAILED DESCRIPTION OF THE PREFERRED EMBODIMENT

Referring now to drawings various embodiment modes of the present invention will be described.
EMBODIMENT 1
(ARRANGEMENT OF FIRST EMBODIMENT)

Figure 3:
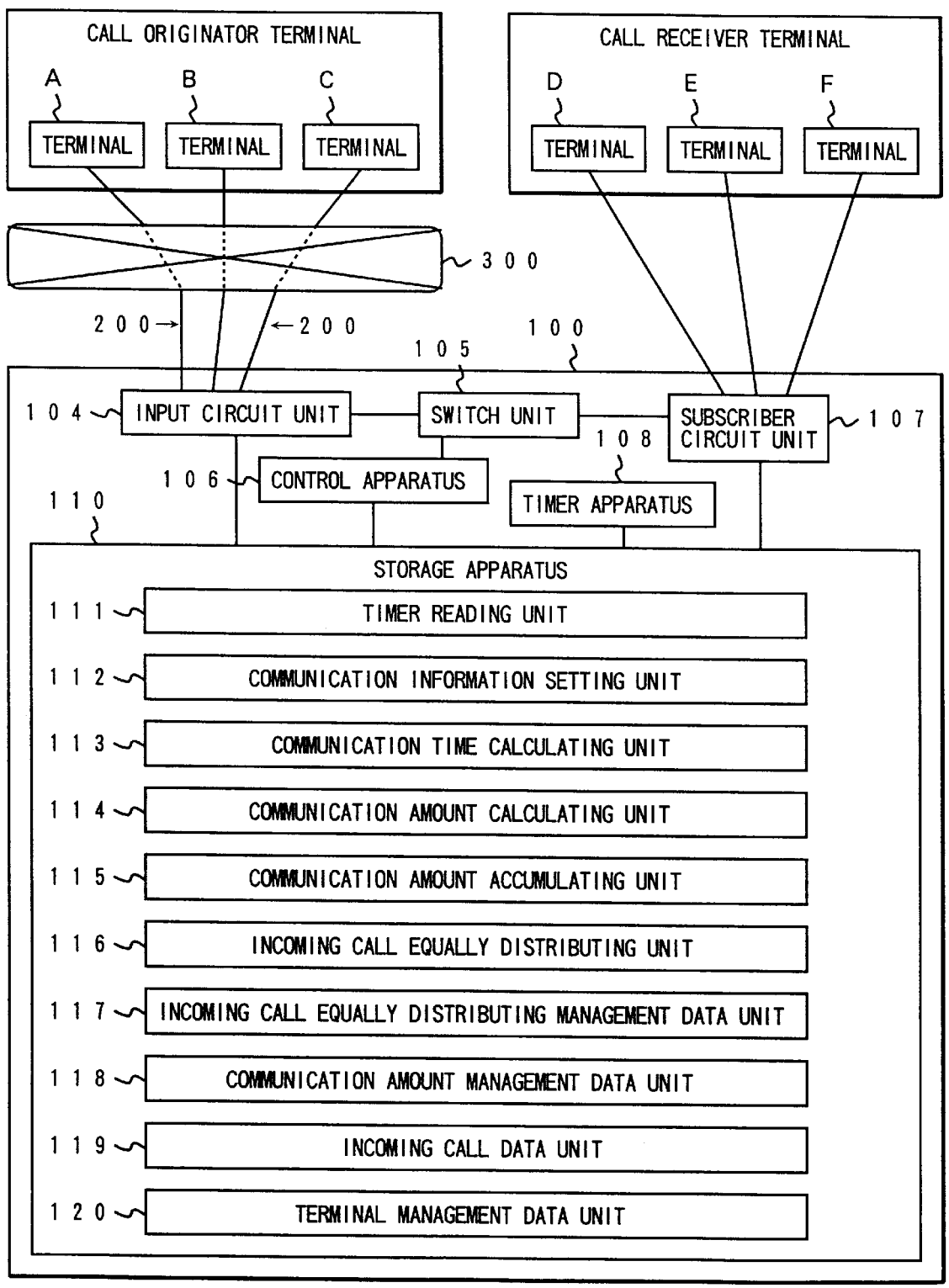
FIG. 3 is a structural diagram according to a first embodiment mode.

FIG. 3 is a structural diagram for showing an ATM (asynchronous transfer mode) switching system according to a first embodiment mode of the present invention. As indicated in FIG. 3, the ATM switching system of this first embodiment is arranged by an ATM switching apparatus 100, a transmission path 200 connected to the ATM switching apparatus 100, a network 300 connected to the transmission path 200, three terminals "A" to "C" connected to the network 300, and further three terminals "D" to "F" directly connected to the ATM switching apparatus 100.
(TERMINALS "A" to "F")

The terminals "A" to "C" include display units (not shown) and transmit calls. These terminals A to C may function as, for instance, television (TV) conference terminals, TV conference units and so on. Then, these terminals A through C will now be referred to as a "call originator terminal". It should be noted that the number of call originator terminals is not limited to 3, but may be selected to be an arbitrary quantity.

Terminals "D" to "F" own display units (not shown either). Then, these terminals D to F receive the calls originated from the terminals A to C. The terminals D to F may function as, for example, TV conference terminals, TV conference units and so on, Then, these terminals will now be referred to as "call receiver terminals". It should be understood that the number of call receiver terminals are not limited to three, but may be arbitrarily determined. A group (for instance, terminal D and terminal E) in provided with the call receiver terminal. Those groups will be called as a "incoming call groups", and a terminal functioning as a representative among the incoming call groups will be called as a "representative call receiver terminal". Furthermore, the terminal belonging to the incoming call group will be referred to a incoming call group terminal.

Numbers attached to the respective terminals A to F in order to identify them will be called as "terminal numbers", or "terminal IDs". In particular, the terminal number attached to the call originator terminal will be referred to as a "call originator terminal ID", and the terminal number attached to the call receiver terminal will be referred to as a call originator terminal ID. Moreover, the terminal number given to the representative call receiver terminal will be referred to as a "representative call receiver terminal ID".
(ATM SWITCHING APPARATUS 100)

The ATM switching apparatus 100 is arranged by employing an input circuit unit 104 connected to the transmission path 200, a switch unit 105 connected to the input circuit unit 104, and a subscriber circuit unit 107 connected to the switch unit 105. This ATM switching apparatus 100 is further constructed of a control apparatus 106 connected to the switch unit 105, a storage apparatus 110 connected to the control apparatus 106, and also a timer apparatus 108 connected to the storage apparatus 110.

A description will now be made of functions of various units in the ATM switching apparatus 100.

The input circuit unit 104 contains the transmission path 200 to which the call originator terminal is connected. The subscriber circuit unit 107 contains the call receiver terminal.

The switch unit 105 switches the lines to connect the call originator terminal with the call receiver terminal. With this terminal connection, information and a signal can be transmitted between the call originator terminal and the call receiver terminal.

The control apparatus 106 controls the entire system of the ATM switching apparatus 100. The control apparatus 106 is realized by utilizing a central processing unit (CPU).

The timer apparatus 108 outputs time information.

The storage apparatus 110 stores therein a timer reading unit 111, a communication information setting unit 112, a communication time calculating unit 113, a communication amount calculating unit 114, a communication amount accumulating unit 115, and an incoming call equally distributing unit 116, which are realized as a program. This storage apparatus 110 further stores therein an incoming call equally distributing management data unit 117, a communication management data unit 118, an incoming call data unit 119, and a terminal management data unit 120, which are realized as data.

The timer reading unit 111 reads the present time from the timer apparatus 108.

Figure 7:
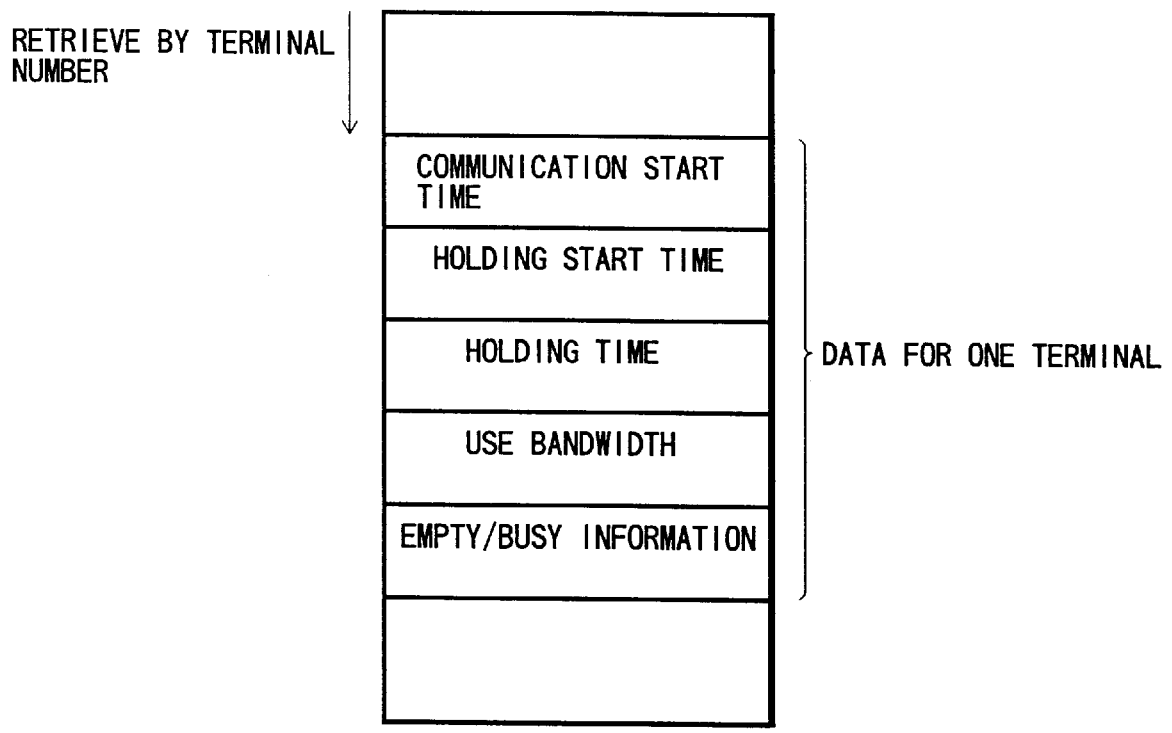
FIG. 7 is a data structural diagram for a terminal management data unit of the first embodiment.

The communication information setting unit 112 acquires the time read by the time reading unit 111 as a communication start time instant when the call originator terminal starts to communicate with the call receiver terminal. Then, both the communication start time instant and the use bandwidth are set to the terminal management data unit 120. FIG. 7 represents a data structure of the terminal management data unit 120. As shown in this drawing, the terminal management data unit 120 sets therein the communication start time instant, the holding (pause) start time instant, the holding time, the use bandwidth, and also terminal empty/busy information with respect to each of the call receiver terminals. The information set in the terminal management data unit 120 is retrieved by using the terminal number as an index.

The communication time calculating unit 113 acquires a time read by the timer reading unit 111 as a communication end time instant when the call originator terminal accomplishes the communication with the call receiver terminal. Then, the communication time calculating unit 113 subtracts the communication start time instant read by the terminal management data unit 120 from this acquired communication end time instant to obtain the communication time between the call originator terminal and the call receiver terminal.

The communication amount calculating unit 114 multiplies the communication time calculated by the communication time calculating unit 113 by the use bandwidth read out from the terminal management data unit 120 to obtain a communication amount between the call originator terminal and the call receiver terminal.

The communication amount accumulating unit 115 performs the below-mentioned process operations 1) to 3).

1) The communication amount of the corresponding call receiver terminal is read out from the terminal is read out from the communication amount management data unit 118.

2) The communication amount calculated in the communication amount calculating unit 114 is added to the communication amount of the call receiver terminal read in the item 1), so that the communication amounts of every call receiver terminals are accumulated.

3) The accumulated result is written into the communication amount management data unit 118.

Figure 5:
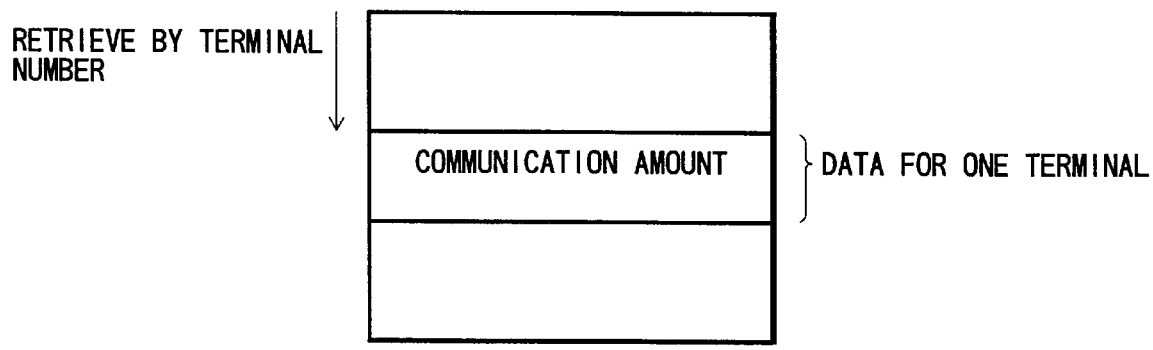
FIG. 5 is a data structural diagram for a communication amount management data unit of the first embodiment.

FIG. 5 indicates a data structure of the communication amount management data unit 118. As indicated in FIG. 5, the communication amounts for the respective terminals are set to the communication amount management data unit 118. The information sets to the communication amount management data unit 118 is retrieved by the terminal number as the index.

When a call is requested to be entered into the representative call receiver terminal, the incoming call equally distributing unit 116 reads out the communication amounts of the respective incoming call group terminals from the communication amount management data unit 118. then, such an incoming call terminal having the lowest communication amount is called as a call destination.

Figure 6:
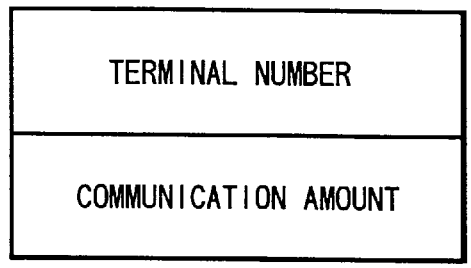
FIG. 6 is a data structural diagram for an incoming call data unit of the first embodiment.

It should be noted that the communication amounts of the respective incoming call group terminals are set to the incoming call data unit 119. FIG. 6 represents a data structure of the incoming call data unit 119. As shown in this drawing, both the terminal number and the communication amount of the terminal to which this terminal number is attached are set to the incoming call data unit 119.

Figure 4:
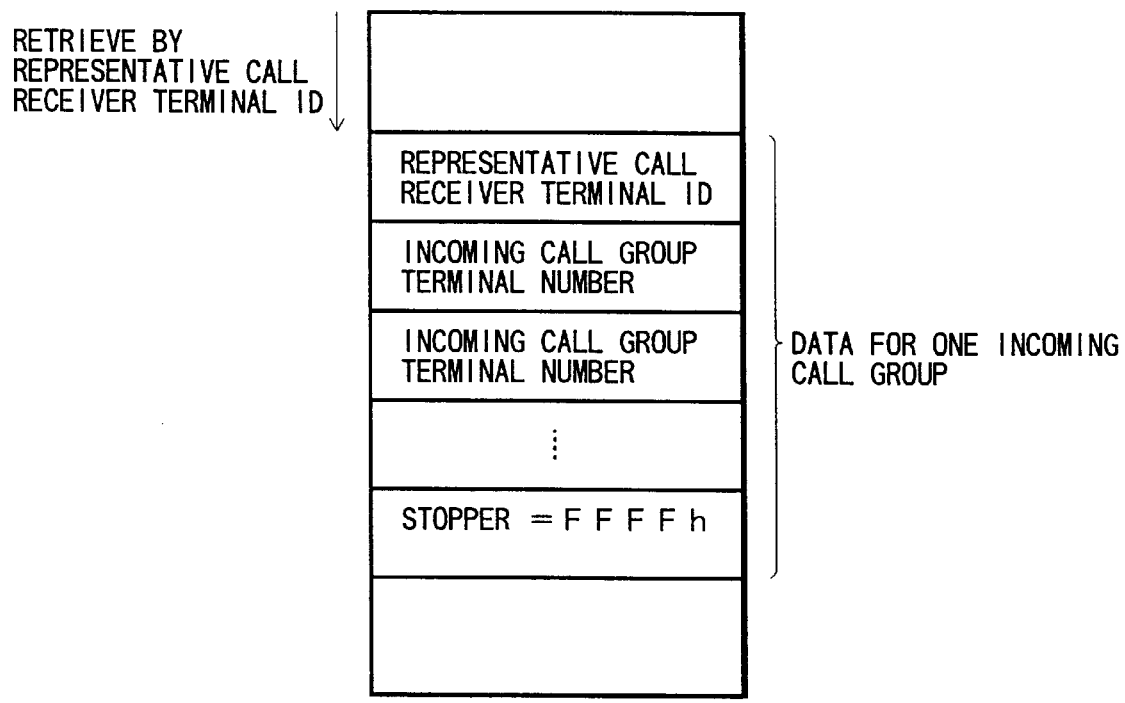
FIG. 4 is a data structural diagram for the incoming call equally distributing management data unit of the first embodiment.

Also, it is possible to retrieve the number of terminal belonging to the incoming call group (incoming call group terminal number) from the incoming call equally distributing management data unit 117. FIG. 4 indicates a data structural diagram of the incoming call equally distributing management data unit 117. As shown in this drawing, the representative call receiver terminal ID, a plurality of incoming call group terminal numbers, and "FFFFh" functioning as a stopper value indicative of an end of a retrieve position are set every one incoming call group to the incoming call equally distributing management data unit 117. Symbol "h" denotes a hexadecimal number.

It should be noted that the storage apparatus 110 may be realized by utilizing a magnetic disk storage apparatus, a RAM, a semiconductor memory device, a magnetic tape apparatus, an M/O (magnet optical disk) apparatus, and an IC card.

(OPERATIONS OF FIRST EMBODIMENT)

Subsequently, a description will now be made of operations to determine the call receiver terminal, operations to calculate the communication amount, and the overall operation, executed in the ATM switching system according to the first embodiment.

Figure 8:
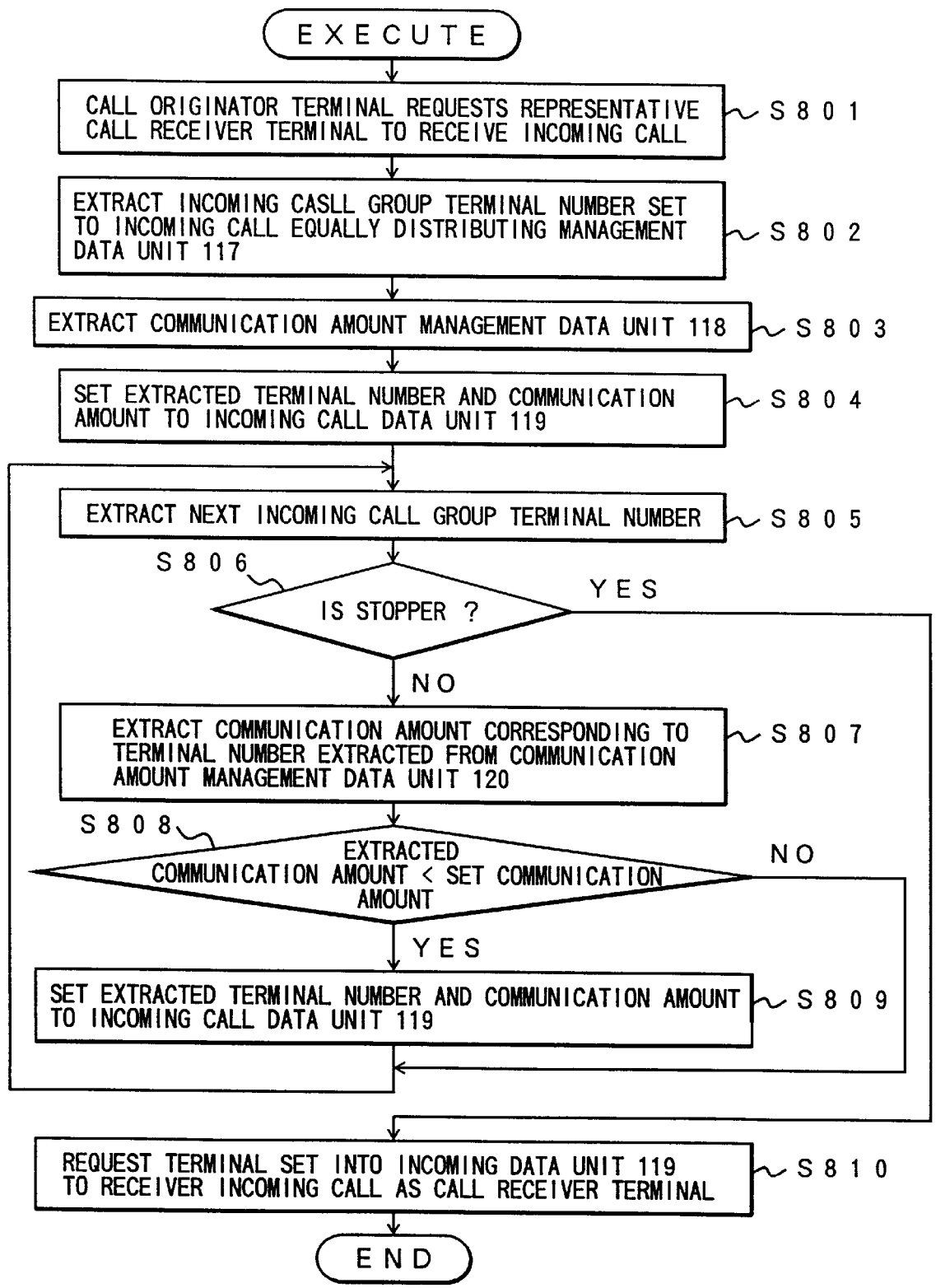
FIG. 8 is a flow chart for indicating operation to determine the incoming call terminal executed in the first embodiment.

FIG. 8 is a flow chart for representing the call receiver terminal determining operations. It should be understood that an expression "to extract" owns a similar meaning to another expression "to read" in the below-mentioned descriptions.

First, it is now assumed that an incoming call request is issued from the call originator terminal to the representative call receiver terminal set to the incoming call equally distributing management data unit 117 (step 801).

Next, the representative call receiver terminal is retrieved by using the representative call receiver terminal ID as the index. When the retrieving operation is accomplished, the incoming call giving terminal number set at the head portion is extracted (step 802).

Then, a communication amount corresponding to the extracted terminal number is extracted from the communication amount management data unit 118 (step 803).

Next, both the terminal number extracted at the step 802 and the communication amount extracted at the step 802, are set to the incoming call data unit 119 (step 804).

Thereafter, the next incoming call group terminal number which has been set to the incoming call equally distributing management data unit 117 is extracted (step 805).

In this case, a judgment is done as to whether or not the incoming call group terminal number extracted at the step 805 corresponds to the stopper (step 806).

When it is so judged "NO" (namely, being not stopper) at the step 806, a communication amount corresponding to the terminal number extracted from the communication amount management data unit 120 (step 807).

Then, another judgment is done as to whether or not the communication amount extracted at the step 807 is smaller than the communication amount set to the incoming call data unit 119 (step 808).

When it is so judged "YES" at the step 808, both the terminal number extracted at the step 805 and the communication amount extracted at the step 807 are set to the incoming call data unit 119 (step 809), and then the process operation is returned to the previous step 805.

In such a case that it is so judged "NO" at the step 808, the process operation is returned to the step 805.

When it is so judged "YES" (namely, being the stopper) at the step 806, the terminal set to the incoming call data unit 119 is used as the call receiver terminal so as to issue the incoming call request (step 810)

Figure 9:
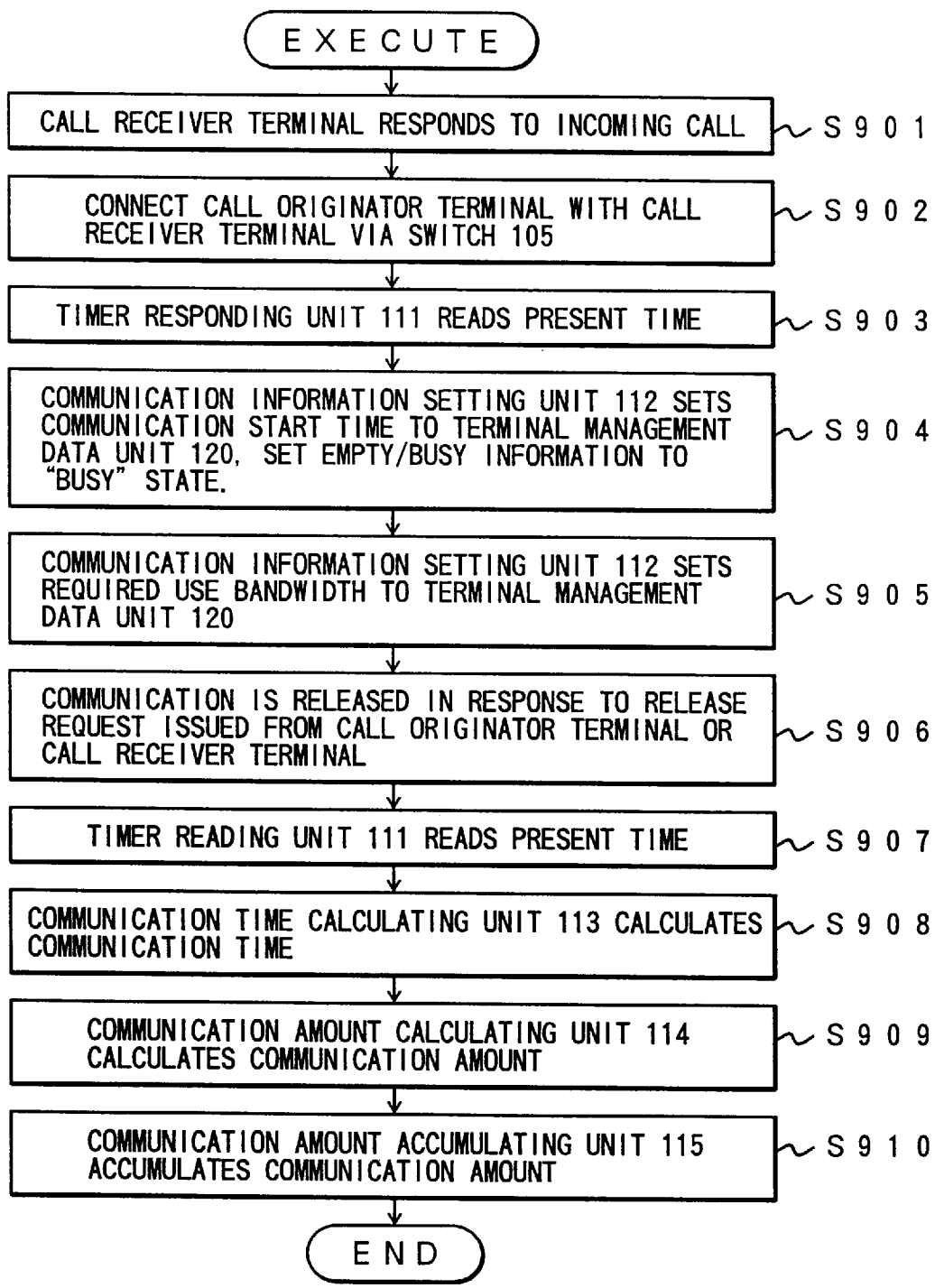
FIG. 9 is a flow chart for indicating operation to calculate a communication amount executed in the first embodiment.

FIG. 9 is a flow chart for indicating operating to calculate the communication amount.

First, it is assumed that the call receiver terminal responds to the incoming call (step 901).

Then, the call originator terminal is connected with the call receiver terminal via the switch unit 105 (step 902).

Next, the timer reading unit 111 reads the present time from the timer apparatus 108 (step 903), Thereafter, the communication information setting unit sets the time read at the step 903 as the communication start time instant to the terminal management data unit 120 with respect to each of the call receiver terminals. Also, the communication information setting unit sets the terminal empty/busy information of the terminal management data unit 120 as "busy information" (step 904).

Next, the communication information setting unit 112 sets the use bandwidth required from the call originator terminal to the terminal management data unit 120 (step 905).

Then, the communication is released in response to the release request issued from either the call originator terminal or the call receiver terminal (step 906).

Next, the timer reading unit 111 reads the present time from the timer apparatus 108 (step 907).

Thereafter, the communication time calculating unit 113 extracts the communication start time instant of the call receiver terminal which has made the communication so far from the terminal management data unit 120, and then subtracts this communication start time instant from the present time read at the step 907 to thereby calculate the communication time (step 908).

Next, the communication amount calculating unit 114 calculates the communication amount by multiplying the communication time calculated at the step 908 by the use bandwidth (step 909).

Thereafter, the communication amount accumulating unit 115 adds the communication amount calculated at the step 909 to the communication amount management data unit 120 corresponding to the call receiver terminal (step 910).

The overall operation will now be described.

Figure 10:
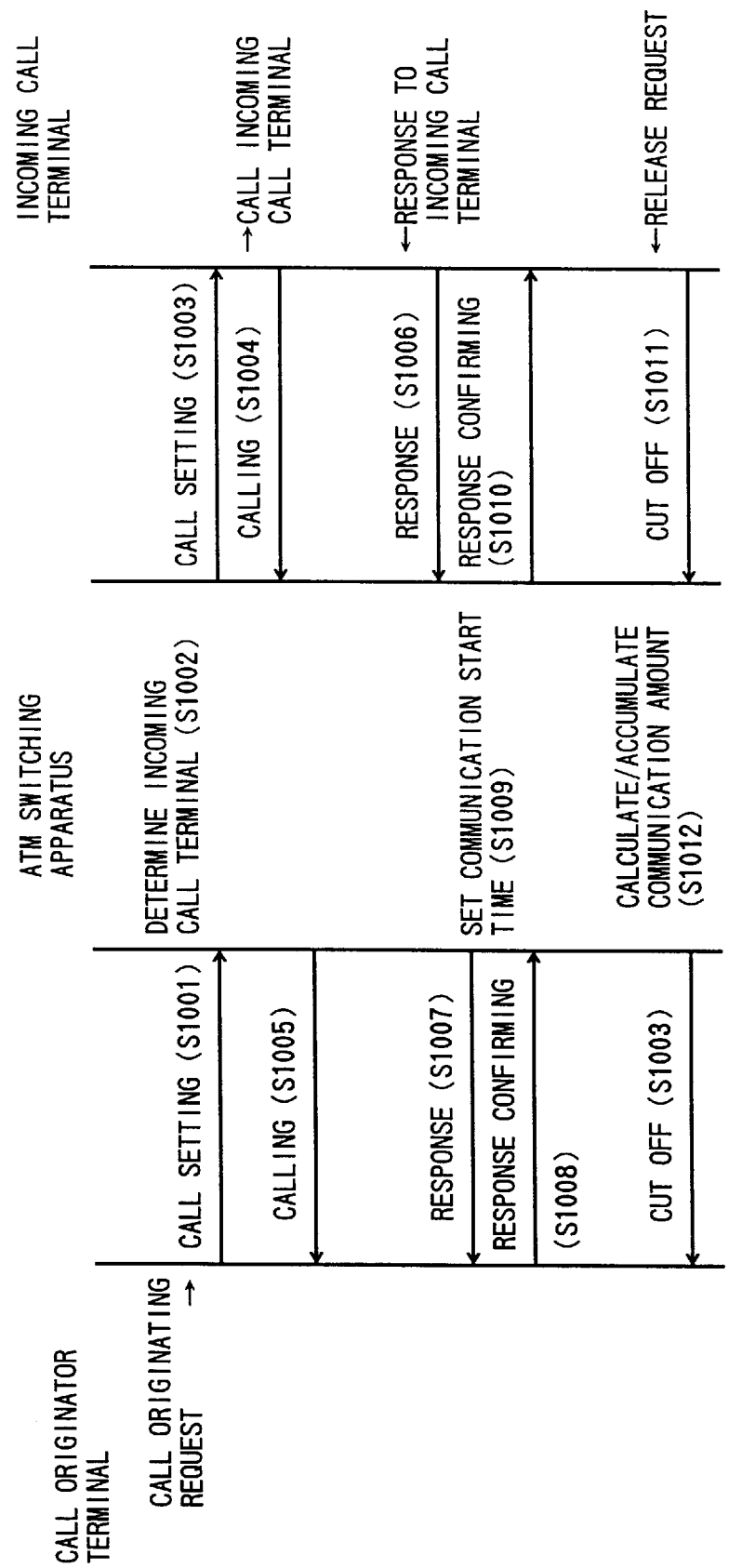
FIG. 10 shows a sequence diagram of the first embodiment.

FIG. 10 is a sequence diagram for representing the overall operation of the ATM switching system according to the first embodiment.

First, the call originator terminal transmits a "call setting" message indicative of a commencement of a call setting operation to the ATM switching apparatus 100 (step 1001).

When the "call setting" message is transmitted from the call originator terminal, the ATM switching apparatus 100 determines the call receiver terminal based upon the communication amount (step 1002), and further transmits the "call setting" message to the call receiver terminal (step 1003).

At this time, the call receiver terminal transmits a "calling" message indicative of a commencement of a calling operation to the ATM switching apparatus 100 (step 1004).

The ATM switching apparatus 100 transmits the "calling" message to the call originator terminal (step 1005).

Next, the call receiver terminal transmits a "response" message indicative of a call reception to the ATM switching apparatus 100 (step 1006), The ATM switching apparatus 100 transmits the "response" message to the call originator terminal (step 1007).

Subsequently, the call originator terminal transmits a "response confirming" message for indicating that the "response" message is accepted to the ATM switching apparatus 100 (step 1008).

The ATM switching apparatus 100 sets the communication start time instant when the communication is started (step 1009), and further transmits the "response confirming" message to the call receiver terminal (step 1010).

In this case, the call receiver terminal transmits a "cut off" message for indicating a request to cut off a call to the ATM switching apparatus 100 (step 1011).

The ATM switching apparatus 100 calculates the communication amount when the communication is ended, and also accumulates the communication amount (step 1012). Also, the ATM switching apparatus 100 transmits the "cut off" message to the call originator terminal (step 1011).

It should be understood that the "cut off" message may be transmitted from the call originator terminal to the ATM switching apparatus 100.

EMBODIMENT 2

(ARRANGEMENT OF SECOND EMBODIMENT)

Figure 11:
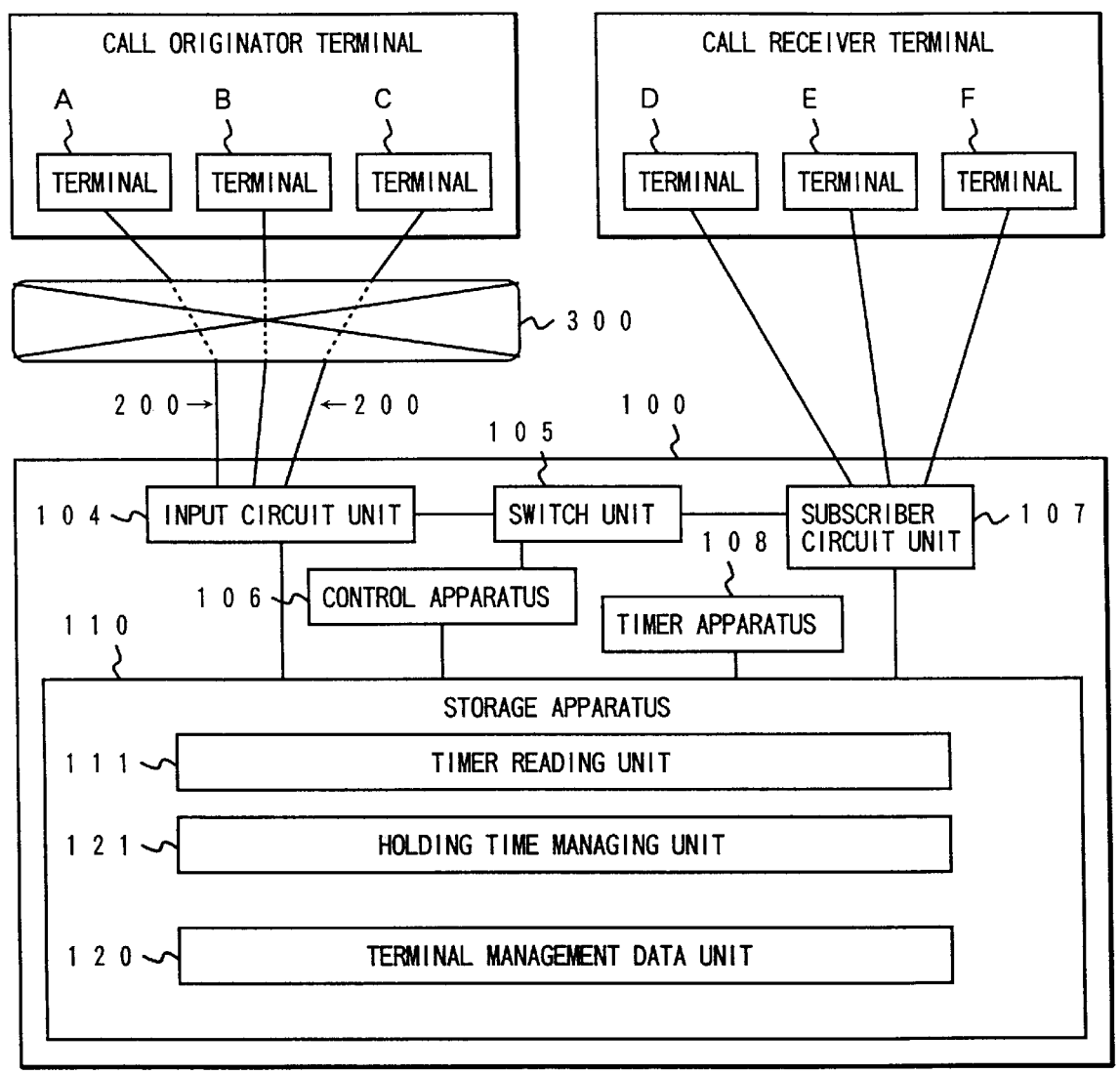
FIG. 11 is a structural diagram according to a second embodiment mode.

An ATM switching system according to a second embodiment is arranged by adding functions to those of the first embodiment. FIG. 11 is a diagram for showing an arrangement of the second embodiment. It should be noted that although the constructive elements of the first embodiment are partially omitted in this drawing, the functions thereof are provided. Also, the same reference numerals employed in the first embodiment are used to denote the same or similar constructive elements in this embodiment.

In the ATM switching apparatus 100 of FIG. 11, the storage apparatus 110 stores therein the timer reading unit 111 and a holding (pause) time managing unit 121, which are realized as a program, and also the terminal management data unit 120 which is realized as data.

The holding time managing unit 121 executes the following items 1) to 4). 1) When the call originator terminal is held, a holding start time instant is set to the terminal management data unit 120 when the holding operation is commenced. 2) In response to the holding operation, the holding time is calculated by subtracting the holding start time instant set to the terminal management data unit 120 from the response time. 3) The calculated holding time is set to the terminal management data unit 120. 4) When the communication is ended, the holding time is subtracted from the communication time.

(OPERATIONS BY SECOND EMBODIMENT)

Operations performed in the ATM switching system of the second embodiment will now be described.

Figure 12:
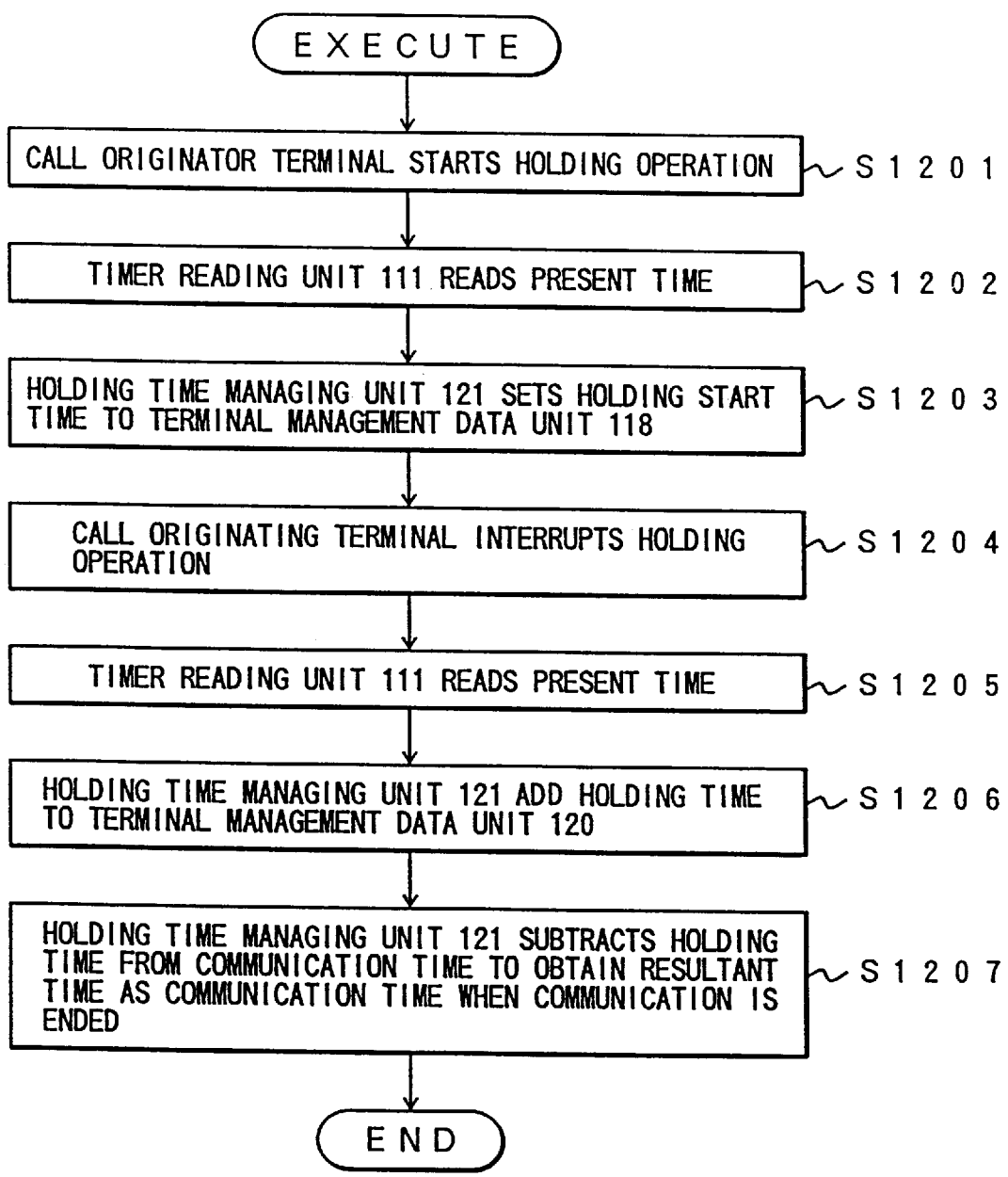
FIG. 12 is a flow chart for representing operations performed in the second embodiment.

FIG. 12 is a flow chart for indicating operations of this second ATM switching system.

First, it is assumed that the call originator terminal starts a holding operation (step 1201).

Next, the timer reading unit 111 reads the present time from the timer apparatus 108 (step 1202).

Then, the holding time managing unit 121 sets the time read at the step 1202 as a holding start time instant to the terminal management data unit 120 of the corresponding call receiver terminal (step 1203).

At this time, it is assumed that the holding operation of the call originator terminal is accomplished (step 1204).

Next, the timer reading unit Ill reads the present time from the timer apparatus 108 (step 1205).

Next, the holding time managing unit 121 calculates the holding time by subtracting the holding start time instant set to the terminal management data unit 118 of the corresponding call receiver terminal from the time read at the step 1205. Thus, the calculated holding time is add to the terminal management data unit 120 (step 1206).

Subsequently, the holding time managing unit 121 newly sets as communication time, the calculation result obtained by subtracting the holding time set to the terminal management data unit 120 from the communication time when the communication is ended. (step 1207).

The overall operation will now be described.

Figure 13:
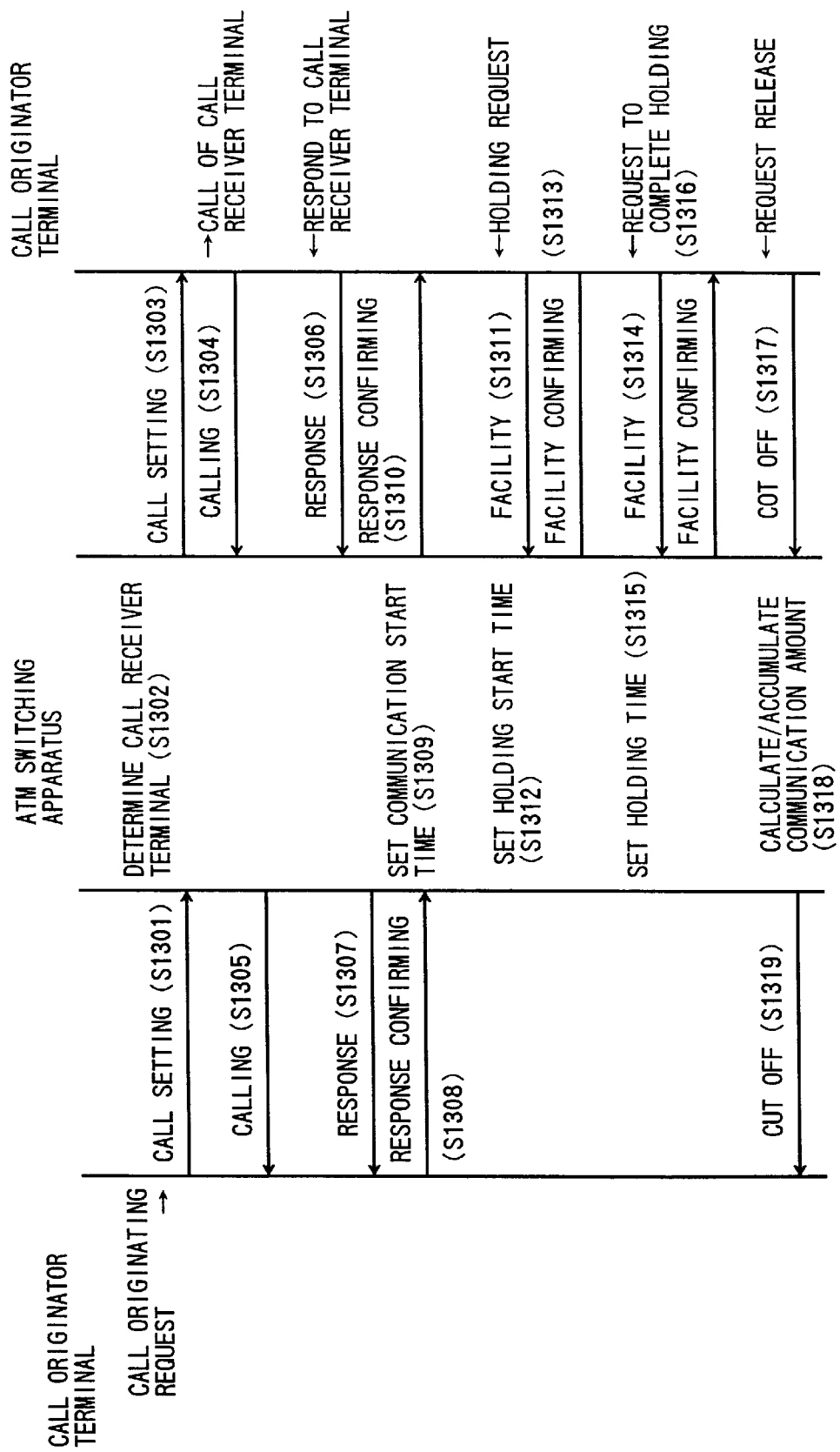
FIG. 13 shows a sequence diagram of the second embodiment.

FIG. 13 is a sequence diagram for representing the overall operation of the ATM switching system according to the second embodiment.

First, the call originator terminal transmits a "call setting" message for starting a call setting operation to the ATM switching apparatus 100 (step 1301).

When the "call setting" message is transmitted from the call originator terminal, the ATM switching apparatus 100 determines the call receiver terminal based upon the communication amount (step 1302), and further transmits the "call setting" message to the call receiver terminal (step 1303).

At this time, the call receiver terminal transmits a "calling" message indicative of a commencement of a calling operation to the ATM switching apparatus 100 (step 1304).

The ATM switching apparatus 100 transmits the "calling" message to the call originator terminal (step 1305).

Next, the call receiver terminal transmits a "response" message indicative of a call reception to the ATM switching apparatus 100 (step 1306).

The ATM switching apparatus 100 transmits the "response" message to the call originator terminal (step 1307).

Subsequently, the call originator terminal transmits a "response confirming" message for indicating that the "response" message is accepted to the ATM switching apparatus 100 (step 1308).

The ATM switching apparatus 200 sets the communication start time instant when the communication is started (step 1309), and further transmits the "response confirming" message to the call receiver terminal (step 1310).

In this case, the call receiver terminal transmits a "facility" message for requesting a holding service to the ATM switching apparatus 100. It should be noted that the "facility" message may be utilized to notify such information required to realize an additional service, or to request the additional service.

When the "facility" message requesting the holding service is transmitted from the call receiving terminal, the ATM switching apparatus 100 sets the holding start time instant before starting the holding operation (step 1312). Also, the ATM switching apparatus 100 transmits a "facility confirming" message for indicating that the "facility" message is accepted to the call receiver terminal (step 1313).

Now, the call receiver terminal transmits another "facility" message for requesting a holding operation completion service to the ATM switching apparatus 100.

The ATM switching apparatus 100 starts the communication and sets the holding time when the "facility" message for requesting the holding operation completion service is transmitted from the call receiver terminal (step 1315). The ATM switching apparatus 100 transmits the facility confirming" message to the call receiver terminal (step 1316).

In this case, the call receiver terminal transmits a "cut off" message for indicating a request to cut off a call to the ATM switching apparatus 100 (step 1317).

The ATM switching apparatus 100 calculates the communication amount when the communication is ended, and also accumulates the communication amount (step 1318). Also, the ATM switching apparatus 100 transmits the "cut off" message to the call originator terminal (step 1319).

It should be understood that the "cut off" message may be transmitted from the call originator terminal to the ATM switching apparatus 100.

EMBODIMENT 3
(ARRANGEMENT OF THIRD EMBODIMENT)

An ATM switching system according to a third embodiment is arranged by partially substituting the functions of the ATM switching system according to the first embodiment for those of the third embodiment. FIG. 14 is a diagram for showing an arrangement of the third embodiment. It should be noted that although the constructive elements of the first embodiment are partially omitted in this drawing, the functions thereof are provided. Also, the same reference numerals of FIG. 3 employed in the first embodiment are used to denote the same or similar constructive elements in this embodiment.

The subscriber circuit unit 107 includes a counter apparatus 122 connected to the storage apparatus 110, and is connected to each of the call receiver terminals. This counter apparatus 122 counts the quantity of an ATM cell (will be referred to as a "cell") which is transmitted to the call receiver terminal under communication.

The storage apparatus 110 includes a communication amount accumulating unit 115, an incoming call equally distributing unit 116, a counter initializing unit 123, and a counter reading unit 124, which are realized as a program, and further includes an incoming call equally distributing management data unit 117 and a communication amount management data unit 118, which are realized as data.

The counter initializing unit 123 initializes the counter apparatus 122 when the communication is commenced. The counter reading unit 124 reads the counter value of the counter apparatus 122 when the communication is ended.

The communication amount accumulating unit 115 performs the following process operations 1) to 3). That is, 1) the communication amount of the corresponding call receiver terminal is read from the communication amount management data unit 118. 2) The communication amount indicated by the counter value read by the counter reading unit 124 is added to the communication amount of the call receiver terminal read by the item 1), so that the communication amount of every call receiver terminal is accumulated. 3) The accumulated result is written into the communication amount management data unit 118.

When the call reception is required to the representative call receiver terminal, the incoming call distributing unit 116 reads the communication amounts of the respective incoming call group terminals from the communication amount management data unit 118. Then, such a call receiver terminal whose communication amount is the lowest amount is called as the call receiving destination.

(OPERATIONS BY THIRD EMBODIMENT)

A description will now be made of operations performed in the third embodiment.

Figure 15:
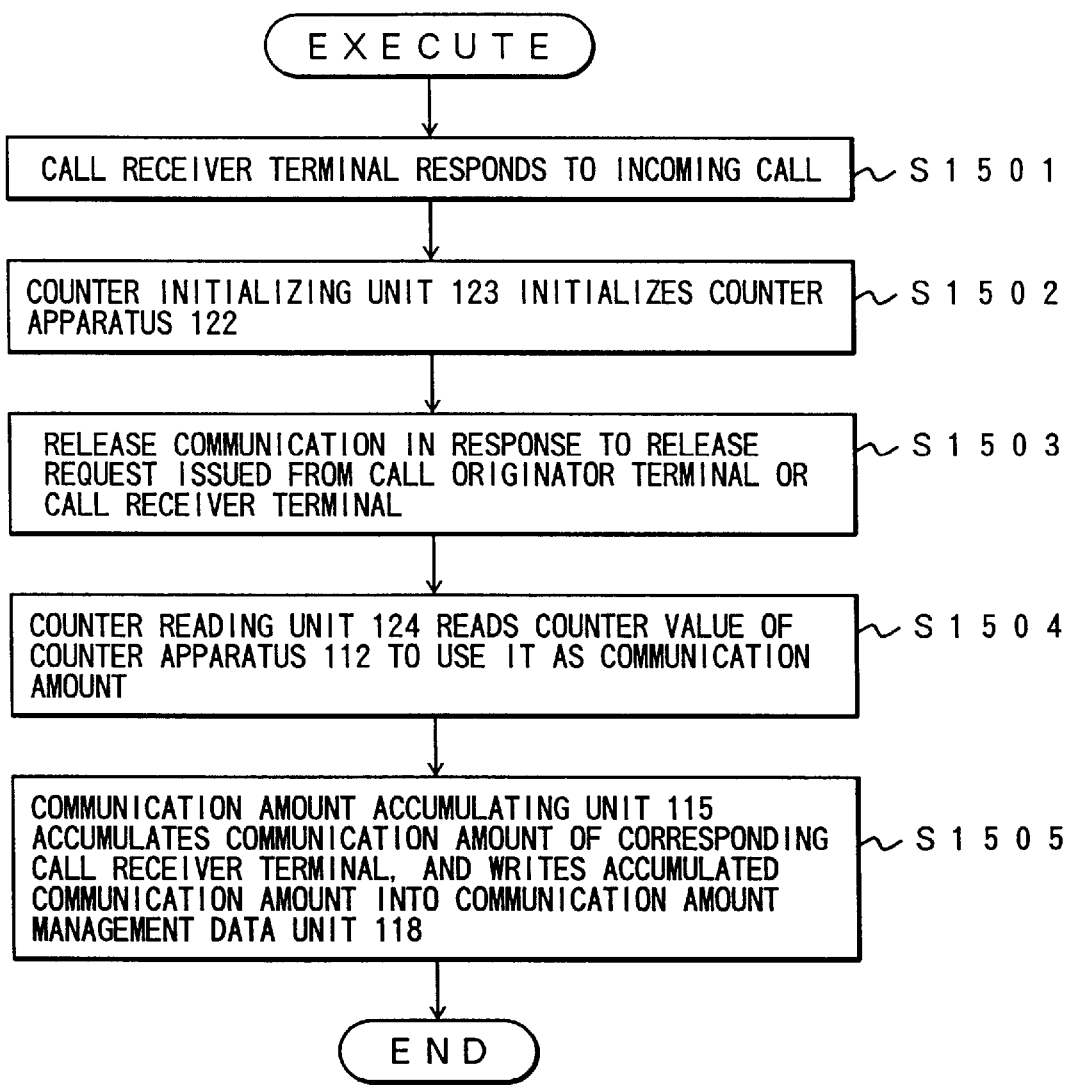
FIG. 15 is a flow chart for representing operations performed in the third embodiment.

FIG. 15 is a flow chart for indicating operations executed in the third embodiment.

First, it is now assumed that the call receiver terminal responds to the call reception (step 1501).

Accordingly, the counter initializing unit 123 initializes the counter apparatus 122 (step 1502).

Next, in response to a release request issued from either the call originator terminal or the call receiver terminal, the communication is released (step 1503).

Then, the counter reading unit 124 reads the count value of the counter apparatus 122 to use it as a communication amount (step 1504).

Subsequently, the communication amount accumulating unit 115 executes the following process operations 1) to 3) at a step 1505. 1). The communication amount of the corresponding call receiver terminal is read from the communication amount management data unit 118. 2) The communication amount indicated by the counter value read by the counter reading unit 124 is added to the communication amount of the call receiver terminal read at the item 1), so that the communication amount with respect to each of the call receiver terminals is accumulated. 3) The accumulated result is written into the communication amount management data unit 118. The overall operation will now be described.

Figure 16:
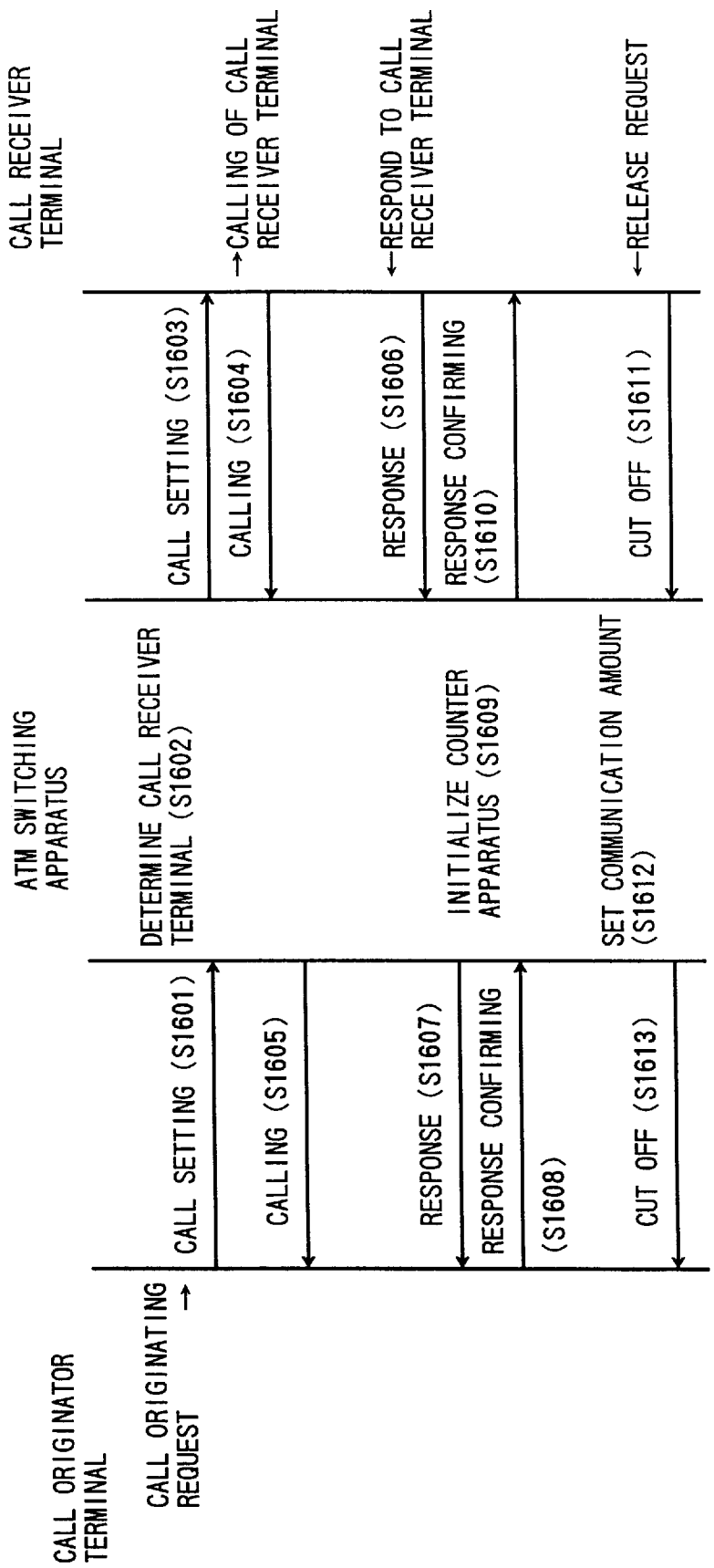
FIG. 16 shows a sequence diagram of the third embodiment.

FIG. 16 is a sequence diagram for representing the overall operation of the ATM switching system according to the third embodiment.

First, the call originator terminal transmits a "call setting" message for commencing a call setting operation to the ATM switching apparatus 100 (step 1601).

When the "call setting" message is transmitted from the call originator terminal, the ATM switching apparatus 100 determines the call receiver terminal based upon the communication amount (step 1602), and further transmits the "call setting" message to the call receiver terminal (step 1603).

At this time, the call receiver terminal transmits a "calling" message indicative of a commencement of a calling operation to the ATM switching apparatus 100 (step 1604).

The ATM switching apparatus 100 transmits the calling message to the call originator terminal (step 1605).

Next, the call receiver terminal transmits a "response" message indicative of a call reception to the ATM switching apparatus 100 (step 1606).

The ATM switching apparatus 100 transmits the response message to the call originator terminal (step 1607).

Subsequently, the call originator terminal transmits a "response confirming" message for indicating that the "response" message is accepted to the ATM switching apparatus 100 (step 1608).

The ATM switching apparatus 100 initializes the counter apparatus 122 so as to start the communication (step 1609), and further transmits the response confirming message to the call receiver terminal (step 1610).

In this case, the call receiver terminal transmits a "cut off" message for indicating a request to cut off a call to the ATM switching apparatus 100 (step 1611).

The ATM switching apparatus 100 calculates the communication amount when the communication is ended, and also accumulates the communication amount (step 1612). Also, the ATM switching apparatus 100 transmits the cut off message to the call originator terminal (step 1613).

It should be understood that the cut off message may be transmitted from the call originator terminal to the ATM switching apparatus 100.

EMBODIMENT 4
(ARRANGEMENT OF FOURTH EMBODIMENT)

Figure 17:
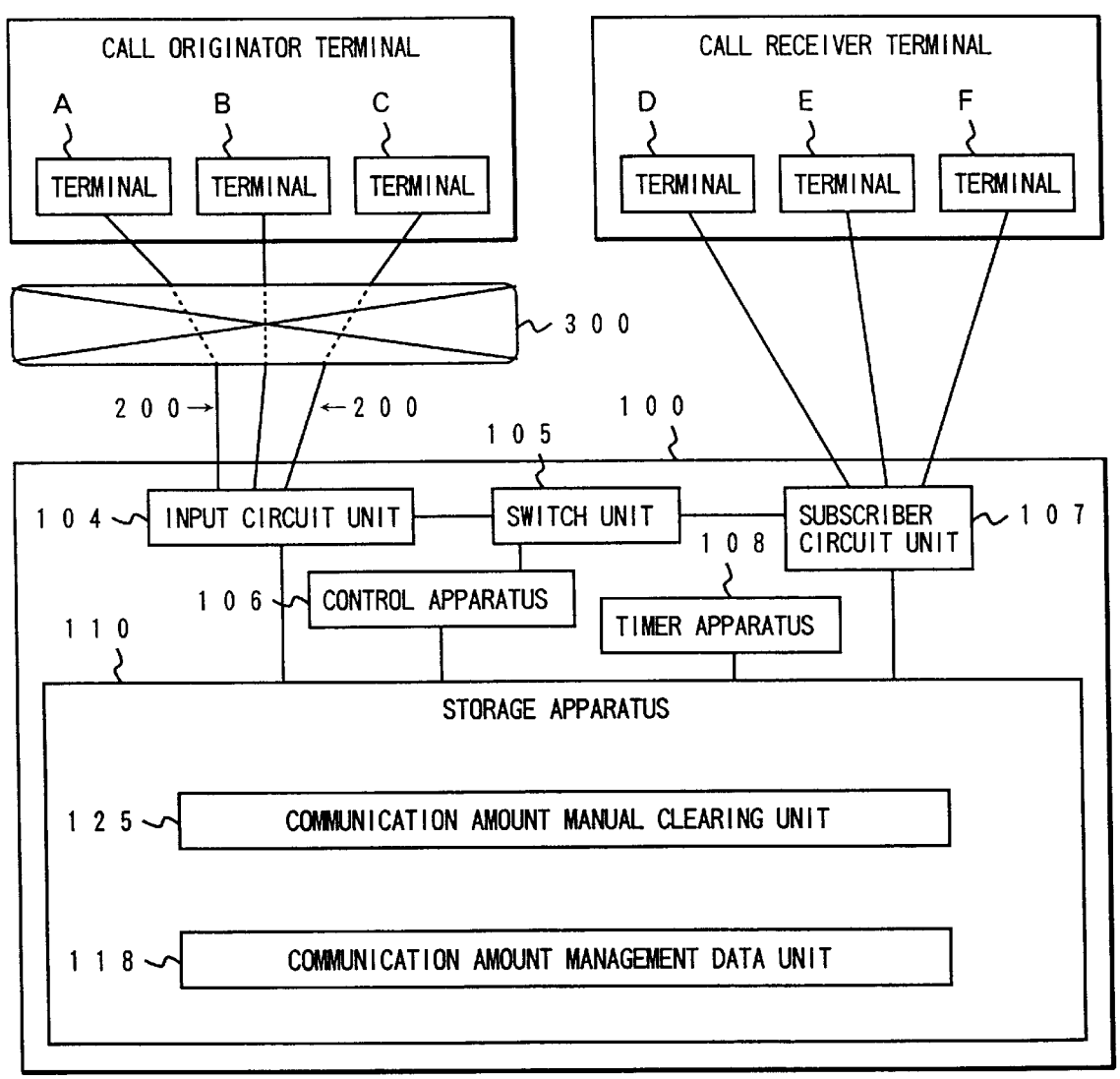
FIG. 17 is a structural diagram according to a fourth embodiment mode.

An ATM switching system according to a fourth embodiment is arranged by adding functions to those of the first embodiment. FIG. 17 is a diagram for showing an arrangement of the fourth embodiment. It should be noted that although the constructive elements of the first embodiment are partially omitted in this drawing, the functions thereof are provided. Also, the same reference numerals of FIG. 3 employed in the first embodiment are used to denote the same or similar constructive elements in this embodiment.

The storage apparatus 110 stores therein a communication amount manually clear unit 125 which is realized as a program, and also stores therein a communication amount management data unit 118 which is realized as data.

The communication amount manually clear unit 125 clears the content of the communication amount management data unit 118 when the call receiver terminal manually operates this terminal to issue a request to clear (erase) the communication amount.

(OPERATION BY FOURTH EMBODIMENT)

Then, operations performed in the fourth embodiment will now be described.

Figure 18:
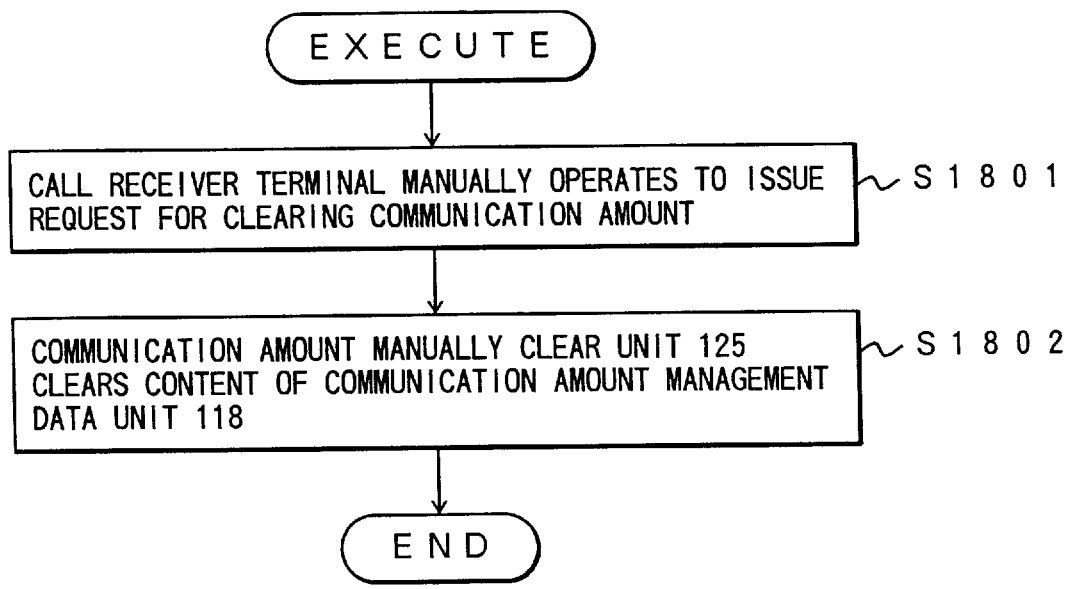
FIG. 18 is a flow chart for representing operations performed in the fourth embodiment.

FIG. 18 is a flow chart for indicating operations executed in the fourth embodiment.

First, it is now assumed that the call receiver terminal manually operates to issue the request to clear the communication amount (step 1801).

Next, the communication amount manually clear unit 125 clear the content of the communication amount management data unit 118 (step 1802).

EMBODIMENT 5
(ARRANGEMENT OF FIFTH EMBODIMENT)

Figure 19:
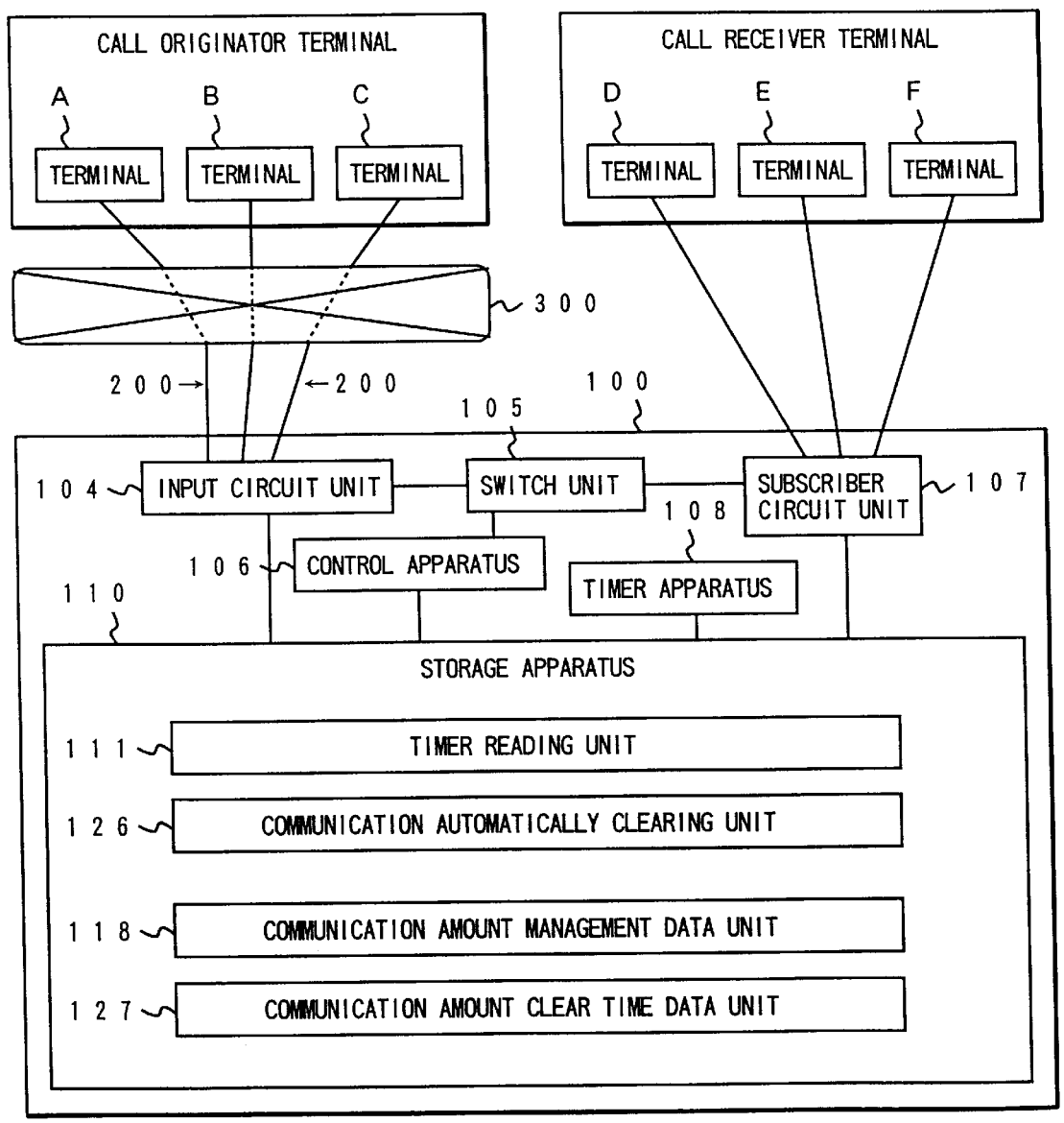
FIG. 19 is a structural diagram of a fifth embodiment mode.

An ATM switching system according to a fifth embodiment is arranged by adding functions to those of the first embodiment. FIG. 19 is a diagram for showing an arrangement of the fifth embodiment. It should be noted that although the constructive elements of the first embodiment are partially omitted in this drawing, the functions thereof are provided. Also, the same reference numerals of FIG. 3 employed in the first embodiment are used to denote the same or similar constructive elements in this embodiment.

The storage apparatus 110 stores therein a timer reading unit 111 and a communication automatically clear unit 126, which are realized as a program, and further stores therein a communication amount management data unit 118 and a communication amount clear time data unit 127, which are realized as data.

Figure 20:
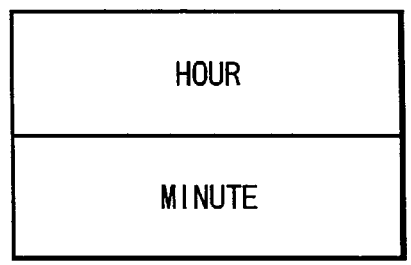
FIG. 20 is a data structural diagram for a communication amount clear time data unit of the fifth embodiment.

The communication amount automatic clear unit 126 automatically clears the content of the communication amount management data unit 118 at a time set to the communication amount clear time data unit 127. FIG. 20 indicates a data structure of the communication amount clear time data unit 127. As shown in this drawing, an hour and a minute are set to the communication clear time data unit 127.

(OPERATIONS OF FIFTH EMBODIMENT)

Next, operations performed in the fifth embodiment will now be described.

Figure 21:
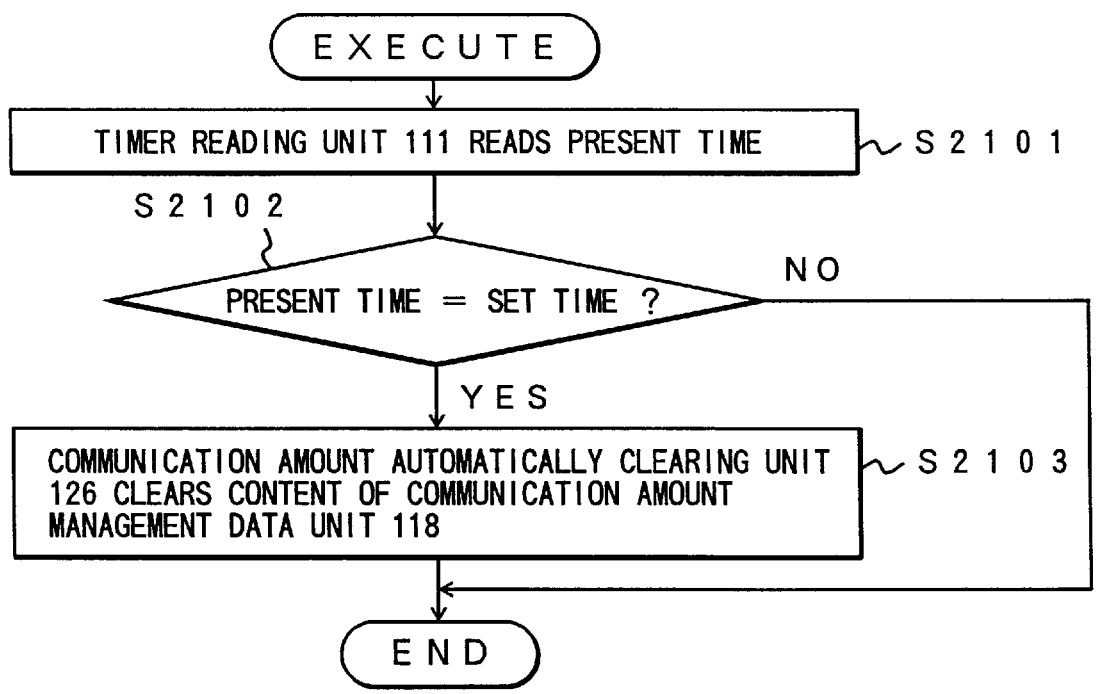
FIG. 21 is a flow chart for showing operations performed in the fifth embodiment.

FIG. 21 is a flow chart for indicating operations executed in the fifth embodiment.

First, the timer reading unit 111 reads the present time from the timer apparatus 108 (step 2101).

Next, a check is done as to whether or not the time read at the step 2101 is coincident with the time set to the communication amount clear time data unit 121 (step 2102).

When it is judged "YES" (coincident) at the step 2102, the communication amount automatically clear unit 126 clears the content of the communication amount management data unit 118 (step 2103).

EMBODIMENT 6
(ARRANGEMENT OF SIXTH EMBODIMENT)

Figure 22:
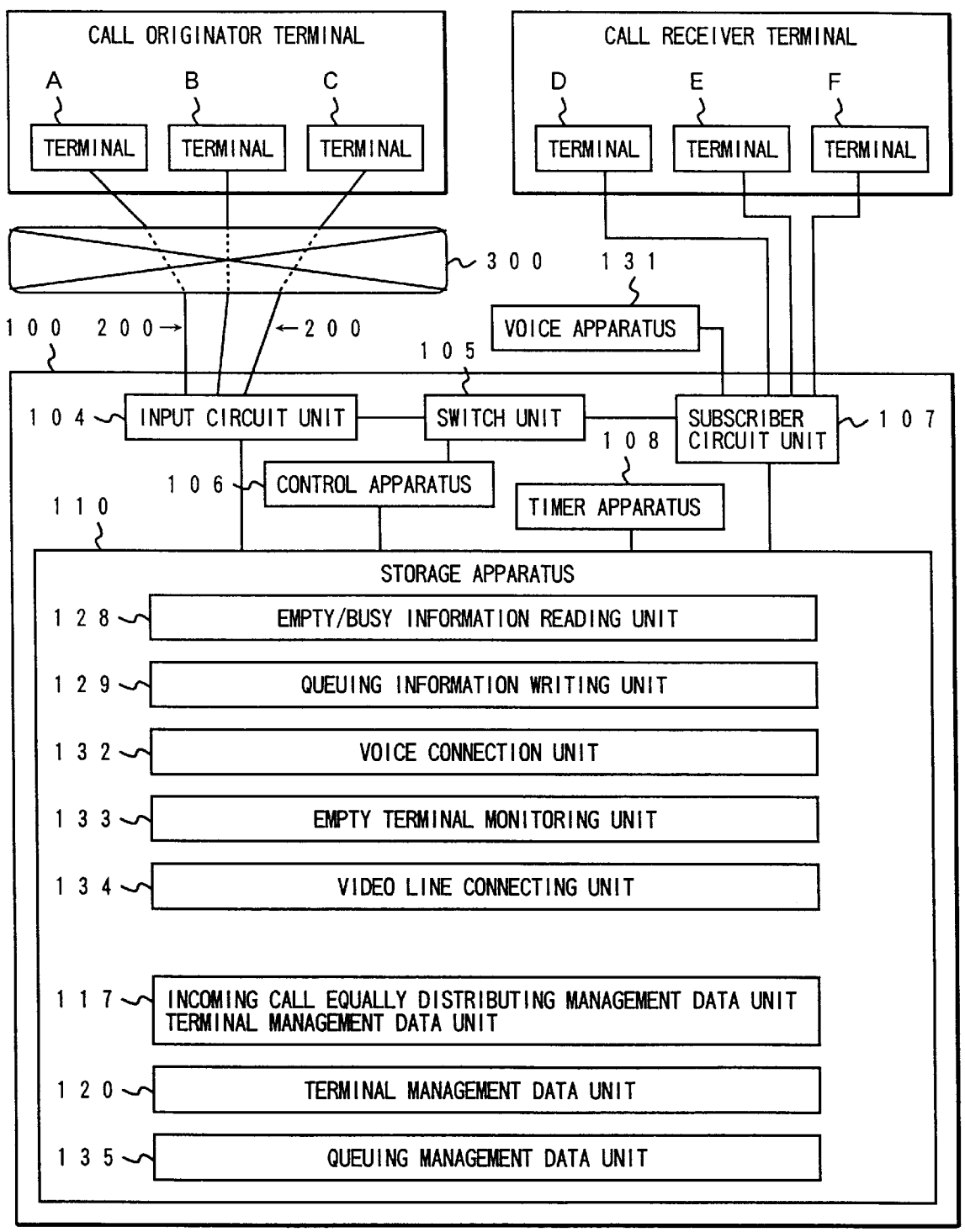
FIG. 22 is a structural diagram of a sixth embodiment mode.

An ATM switching system according to a sixth embodiment is arranged by adding functions to those of the first embodiment. FIG. 22 is a diagram for showing an arrangement of the sixth embodiment. It should be noted that although the constructive elements of the first embodiment are partially omitted in this drawing, the functions thereof are provided. Also, the same reference numerals of FIG. 3 employed in the first embodiment are used to denote the same or similar constructive elements in this embodiment.

A voice apparatus 131 is connected to the subscriber circuit unit 107. A voice message is recorded on this audio apparatus 131, which is notified to the call originator terminal brought into the queuing state.

The ATM switching apparatus 100 stores therein an empty/busy information reading unit 128, a queuing information writing unit 129, a voice connecting unit 132, an empty terminal monitoring unit 133, and a video line connecting unit 134, which are realized as a program, and further stores therein an incoming call equally distributing management data unit 117 and a terminal management data unit 120, which are realized as data.

The empty/busy information reading unit 128 reads empty/busy information for indicating whether the incoming call group terminal is empty or busy from the terminal management data unit 120 when the incoming call request is issued to the representative call receiver terminal set in the incoming call equally distributing management data unit 117.

Figure 23:
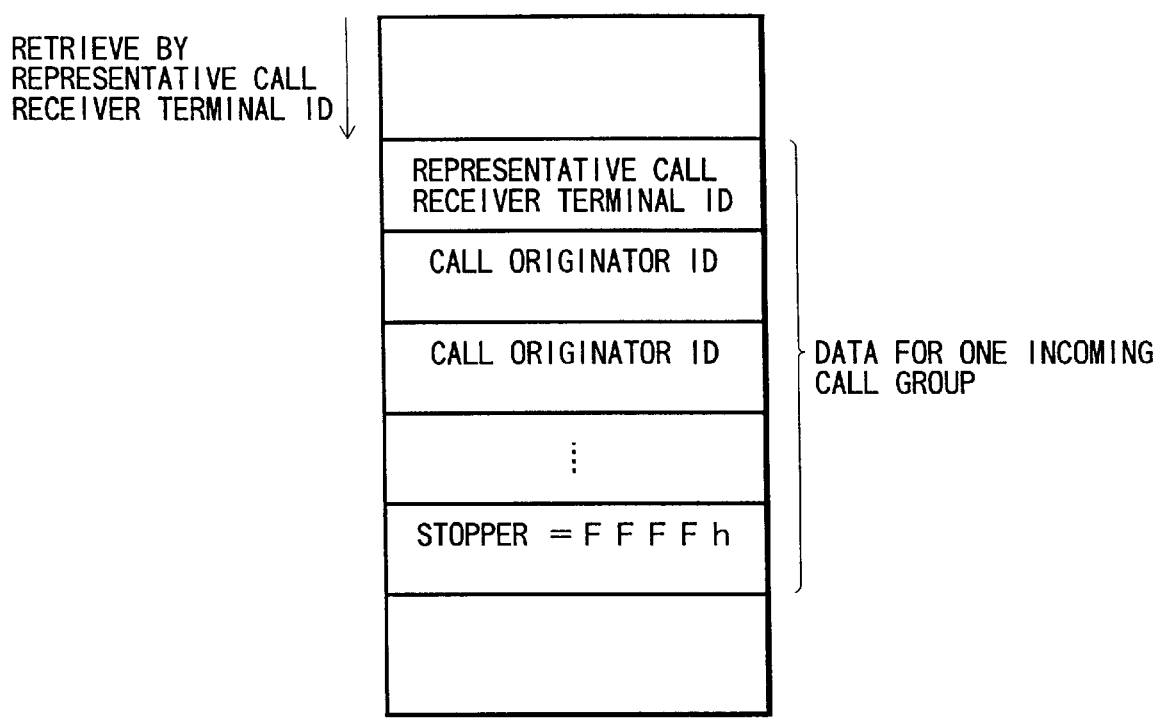
FIG. 23 is a data structural diagram for a queuing call management data unit of the sixth embodiments.

In such a case that all of the incoming call group terminals are under use (busy), the queuing information writing unit 129 sets the call originator terminal ID of the call originator terminal to the queuing management data unit 135. FIG. 23 indicates a data structure of the queuing management data unit 135. As shown in FIG. 23, the representative call receiver terminal ID, a plurality of incoming call group terminal numbers, and an FFFFh functioning as a stopper value for indicating an end of a retrieved position are set to the queuing management data unit 135 with respect to each of the incoming call groups. The set information is retrieved by using the representative call receiver terminal ID as the index.

The empty terminal monitoring unit 133 performs the process operations defined by the following items 1) to 2).
1) When the call originator terminal is under queuing state, the empty/busy information set to the terminal management data unit 120 is periodically monitored.
2) When the empty terminal is detected, this empty terminal is called as the call receiver terminal.

When the empty terminal is detected by the empty terminal monitoring unit 133, the video line connecting unit 134 secures the video line band, and connects the video line to the call originator terminal.

(OPERATION BY SIXTH EMBODIMENT)

A description will now be made of operations and overall operation performed in the sixth embodiment.

Figure 24:
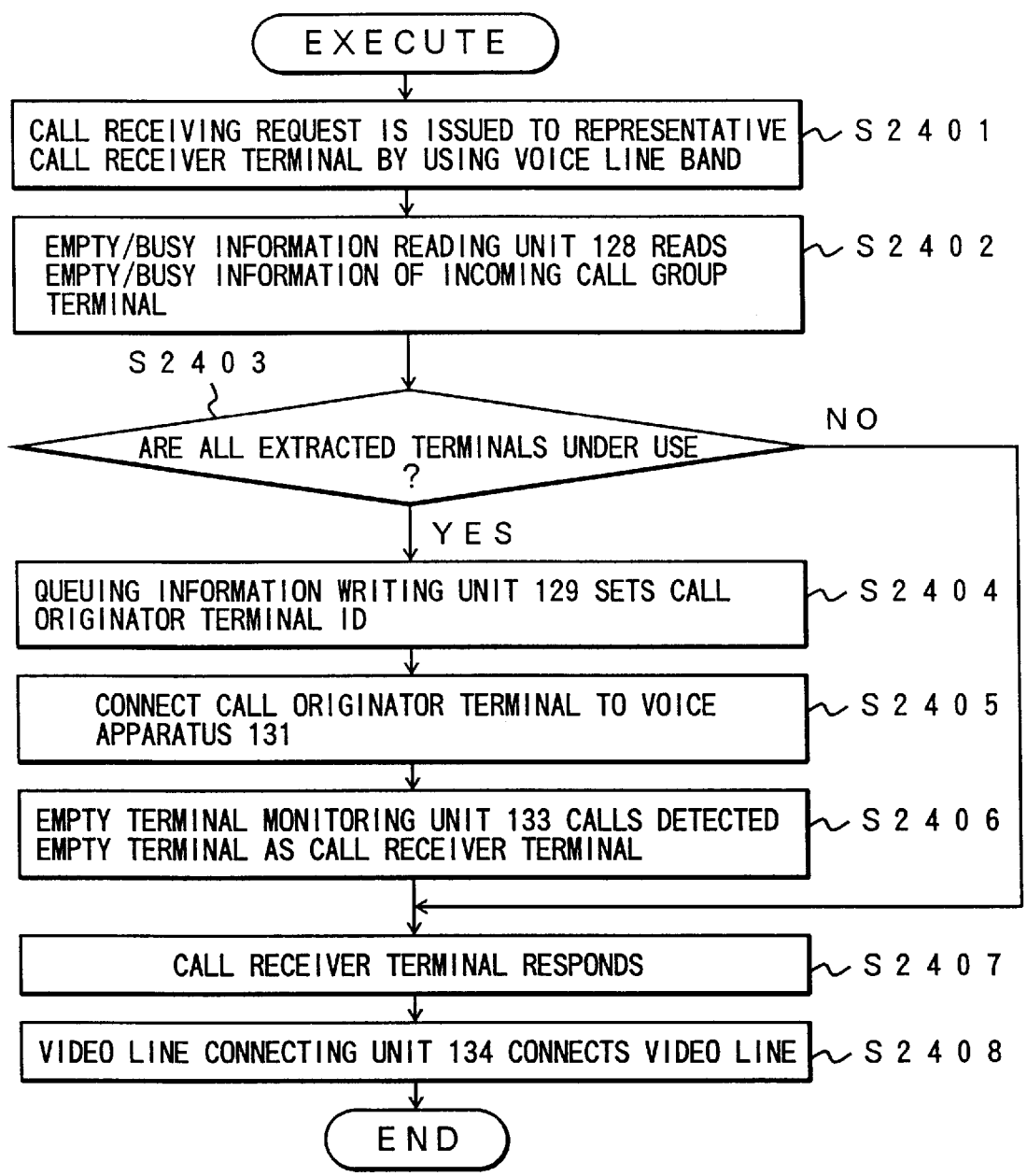
FIG. 24 is a flow chart for showing operations performed in the sixth embodiment.

FIG. 24 is a flow chart for representing operations performed in the sixth embodiment.

First, the call originator terminal requests the representative call receiver terminal set to the incoming call equally distributing management data unit 117 to receive a call by using the voice line band (step 2401).

Next, the empty/busy information reading unit 128 reads the empty/busy information of the incoming call group terminal from the terminal management data unit 120 (step 2402).

In this case, a check is made as to whether or not all of the incoming call group terminals are under use based upon the result read at the step 2402. (step 2403)

When it is judged "YES" (under use) at the step 2403, the queuing information writing unit 129 sets the call originator terminal ID to the queuing management data unit 135 (step 2404).

Then, the voice connection unit 32 connects the call originator terminal for originating the call to the voice apparatus 31 (step 2405). Then, the empty terminal monitoring unit 133 performs the below-mentioned items 1) to 2) at a step 2406. That is, 1) when the call originator terminal is under queuing state, the empty/busy information set to the terminal management data unit 120 is periodically monitored. 2) When the empty terminal is detected, this empty terminal is called as the call receiver terminal.

After the process operation defined at the step 2406 has been executed, when it is judged "NO" (namely, all of terminals are not under use) at the step 2403, the empty terminal is called as the call receiver terminal (step 2407).

Then, the video line connection unit 134 secures the video line band and connects the video line to the call originator terminal when the empty terminal is detected by the empty terminal monitoring unit 133 (step 2408).

Now, overall operations will be described.

Figure 25:
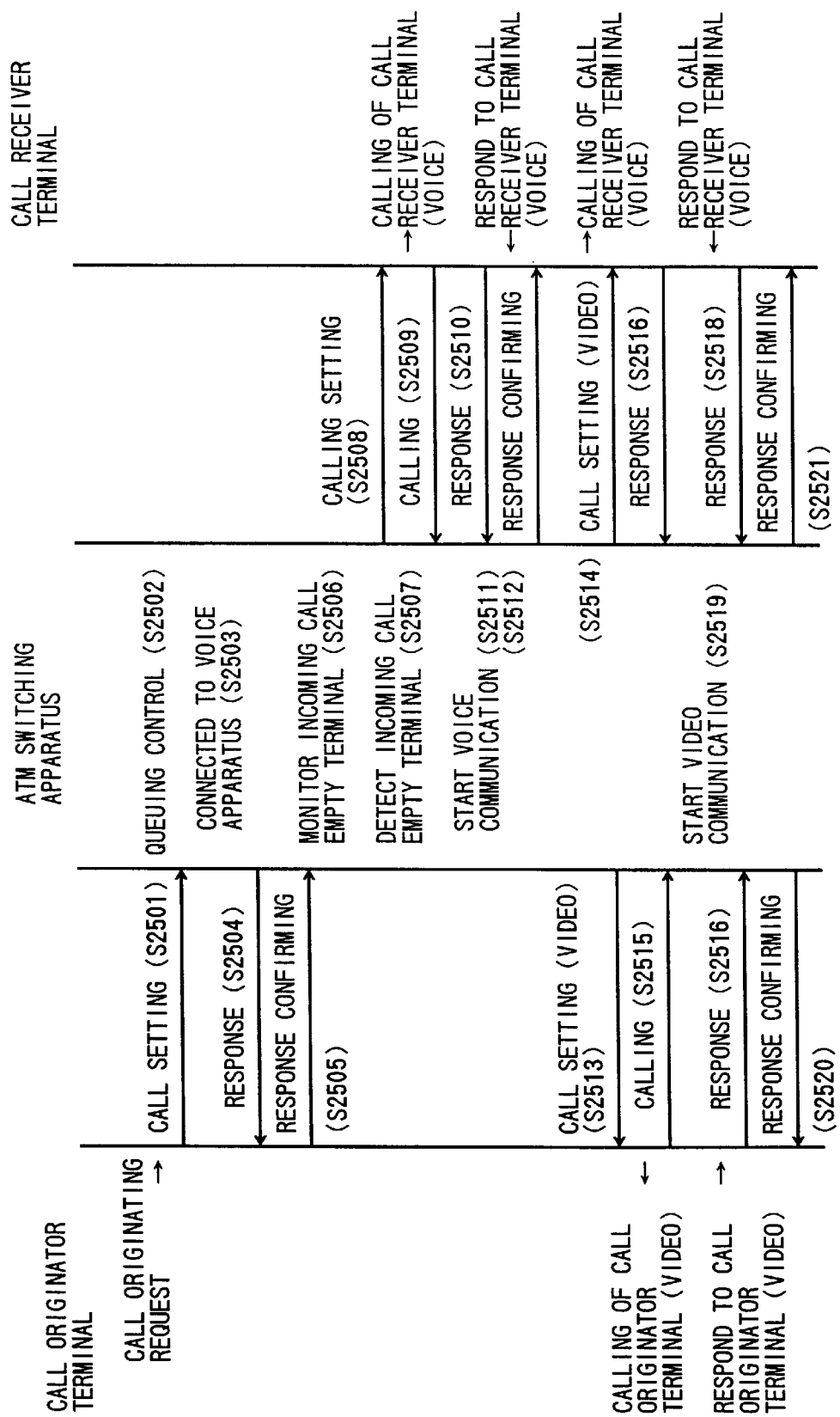
FIG. 25 shows a sequence diagram of the sixth embodiment.

FIG. 25 is a sequence diagram for indicating overall operations of the sixth embodiment.

First, to commence the call setting operation, the call originator terminal transmits a "call setting" message related to a voice to the ATM switching apparatus 100 (step 2501).

When the "call setting" message is transmitted from the call originator terminal, the ATM switching apparatus 100 performs the queueing control if all of the call receiver terminals are under use (step 2502), and connects the call originator terminal to the voice apparatus 131 (step 2503). Furthermore, the ATM switching apparatus 100 transmits a "response" message indicative of a call reception to the call originator terminal (step 2504).

The call originator terminal transmits a "response confirming" message indicative of a reception of the "response" message to the ATM switching apparatus 100 (step 2505).

When the "response confirming" message is transmitted from the call originator terminal, the ATM switching apparatus 100 monitors such a situation whether or not the call receiver terminal becomes empty (step 2506).

When the empty terminal is detected, this ATM switching apparatus 100 transmits the "call setting" message related to the voice to the call receiver terminal (step 2508).

When the "call setting" message is notified from the ATM switching apparatus 100, the call receiver terminal transmits a "calling" message for indicating that the calling operation is commenced to the ATM switching apparatus 100 (step 2509). In this case, the call receiver terminal is called by way of voice. To notify the call reception, the call receiver terminal transmits a "response" message by voice to the ATM switching apparatus 100.

At this stage, the ATM switching apparatus 100 starts the voice communication (step 2511), and then transmits to the call receiver terminal, a "response confirming" message for indicating that the "response" message transmitted from the call receiver terminal is accepted (step 2512). Also, in order to commence the call setting operation about the video, the ATM switching apparatus 100 transmits the "call setting" message related to the video to the call originator terminal (step 2513), and also transmits the "call setting" message related to the video to the call receiver terminal (step 2514).

To notify that the calling operation related to the video is commenced, the call originator terminal transmits the "calling" message related to the video to the ATM switching apparatus 100 (step 2515). Also, to notify that the calling operation related to the video, the call originating terminal transmits the "response" message to the ATM switching apparatus 100 (step 2516).

To notify that the calling operation related to the video is commenced, the call receiver terminal transmits the "calling" message related to the video to the ATM switching apparatus 100 (step 2517). Also, to notify that the calling operation related to the video, the call receiver terminal transmits the "response" message to the ATM switching apparatus 100 (step 2518).

At this stage, the ATM switching apparatus 100 starts the video communication (step 2519), and also transmits a "response confirming" message for indicating the reception of the response message to the call originator terminal and the call receiver terminal (step 2520, and step 2521).
EMBODIMENT 7
(ARRANGEMENT OF SEVENTH EMBODIMENT)

Figure 26:
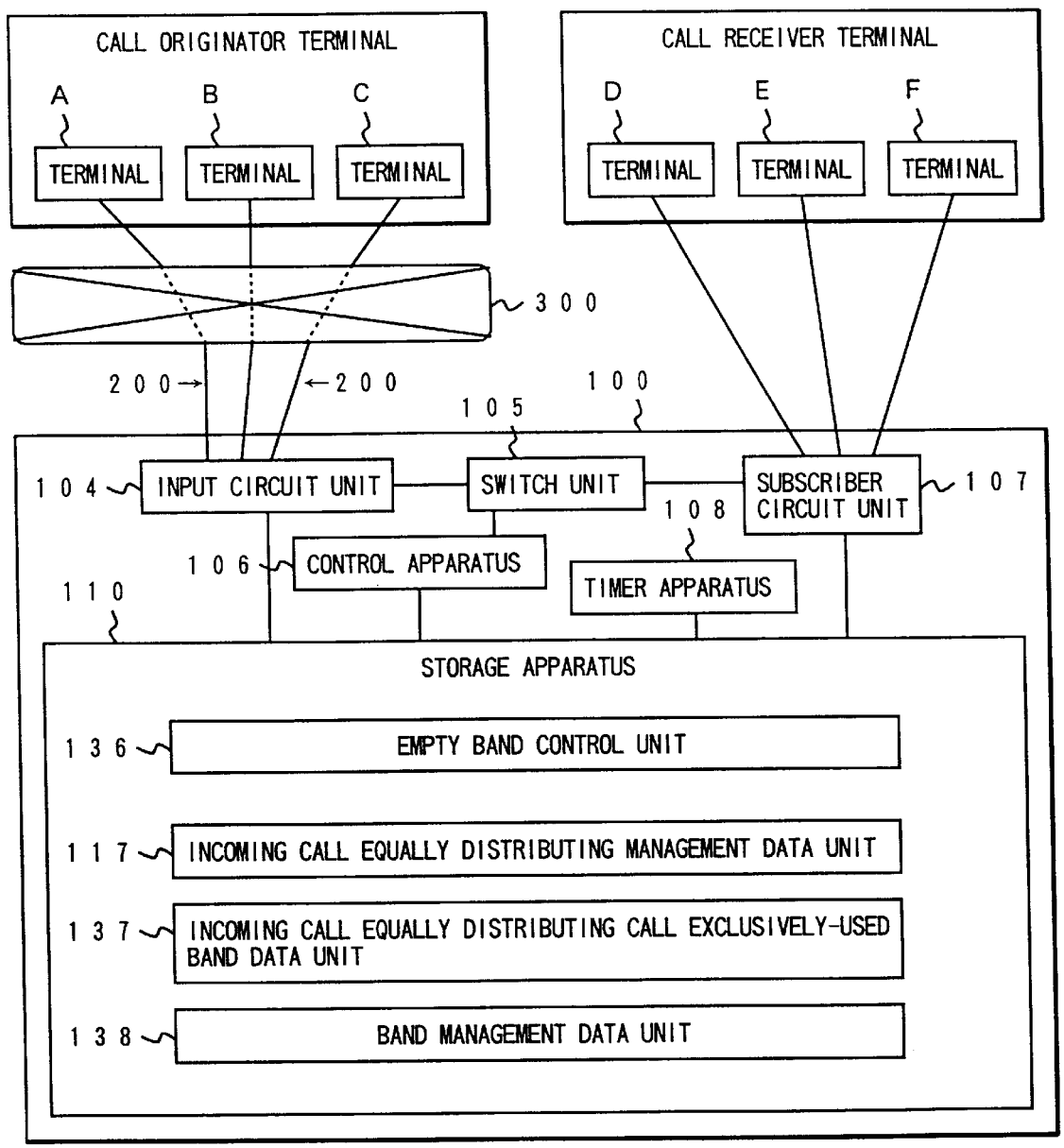
FIG. 26 is a structural diagram according to a seventh embodiment mode.

An ATM switching system according to a seventh embodiment is arranged by adding functions to those of the sixth embodiment. FIG. 26 is a diagram for showing an arrangement of the seventh embodiment. It should be noted that although the constructive elements of the sixth embodiment are partially omitted in this drawing, the functions thereof are provided. Also, the same reference numerals of FIG. 22 employed in the first embodiment are used to denote the same or similar constructive elements in this embodiment.

The ATM switching apparatus 100 stores therein an empty band control unit 136 which is realized as a program, and further stores therein an incoming call equally distributing management data unit 117, an incoming call equally distributing call exclusively used band data unit 137, and a band management data unit 138, which are realized as data.

The empty band control unit 136 executes the following 1) to 2) when the incoming call group terminal is called. 1) From the bandwidth (empty bandwidth) except for such a bandwidth used to originate/receive the call of the terminal other than the incoming call group terminal, a summation value of the exclusively used bandwidths set to the incoming call equally distributing call exclusively used band data unit 137 is subtracted to thereby a remaining bandwidth 2) When the remaining bandwidth is smaller than, or equal to a predetermined value, the call originating/receiving operations for the terminals (call originator terminal and call receiver terminal) are restricted.

It should be understood that the incoming call group terminal is called when the call is received to the representative call receiver terminal set to the incoming call equally distributing management data unit 117. The empty bandwidth is set to the band management data unit 138.

Figure 27:
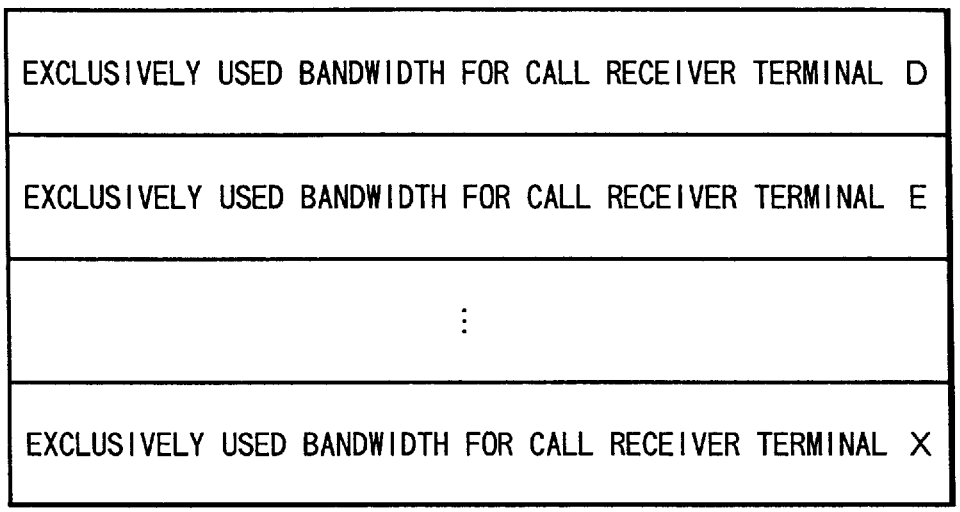
FIG. 27 is a data structural diagram for an incoming call equally distributing exclusive band data unit of the seventh embodiment.

In this case, FIG. 27 represents a data structure of the incoming call equally distributing call exclusively used band data unit 13. As shown in FIG. 27, are exclusively used bandwidths for the respective incoming call terminals are set to the incoming call equally distributing call exclusively used band data unit 13.

Figure 28:
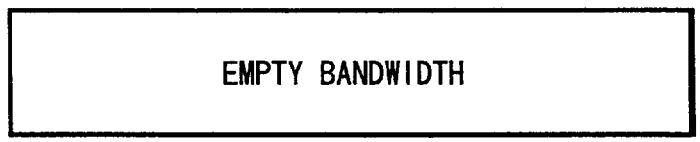
FIG. 28 is a data structural diagram for a band management data unit of the seventh embodiment.

FIG. 28 indicates a data structure of the band management data unit 138. As shown in FIG. 28, the empty bandwidths are set to the band management data unit 138.
(OPERATIONS OF SEVENTH EMBODIMENT)

A description will now be made of operations performed in the seventh embodiment.

Figure 29:
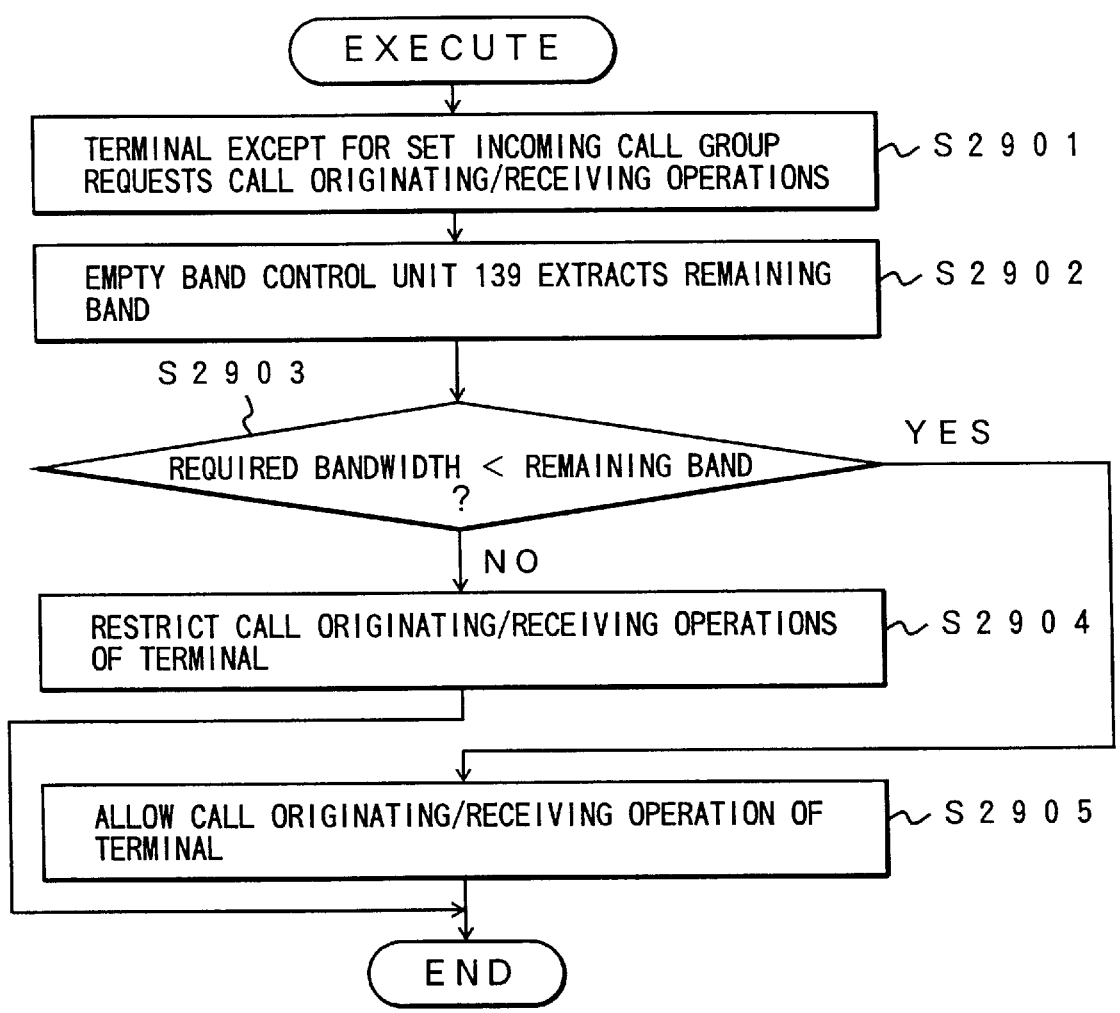
FIG. 29 is a flow chart for indicating operations performed in the seventh embodiment.

FIG. 29 is a flow chart for representing operations executed in the seventh embodiment.

First, it is now assumed that call originating/receiving operations are required from the terminal other than the incoming call group set to the incoming call equally distributing call exclusively used band data unit 137 (step 2901).

Next, the empty band control unit 136 subtracts the summation value of the exclusively used bandwidths set to the incoming call equally distributing call exclusively used band data unit 137 from the empty bandwidth set to the band management data unit 138 to thereby obtain the remaining bandwidth (step 2902).

In this case, a judgment is made as to whether or not the bandwidth (required bandwidth) required by the terminal other than the incoming call group is not more than the remaining bandwidth calculated at the step 2902 (step 2903).

When it is judged "NO" (namely, required bandwidth>remaining bandwidth) at the step 2903, the call originating/receiving operations from the terminal other than the incoming call group are restricted (step 2904).

When it is judged "YES" (namely, required bandwidth≦remaining bandwidth) at the step 2903, the call originating/receiving operations from the terminal other than the incoming call group are allowed (step 2905).
EMBODIMENT 8
(ARRANGEMENT OF EIGHTH EMBODIMENT)

Figure 30:
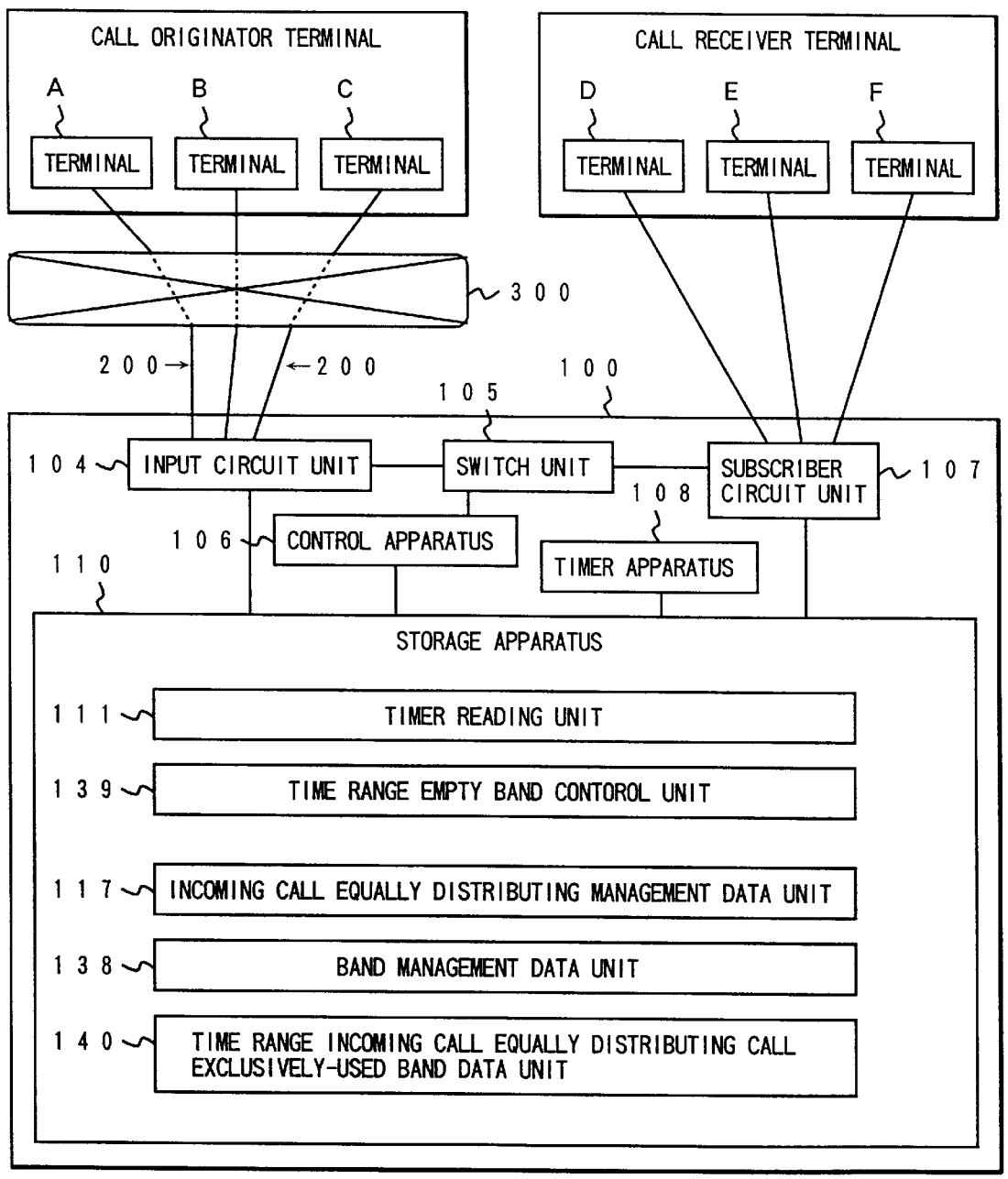
FIG. 30 is a structural diagram of an eighth embodiment mode.
Figure 32:
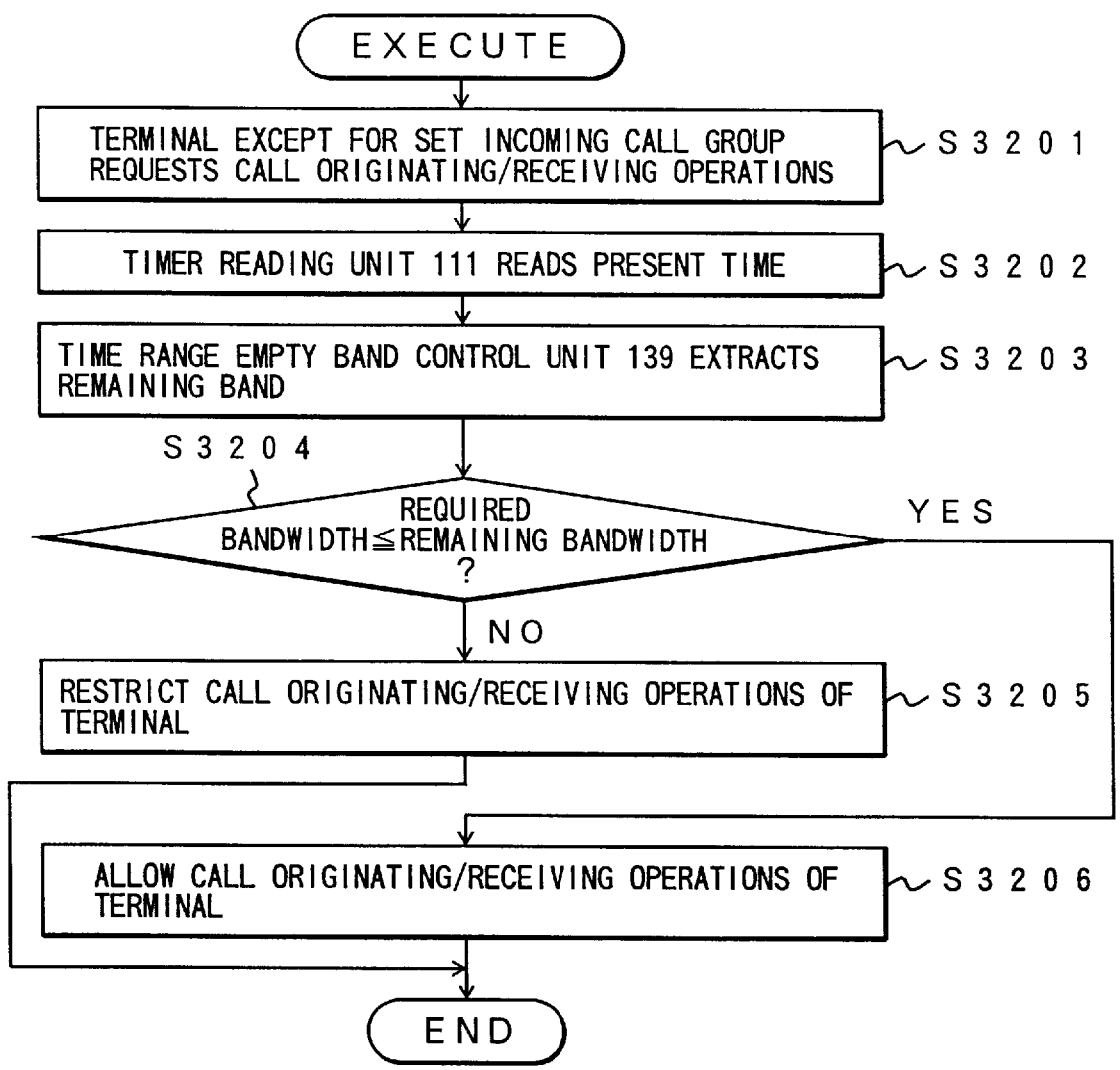
FIG. 32 is a flow chart for showing operations performed in the eighth embodiment.

An ATM switching system according to an eighth embodiment is arranged by adding functions to those of the seventh embodiment. FIG. 30 is a diagram for showing an arrangement of the eighth embodiment. It should be noted that although the constructive elements of the seventh embodiment are partially omitted in this drawing, the functions thereof are provided. Also, the same reference numerals of FIG. 26 employed in the seventh embodiment are used to denote the same or similar constructive elements in this embodiment.

The ATM switching apparatus 100 stores therein a timer reading unit Ill and a time range empty band control unit 139, which are realized as a program, and further stores therein an incoming call equally distributing management data unit 117, a band data management unit 138, and a time range incoming call equally distributing call exclusively used band data unit 140, which are realized as data.

When the call originating/receiving operations are requested from the terminal other than the incoming call group, the timer reading unit 111 reads the present time from the timer apparatus 108.

The time range band control unit 139 controls the exclusively used bandwidth used when the incoming call group terminal is called so as to vary this bandwidth, depending upon the time range. The information employed in this control is set to the time range incoming call equally distributing call exclusively-used band data unit 140. The time range empty band control unit 139 performs the process operations of the below-mentioned items 1) to 2). That is, 1) the exclusively used bandwidth set with respect to the present time is read from the time range incoming call equally distributing call exclusively used band data unit 140. 2) The summation value of the exclusively used bandwidths read in the item 1) is subtracted from the empty bandwidth set to the band management data unit 138, thereby calculating the remaining bandwidth.

FIG. 31 indicates a data structure of the Lime range incoming call equally distributing call exclusively-used band data unit 140. As indicated in this drawing, in the time range incoming call equally distributing call exclusively-used band data unit 140, the exclusively used bandwidths which can be secured by the respective incoming call terminals are set after a time indicated by "hour" and "minute", and further an hour, and also a minute are set.

First, it is now assumed that the call originating/receiving request is issued from the terminal other than the incoming call group set to the incoming call equally distributing management data unit 117 (step 3201).

Next, the timer reading unit 111 reads the present time from the timer apparatus 108 (step 3202).

Next, the time range empty band control unit 139 executes the process operations of the following items 1) to 2) at a step 3203. 1). The exclusively used bandwidth set to the present time is read from the time range incoming call equally distributing call exclusively-used band data unit 140. 2). A summation value of the exclusively used bandwidths read at the item 1) is subtracted from the empty bandwidth set to the band management data unit 138 to thereby calculate the remaining bandwidth.

In this case, a judgment is made as to whether or not the bandwidth (required bandwidth) required by the terminal other than the incoming call group is not more than the remaining bandwidth (step 3204).

When it is judged "NO" (namely, required bandwidth>remaining bandwidth) at the step 3204, the call originating/receiving operations from the terminal other than the incoming call group are restricted (step 3205).

When it is judged "YES" (namely, required bandwidth<remaining bandwidth) at the step 3204, the call originating/receiving operations from the terminal other than the incoming call group are allowed (step 3206).

EMBODIMENT 9
(ARRANGEMENT OF NINTH EMBODIMENT)

Figure 33:
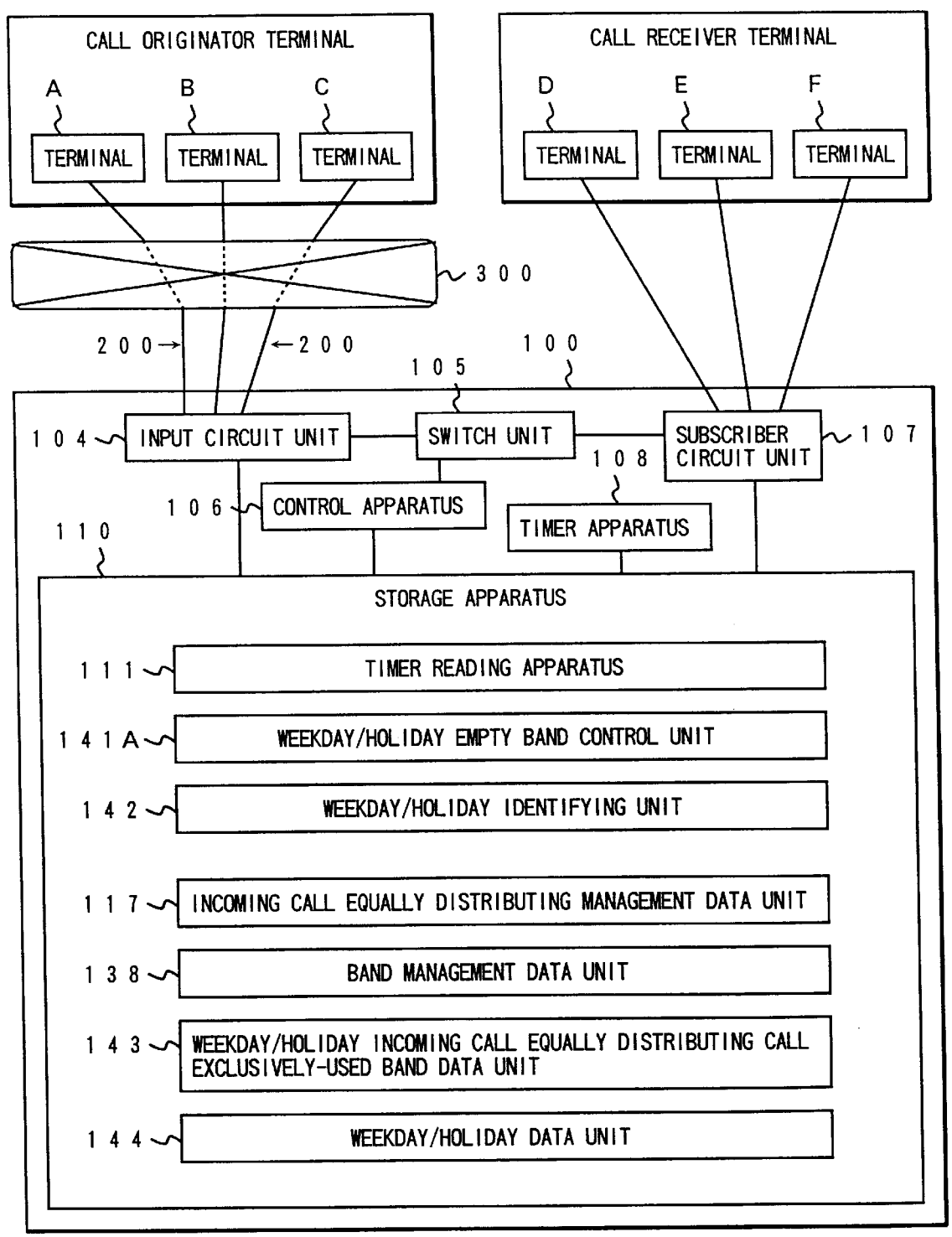
FIG. 33 is a structural diagram of a ninth embodiment mode.

An ATM switching system according to a ninth embodiment is arranged by adding functions to that of the seventh embodiment. FIG. 33 is a diagram for showing an arrangement of the ninth embodiment. It should be noted that although the constructive elements of the seventh embodiment are partially omitted in this drawing, the functions thereof are provided. Also, the same reference numerals of FIG. 26 employed in the seventh embodiment are used to denote the same or similar constructive elements in this embodiment.

The ATM switching apparatus 100 stores therein a timer reading unit 111, a weekday/holiday empty band control unit 141a, and a weekday/holiday identifying unit 142, which are realized as a program, and further stores therein an incoming call equally distributing management data unit 117, a band management data unit 138, a weekday/holiday incoming call equally distributing call exclusively-used band data unit 143, and a weekday/holiday data unit 144, which are realized as data.

The weekday/holiday identifying unit 142 identifies whether the read date corresponds to the weekday or holiday based upon the date read from the timer apparatus 108 and the weekday/holiday data stored in the weekday/holiday data unit 144.

The weekday/holiday empty band control unit 141a performs the process operations of the following items 1) to 3). 1). When the weekday/holiday identifying unit 142 identifies that the read date corresponds to the weekday, the exclusively used bandwidth set for the weekday is read out from the weekday/holiday incoming call equally distributing call exclusively-used band data unit 143. 2). When the weekday/holiday identifying unit 142 identifies that the read date corresponds to the holiday, the exclusively used bandwidth set for the holiday is read out from the weekday/holiday incoming call equally distributing call exclusively-used band data unit 143. 3). A summation value of the exclusively used bandwidths read out in the item 1) or 2) is subtracted from the empty bandwidth set to the band management data unit 138, so that the remaining bandwidth is obtained.

Figure 34:
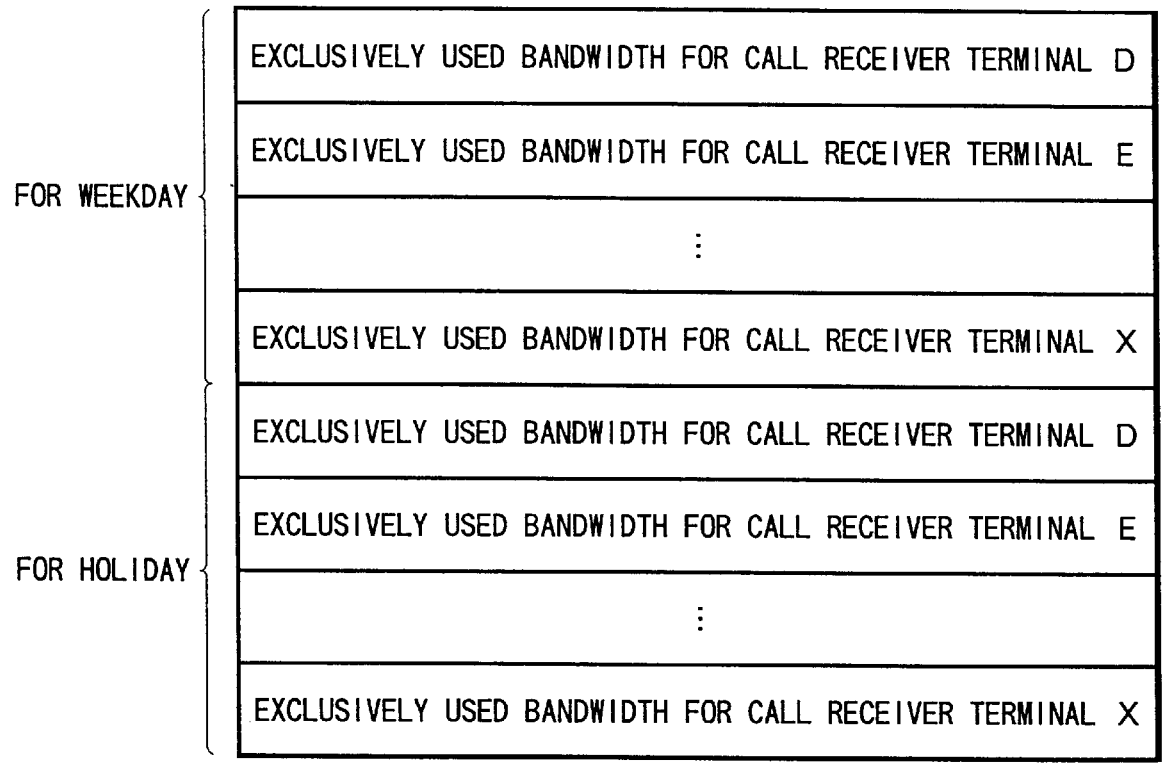
FIG. 34 is a data structural diagram for a time range incoming call equally distributing call exclusive band data unit of the ninth embodiment.

FIG. 34 represents a data structure of the weekday/holiday incoming call equally distributing call exclusively-used band data unit 143. As shown in this drawing, the exclusively used bandwidths of the call receiver terminals are subdivided into the bandwidth for the weekday and the bandwidth for the holiday, which are then set.

Figure 35:
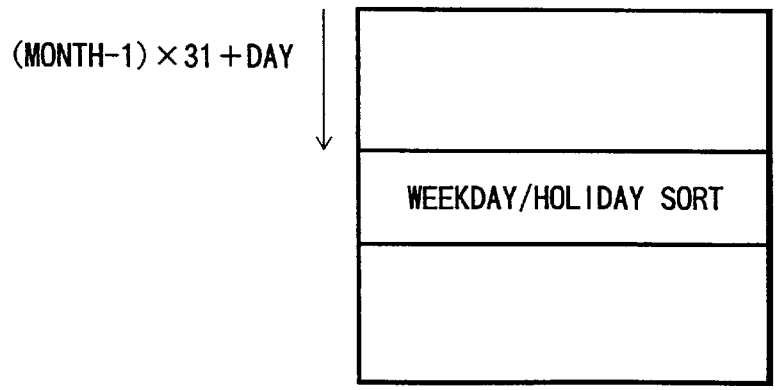
FIG. 35 is a data structural diagram for a weekday/holiday data unit of the ninth embodiment.

FIG. 35 shows a data structure of the weekday/holiday data unit 144. As shown in this drawing, sorts of weekday/holiday are set in the weekday/holiday data unit 144. The set information is retrieved while using a value calculated from a formula (1) as an index:

$$(\text{month}-1) \times 31 + \text{day} \qquad (1).$$

(OPERATIONS BY NINTH EMBODIMENT)

Operations executed in the ninth embodiment will now be described.

Figure 36:
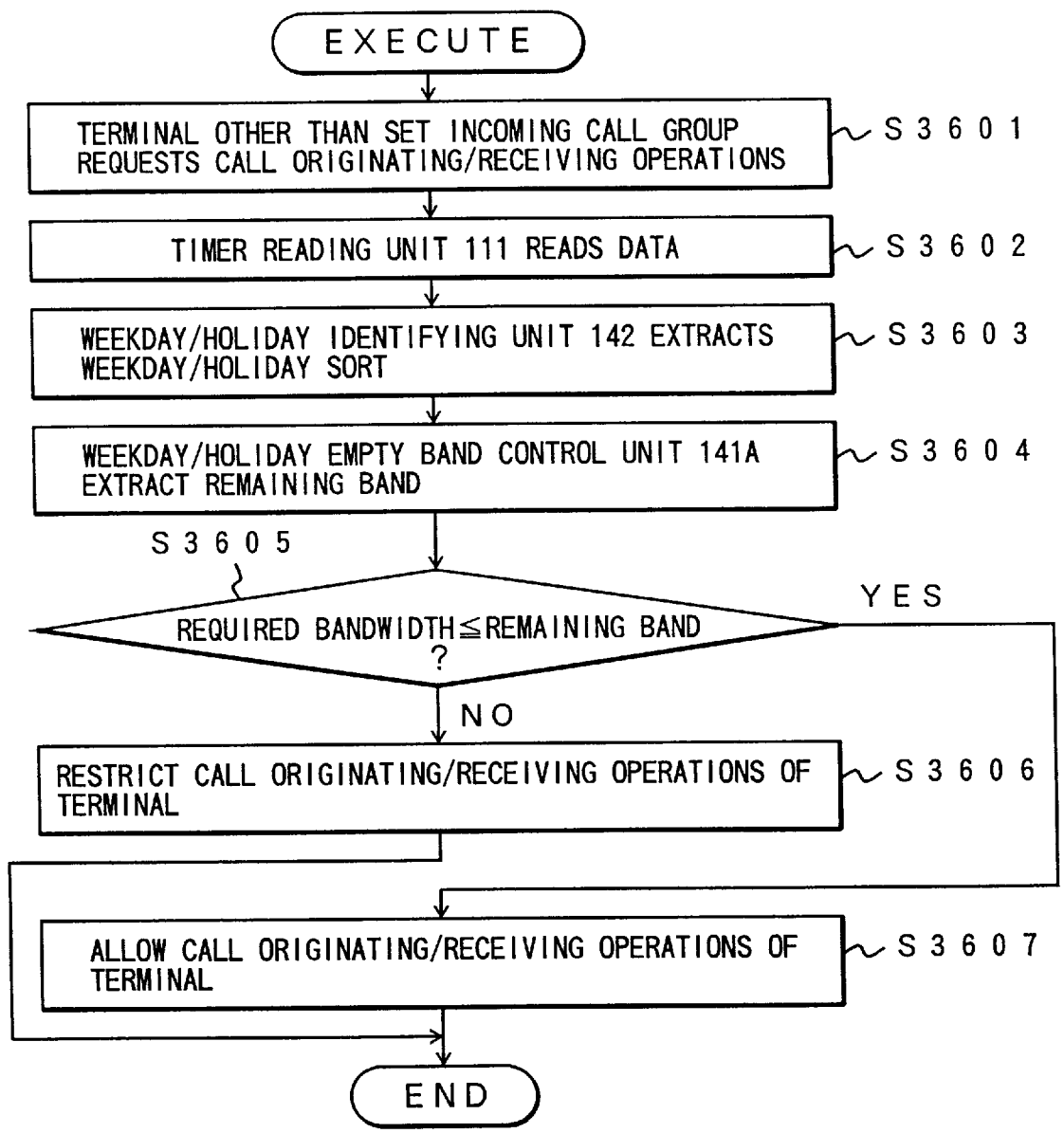
FIG. 36 is a flow chart for representing operations performed in the ninth embodiment.
Figure 37:
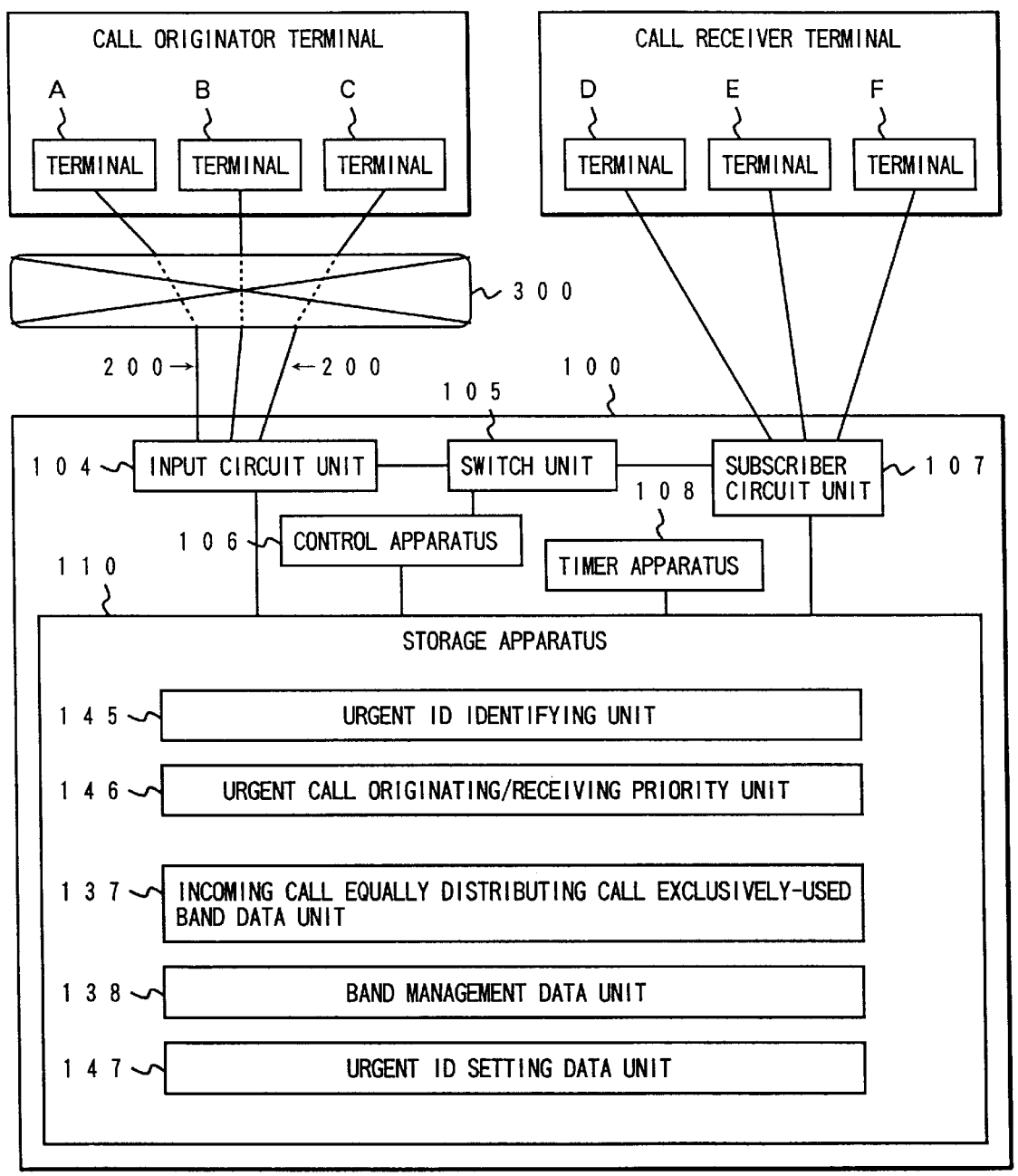
FIG. 37 is a structural diagram of a tenth embodiment mode.

FIG. 36 is a flow chart for indicating operations executed in the ninth embodiment.

First, it is now assumed that the call originating/receiving request is issued from the terminal other than the incoming call group set to the incoming call equally distributing management data unit 117 (step 3601). Next, the timer reading unit 111 reads out the present time from the timer apparatus 108 (step 3602).

Subsequently, the weekday/holiday identifying unit 142 retrieves the weekday/holiday data unit 144 by employing the date as an index to thereby extract the weekday/holiday sort (step 3603).

Then, the weekday/holiday empty band control unit 141a performs the process operations of the following items 1) to 3) at a step 3604. 1). When the weekday/holiday identifying unit 142 identifies that the read date corresponds to the weekday, the exclusively used bandwidth set for the weekday is read out from the weekday/holiday incoming call equally distributing call exclusively-used band data unit 143. 2). When the weekday/holiday identifying unit 142 identifies that the read date corresponds to the holiday, the exclusively used bandwidth set for the holiday is read out from the weekday/holiday incoming call equally distributing call exclusively-used band data unit 143. 3). A summation value of the exclusively used bandwidths read out in the item 1) or 2) is subtracted from the empty bandwidth set to the band management data unit 138, so that the remaining bandwidth is obtained.

In this case, a judgment is made as to whether or not the bandwidth (required bandwidth) required by the terminal other than the incoming call group is not more than remaining bandwidth (step 3605).

When it is judged "NO" (namely, required bandwidth>remaining bandwidth) at the step 3605, the call originating/receiving operations from the terminal other than the incoming call group are restricted (step 3606).

When it is judged "YES" (namely, required bandwidth≦remaining bandwidth) at the step 3605, the call originating/receiving operations from the terminal other than the incoming call group are allowed (step 3607).

EMBODIMENT 10
(ARRANGEMENT OF TENTH EMBODIMENT)

An ATM switching system according to a tenth embodiment is arranged by adding functions to those of the seventh embodiment. FIG. 36 is a diagram for showing an arrangement of the tenth embodiment. It should be noted that although the constructive elements of the seventh embodiment are partially omitted in this drawing, the functions thereof are provided. Also, the same reference numerals of FIG. 26 employed in the first embodiment are used to denote the same or similar constructive elements in this embodiment.

The ATM switching apparatus 100 stores therein an urgent ID identifying unit 145 and an urgent call originating/receiving operation priority unit 146, which are realized as a program, and stores therein an incoming call equally distributing call exclusively-used band data unit 137, a band management data unit 138, and an urgent ID setting data unit 147, which are realized as data.

Figure 38:
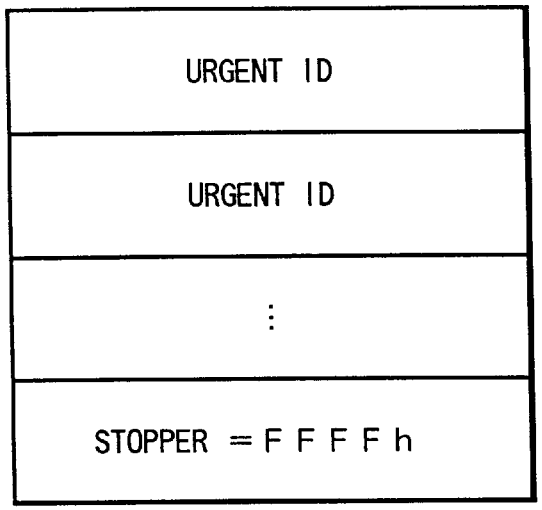
FIG. 38 is a data structural diagram for an urgent ID setting data unit of the tenth embodiment.

The urgent ID identifying unit 145 compares a terminal ID registered in the urgent ID setting data unit 147 with a terminal ID (call receiving ID of call receiver terminal). FIG. 38 shows a data structure of the urgent ID setting data unit 147. As indicated in this drawing, in this urgent ID setting data unit 147, an FFFFh is set which may function as a stopper value for indicating an end of a retrieve position, and further a plurality of urgent IDs are set.

When the urgent call originating/receiving operation priority unit 146 checks only an empty bandwidth of the band management data unit 138 when the urgent ID identifying unit identifies the terminal ID with the other terminal ID as being coincident, and secures the band with a priority even in the exclusively used band set to the incoming call equally distributing call exclusively-used band data unit 137.

(OPERATIONS BY TENTH EMBODIMENT)

A description will now be made of operations performed in the tenth embodiment.

Figure 39:
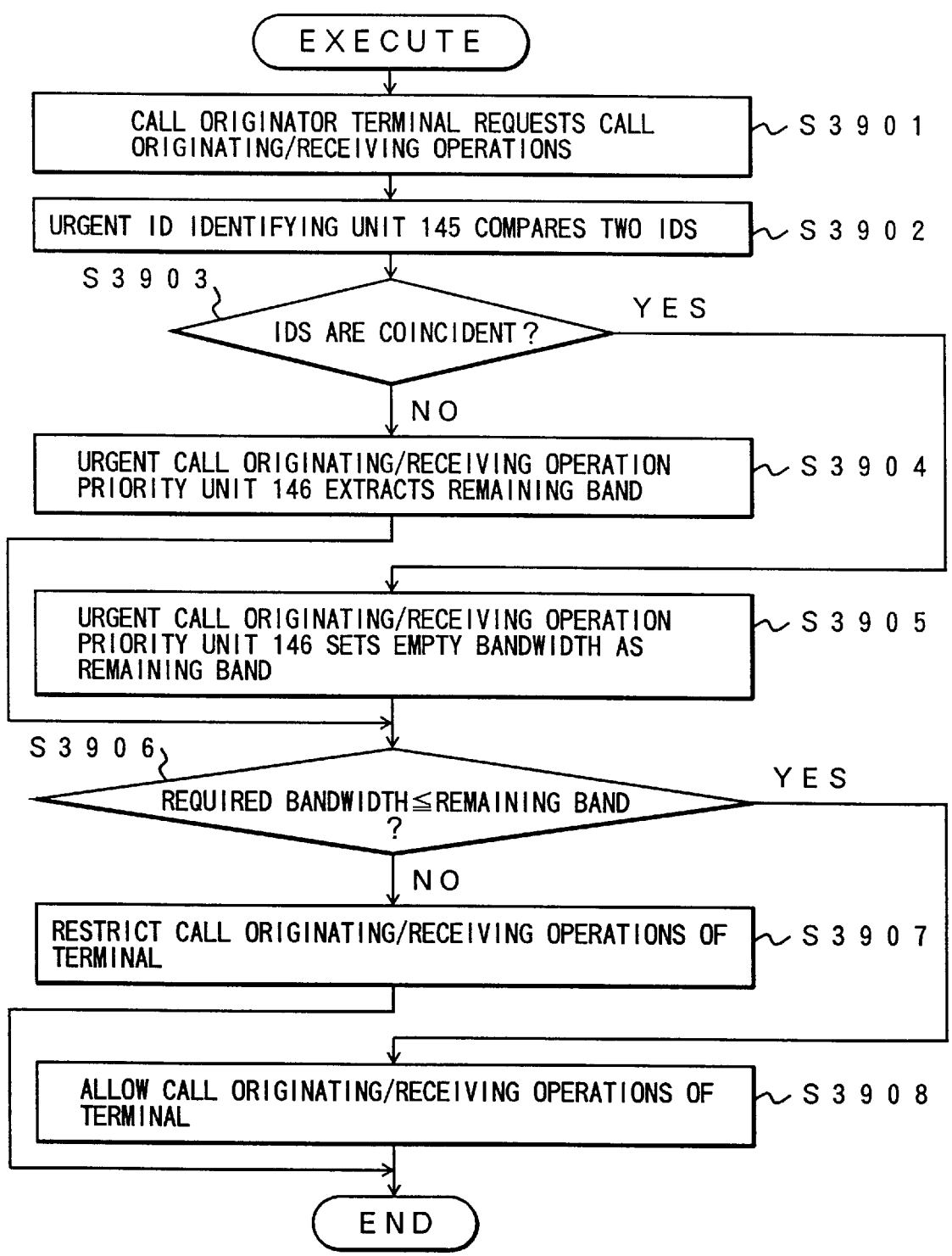
FIG. 39 is a flow chart for representing operations performed in the tenth embodiment.

FIG. 39 is a flow chart for indicating operations of the tenth embodiment.

First, it is now assumed that the call originating/receiving requests are issued from the terminals D to F stored in the subscriber circuit unit 107 (step 3901).

Next, the urgent ID identifying unit 145 compares the terminal ID of a terminal for originating/receiving a call with the terminal ID registered into the urgent ID setting data unit 147 (step 3902).

As a result of the comparison at the step 3902, when the two terminal IDs are not coincident with each other (namely, a route of "NO" at step 3903), the urgent call originating/receiving operation priority unit 146 executes the following process operations 1) to 3) at a step 3904. That is, 1) the exclusively used bandwidth is read out from the incoming call equally distributing call exclusively-used band data unit 137. 2) A summation value of the exclusively used bandwidths read at the item 1) is subtracted from the empty bandwidth set to the band management data unit 138 to thereby extract the remaining bandwidth.

In the case that these two terminal IDs are coincident with each other as a result of the comparison at the step 3902 (namely, route of "YES" at step 3903), the urgent call originating/receiving operation priority unit 146 sets the empty bandwidth of the band management data unit 138 as the remaining band (step 3905).

After the process operations defined at the steps 3904 and 3905 have been executed, a judgement is made as to whether or not the bandwidth (required bandwidth) required by the terminal for issuing the call originating/receiving request at the step 3901 is not more than the remaining bandwidth (step 3906).

When it is judged "NO" (namely, required bandwidth>remaining bandwidth) at the step 3906, the call originating/receiving operations from the terminal other than the incoming call group are restricted (step 3907).

When it is judged "YES" (namely, required bandwidth<remaining bandwidth) at the step 3906, the call originating/receiving operations from the terminal other than the incoming call group are allowed (step 3908).

EMBODIMENT 11

(ARRANGEMENT OF ELEVENTH EMBODIMENT)

Figure 40:
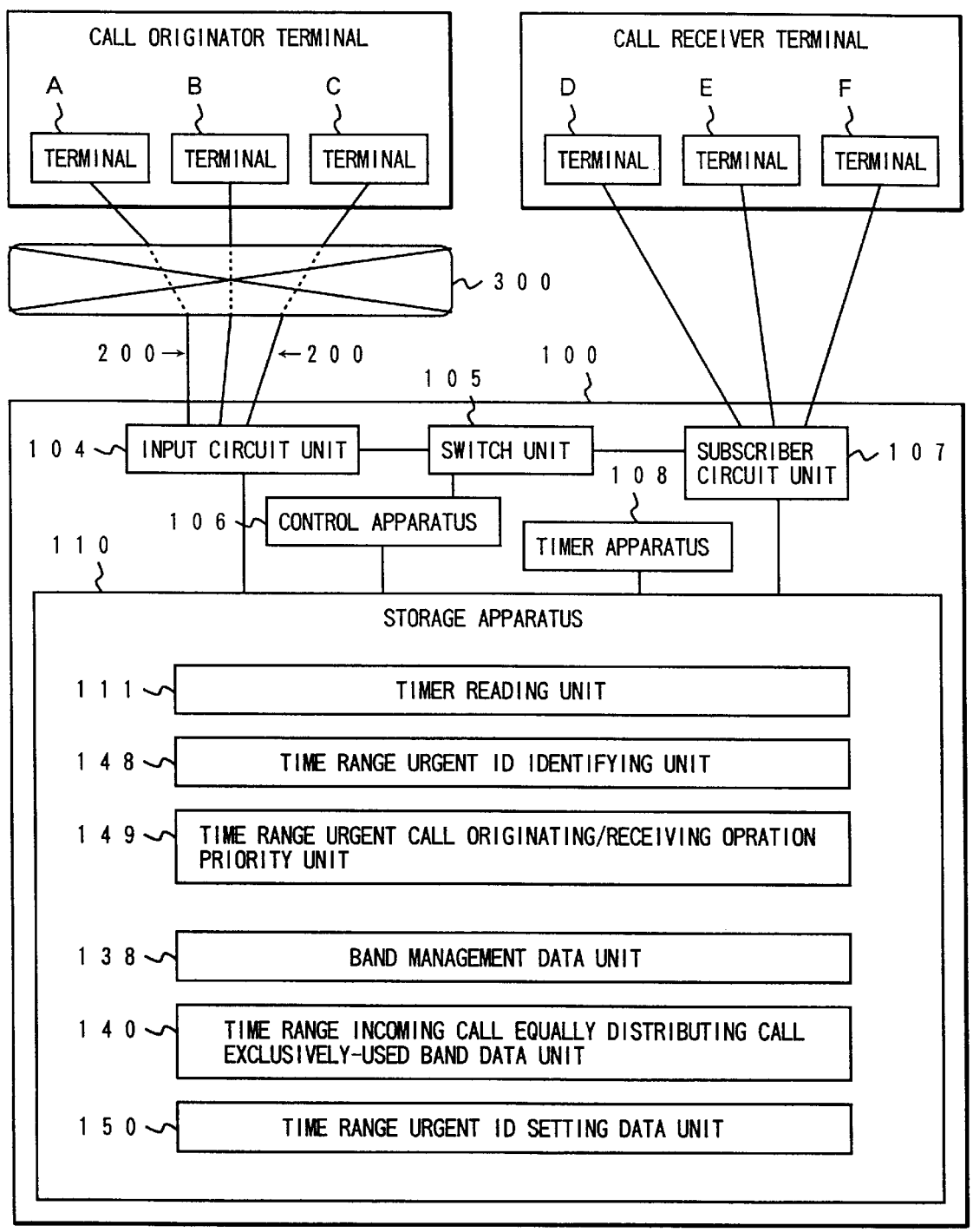
FIG. 40 is a structural diagram of an eleventh embodiment mode.

An ATM switching system according to an eleventh embodiment is arranged by adding functions to those of the tenth embodiment. FIG. 40 is a diagram for showing an arrangement of the eleventh embodiment. It should be noted that although the constructive elements of the tenth embodiment are partially omitted in this drawing, the functions thereof are provided. Also, the same reference numerals of FIG. 36 employed in the tenth embodiment are used to denote the same or similar constructive elements in this embodiment.

The ATM switching apparatus 100 stores therein a timer reading unit 111, a time range urgent ID identifying unit 148 and a time range urgent call originating/receiving operation priority unit 149, which are realized as a program, and stores therein a time range incoming call equally distributing call exclusively-used band data unit 140, a band management data unit 138, and a time range urgent ID setting data unit 150, which are realized as data.

Figure 41:
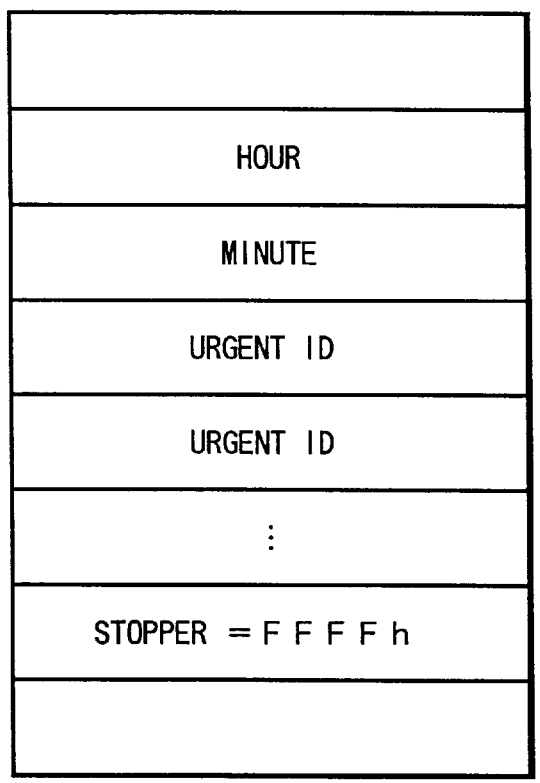
FIG. 41 is a data structural diagram for a time range urgent ID setting data unit of the eleventh embodiment.

The time range urgent ID identifying unit 148 compares a terminal ID registered corresponding to the present time in the time range urgent ID setting data unit 150 with the terminal ID of the call originator terminal (call receiving ID of call receiver terminal). FIG. 41 shows a data structure of the time range urgent ID setting data unit 150. As indicated in this drawing, in this time range urgent ID setting data unit 150, an FFFFh is set which may function as a stopper value for indicating an end of a retrieve position, and further an hour, a minute, and an effective urgent ID after the time indicated by "hour" and "minute".

When the time range urgent call originating/receiving operation priority unit 149 checks only an empty bandwidth of the band management data unit 138 when the time range urgent ID identifying unit 148 identifies the terminal ID with the other terminal ID as being coincident, and secures the band with a priority even in the exclusively used band set to the time range incoming call equally distributing call exclusively-used band data unit 140.

(OPERATIONS BY ELEVENTH EMBODIMENT)

A description will now be made of operations performed in the eleventh embodiment.

Figure 42:
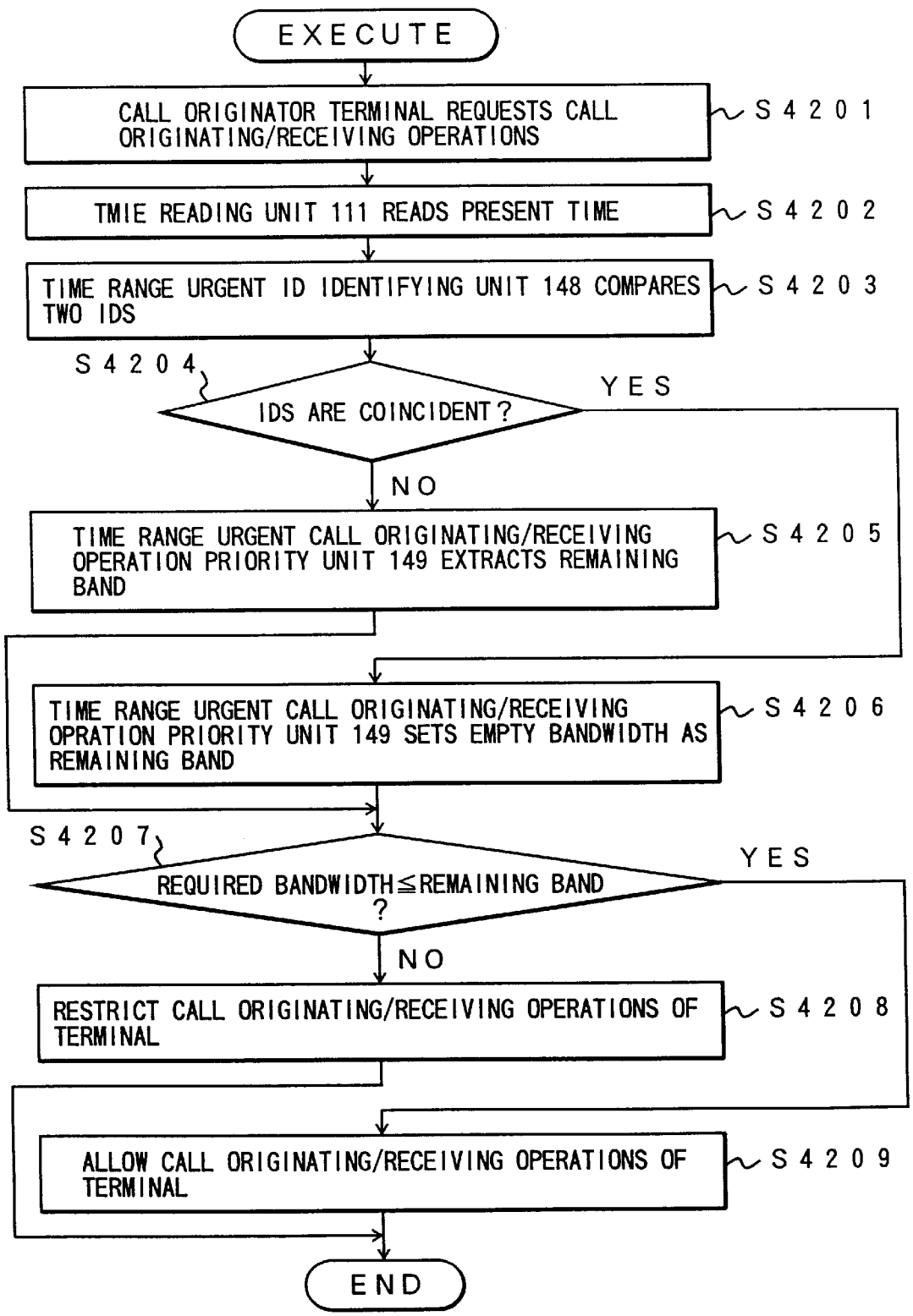
FIG. 42 is a flow chart for representing operations performed in the eleventh embodiment.

FIG. 42 is a flow chart for indicating operations of the eleventh embodiment.

First, it is now assumed that the call originating/receiving requests are issued from the terminals D to F stored in the subscriber circuit unit 107 (step 4201).

Then, the timer reading unit 111 reads out the present time from the timer apparatus 108 (step 4202).

Next, the time range urgent ID identifying unit 148 compares the terminal ID of a terminal for originating/receiving a call with the terminal ID registered into the time range urgent ID setting data unit 150 (step 4203).

As a result of the comparison at the step 4203, when the two terminal IDs are not coincident with each other (namely, a route of "NO" at step 4204), the time range urgent call originating/receiving operation priority unit 149 executes the following process operations 1) to 3) at a step 4205. That is, 1) the exclusively used bandwidth is read out from the time range incoming call distributing call exclusively-used band data unit 140. 2) A summation value of the exclusively used bandwidths read at the item 1) is subtracted from the empty bandwidth set to the band management data unit 138 to thereby extract the remaining bandwidth.

In the case that these two terminal IDs are coincident with each other as the comparison result at the step 4203 (namely, route of "YES" at step 4204), the time range urgent call originating/receiving operation priority unit 149 sets the empty bandwidth of the band management data unit 138 as the remaining band (step 4206).

After the process operations defined at the steps 4205 and 4206 have been executed, a judgement is made as to whether or not the bandwidth (required bandwidth) required by the terminal for issuing the call originating/receiving request at the step 4201 is not more than the remaining bandwidth (step 4207).

When it is judged "NO" (namely, required bandwidth>remaining bandwidth) at the step 4207, the call originating/receiving operations from the terminal other than the incoming call group are restricted (step 4208).

When it is judged "YES" (namely, required bandwidth≦remaining bandwidth) at the step 4207, the call originating/receiving operations from the terminal other than the incoming call group are allowed (step 4209).

EMBODIMENT 12

(ARRANGEMENT OF TWELFTH EMBODIMENT)

Figure 43:
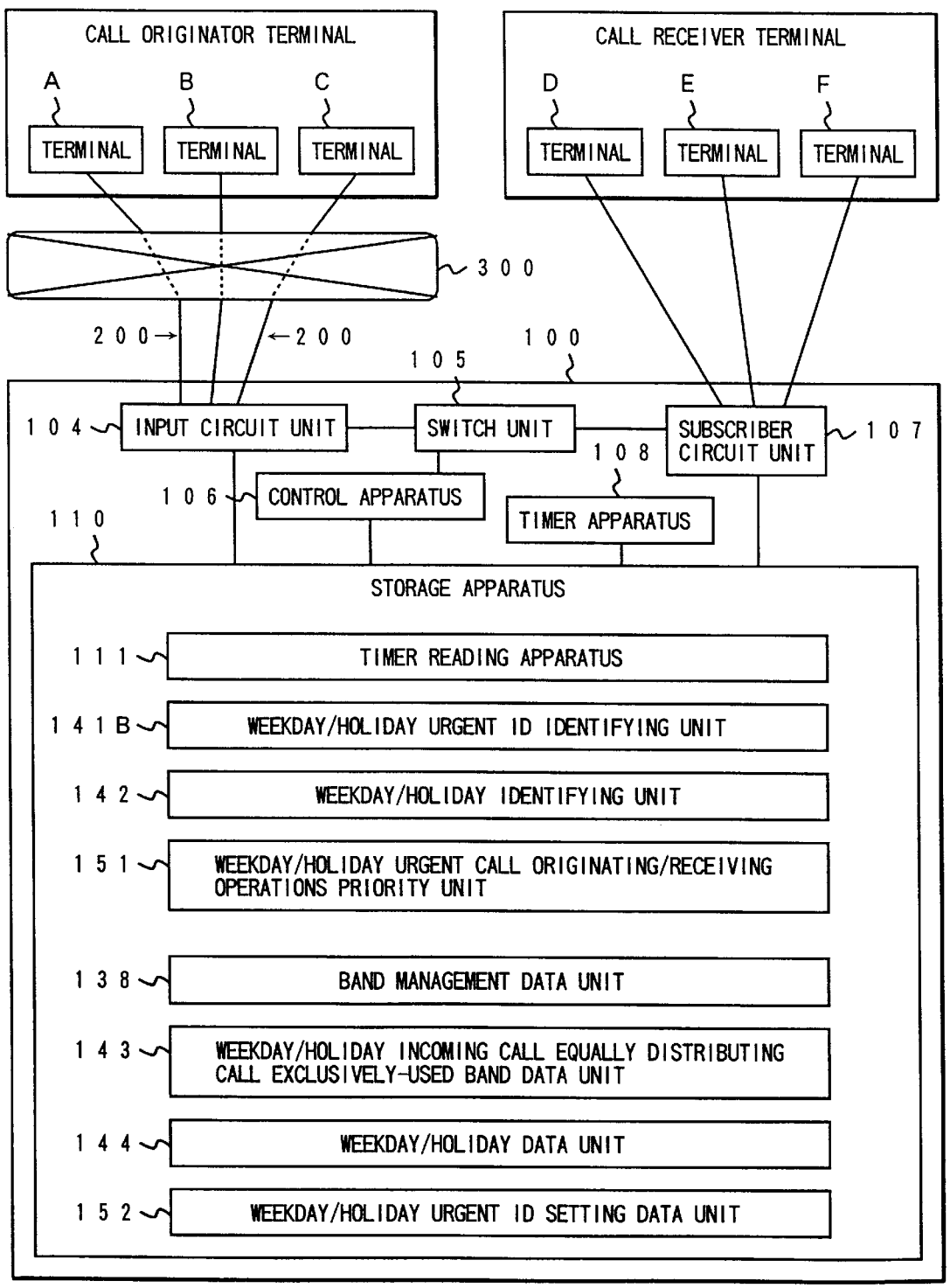
FIG. 43 is a structural diagram of a twelfth embodiment mode.

An ATM switching system according to a twelfth embodiment is arranged by adding functions to those of the first embodiment. FIG. 43 is a diagram for showing an arrangement of the twelfth embodiment. It should be noted that although the constructive elements of the tenth embodiment are partially omitted in this drawing, the functions thereof are provided. Also, the same reference numerals of FIG. 36 employed in the tenth embodiment are used to denote the same or similar constructive elements in this embodiment.

The ATM switching apparatus 100 stores therein a timer reading unit 111, a weekday/holiday urgent ID identifying unit 141*b*, a weekday/holiday identifying unit 142, and a weekday/holiday urgent call originating/receiving operation priority unit 151, which are realized as a program, and further stores therein, a band management data unit 138, a weekday/holiday incoming call equally distributing call exclusively-used band data unit 143, a weekday/holiday data unit 144, and a weekday/holiday urgent ID setting data unit 152, which are realized as data.

The weekday/holiday identifying unit 142 identifies whether the read date corresponds to the weekday or holiday based upon the date read from the timer apparatus 108 and the weekday/holiday data stored in the weekday/holiday data unit 144.

Figure 44:
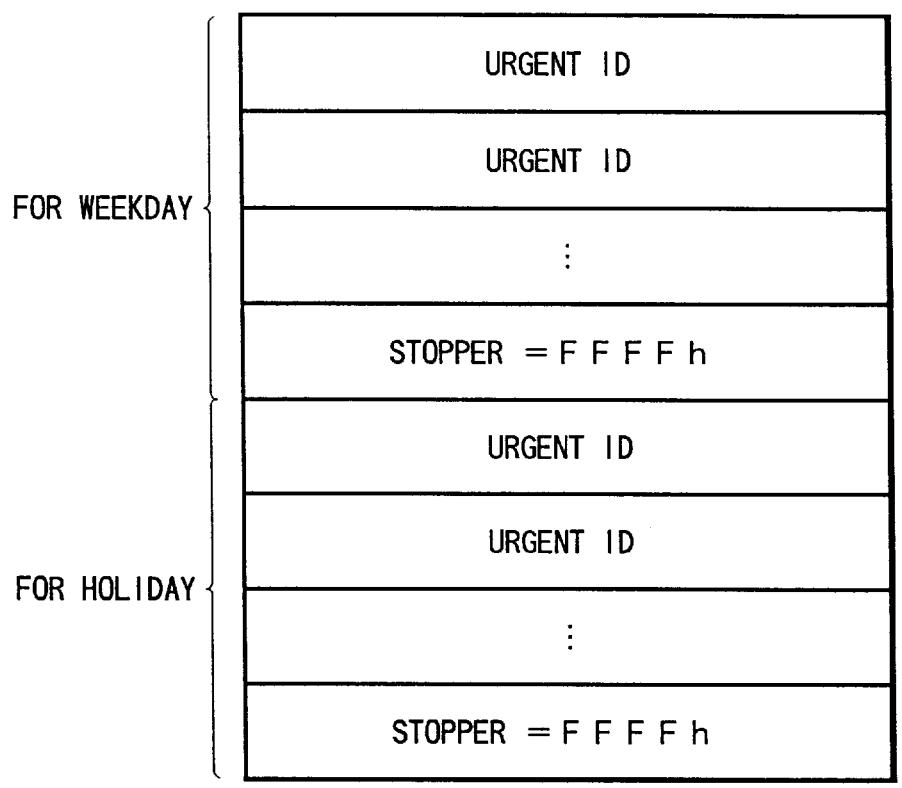
FIG. 44 is a data structural diagram for a weekday/holiday urgent ID setting data unit of the twelfth embodiment.

The weekday/holiday urgent ID identifying unit 141*b* compares the terminal ID of the terminal from which the call originating/receiving operation is carried out with the terminal ID registered into the weekday/holiday urgent ID setting data unit 152. FIG. 44 indicates a data structure of the weekday/holiday urgent ID setting data unit 152. As shown in this drawing, the urgent ID is subdivided into the weekday urgent ID and the holiday urgent ID, which are set to the weekday/holiday urgent ID setting data unit 152.

The weekday/holiday identifying unit 142 retrieves the weekday/holiday data unit 144 by employing the date as an index to thereby extract the weekday/holiday sort.

The weekday/holiday urgent call originating/receiving operation priority unit 151 performs the following process operations 1) to 2). That is, 1) the exclusively used bandwidth corresponding to the weekday/holiday is read out from the weekday/holiday incoming call equally distributing call exclusively-used band data unit 143. 2) A summation amount of the exclusively used bandwidth read in the item 1) is subtracted from the empty bandwidth of the band management data unit 138 to thereby obtain the remaining bandwidth.

(OPERATIONS BY TWELFTH EMBODIMENT)

A description will now be made of operations performed in the twelfth embodiment.

Figure 45:
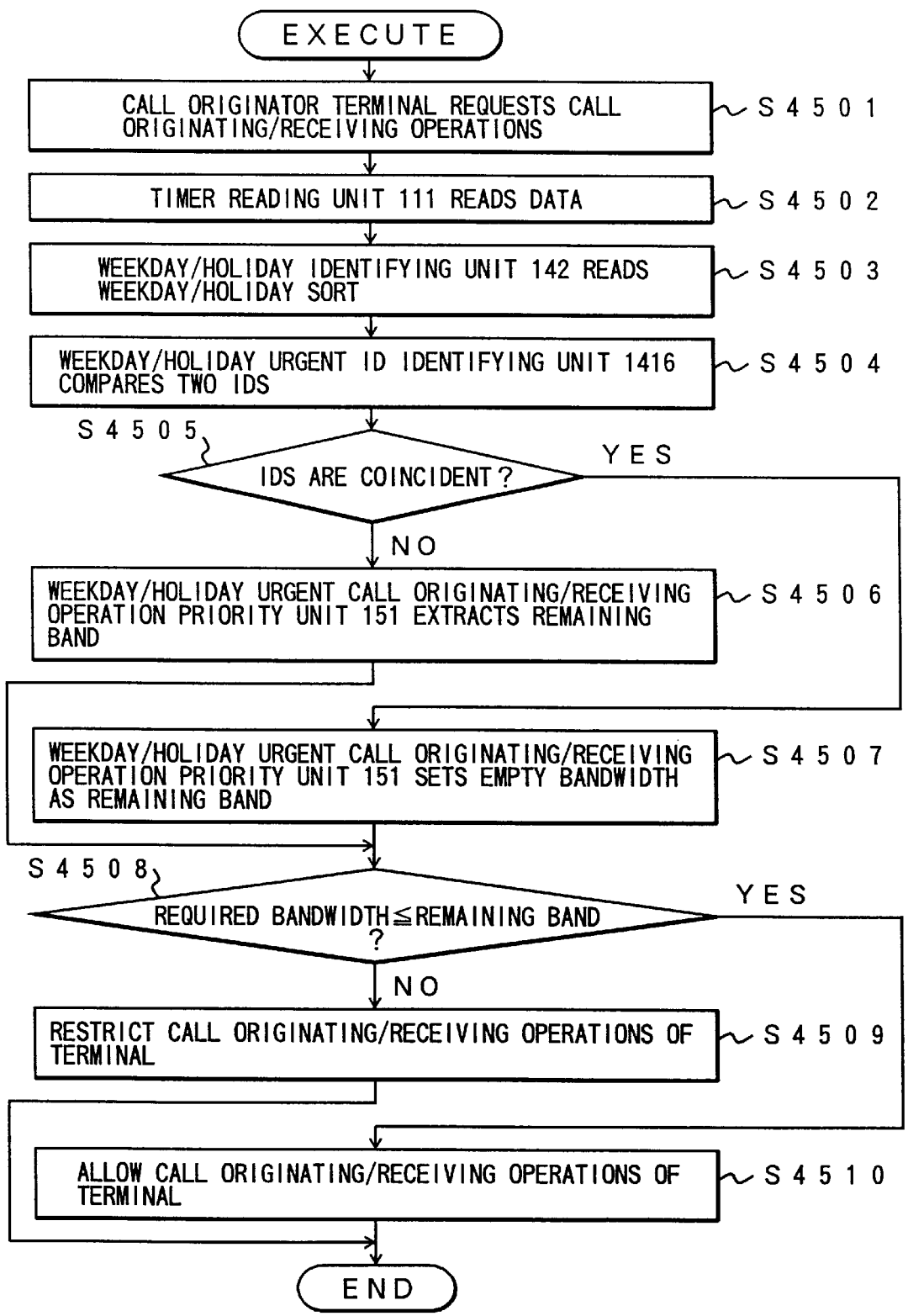
FIG. 45 is a flow chart for representing operations performed in the twelfth embodiment.

FIG. 45 is a flow chart for indicating operations of the twelfth embodiment.

First, it is now assumed that the call originating/receiving requests are issued from the terminals D to F stored in the subscriber circuit unit 107 (step 4501).

Next, the timer reading unit 111 reads out the present time from the timer apparatus 108 (step 4502).

Then, the weekday/holiday identifying unit 142 retrieves the weekday/holiday data unit 144 based upon the date to extract the weekday/holiday sort (step 4503).

Next, the weekday/holiday urgent ID identifying unit 141 compares the terminal ID of a terminal for originating/receiving a call with the terminal ID registered into the weekday/holiday urgent ID setting data unit 152 (step 4504).

As a result of comparison at the step 4504, when the two terminal IDs are not coincident with each other (namely, a route of "NO" at step 4505), the weekday/holiday urgent call originating/receiving operation priority unit 151 executes the following process operations 1) to 2) at a step 4506. That is, 1) the exclusively used bandwidth corresponding to the weekday/holiday is read out from the weekday/holiday incoming call distributing call exclusively-used band data unit 143. 2) A summation value of the exclusively used bandwidths read at the item 1) is subtracted from the empty bandwidth set to the band management data unit 138 to thereby extract the remaining bandwidth.

In the case that these two terminal IDs are coincident with each other as the comparison result at the step 4505 (namely, route of "YES" at step 4505), the weekday/holiday urgent call originating/receiving operation priority unit 151 sets the empty bandwidth of the band management data unit 138 as the remaining band (step 4507).

After the process operations defined at the steps 4506 and 4507 have been executed, a judgement is made as to whether or not the bandwidth (required bandwidth) required by the terminal for issuing the call originating/receiving request at the step 4501 is not more than the remaining bandwidth (step 4508).

When it is judged "NO" (namely, required bandwidth>remaining bandwidth) at the step 4508, the call originating/receiving operations from the terminal other than the incoming call group are restricted (step 4509).

When it is judged "YES" (namely, required bandwidth≦remaining bandwidth) at the step 4508, the call originating/receiving operations from the terminal other than the incoming call group are allowed (step 4510).

EMBODIMENT 13

(ARRANGEMENT OF THIRTEENTH EMBODIMENT)

Figure 46:
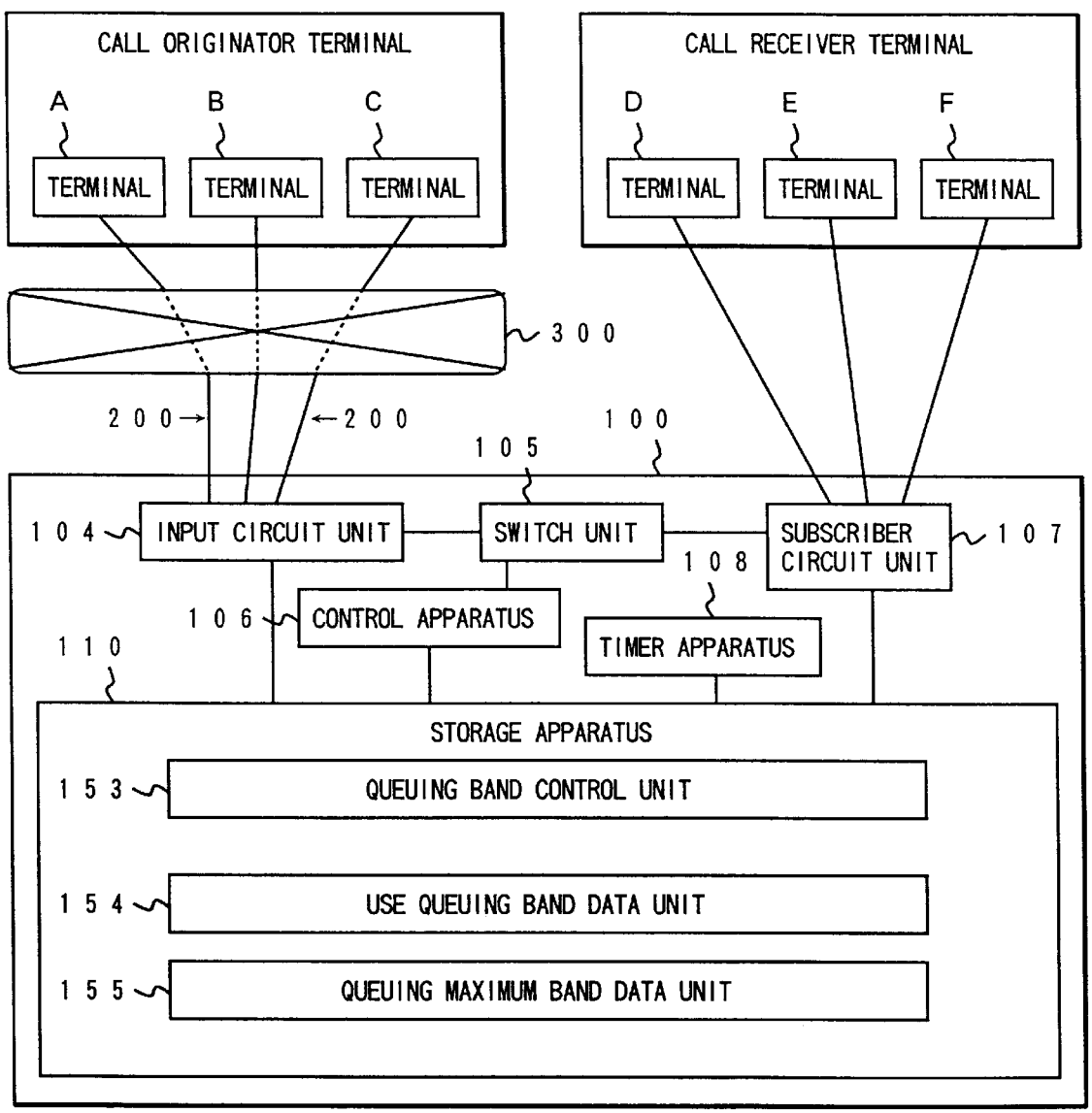
FIG. 46 is a structural diagram of a thirteenth embodiment mode.

An ATM switching system according to a thirteenth embodiment is arranged by adding functions to those of the sixth embodiment. FIG. 46 is a diagram for showing an arrangement of the thirteenth embodiment. It should be noted that although the constructive elements of the sixth embodiment are partially omitted in this drawing, the functions thereof are provided. Also, the same reference numerals of FIG. 22 employed in the sixth embodiment are used to denote the same or similar constructive elements in this embodiment.

An ATM switching apparatus 100 stores therein a queuing band control unit 153 which is accomplished as a program, and also stores therein a use queuing band data unit 154 and a queuing maximum band data unit 155, which are accomplished as data.

When the representative call receiver terminal set to the incoming call equally distributing management data unit 117 is brought into the queuing state, the queuing band control unit 153 performs the below-mentioned process operations 1) to 3). That is, 1) a bandwidth used by such a call under queuing state is read out from the use queuing band data unit 154. 2). A comparison is made between the maximum bandwidth set to the queuing maximum band data unit 155 and a summation value of the bandwidths read in the item 1) (namely, total use bandwidth). 3) When as a comparison result of the item 2), it becomes "maximum bandwidth"≦"total use bandwidth", the call originating/receiving operation of the terminal is restricted. Conversely, the call originating/receiving operation of the terminal is allowed.

Figure 47:
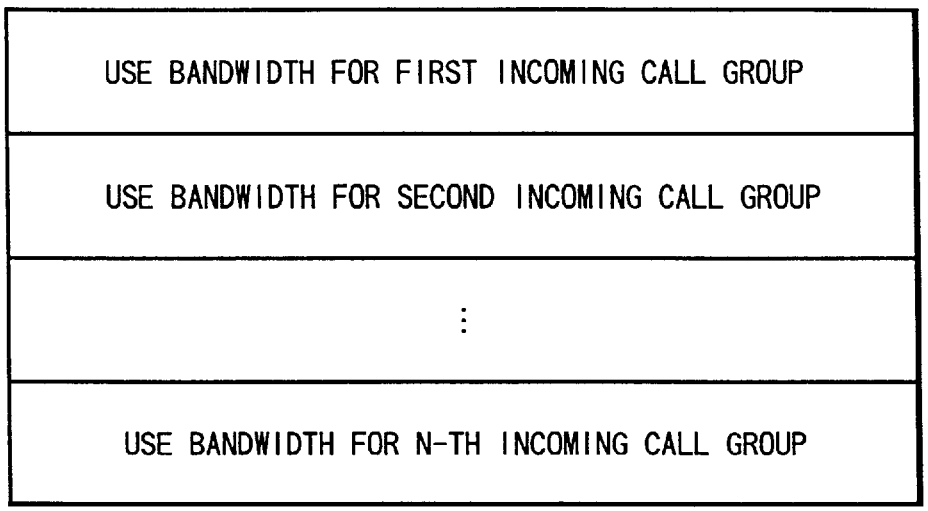
FIG. 47 is a data structural diagram for a use queuing band data unit of the thirteenth embodiment.

In this case, FIG. 47 represents a data structure of the use queuing band data unit 154. As indicated in this drawing, the bandwidths used in the incoming call groups are set into the use queuing band data unit 154 in every incoming call group.

Figure 48:
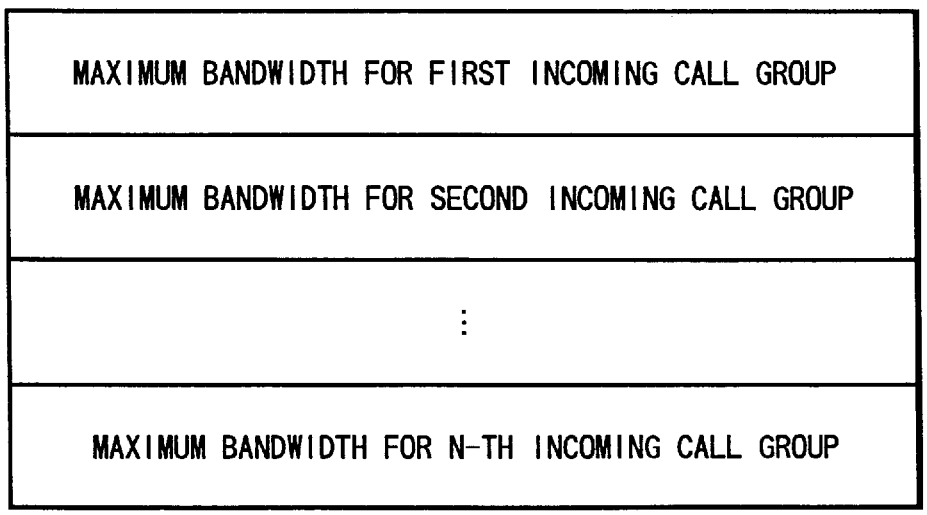
FIG. 48 is a data structural diagram for a queuing maximum band data unit of the thirteenth embodiment.

Also, FIG. 48 indicates a data structure of the queuing maximum band data unit 155. As shown in this drawing, the maximum bandwidths useable in the incoming call group are set to the queuing maximum band data unit 155 in every incoming call group.

(OPERATIONS BY THIRTEENTH EMBODIMENT)

Operations executed in the ATM switching system according to the thirteenth embodiment will now be explained.

Figure 49:
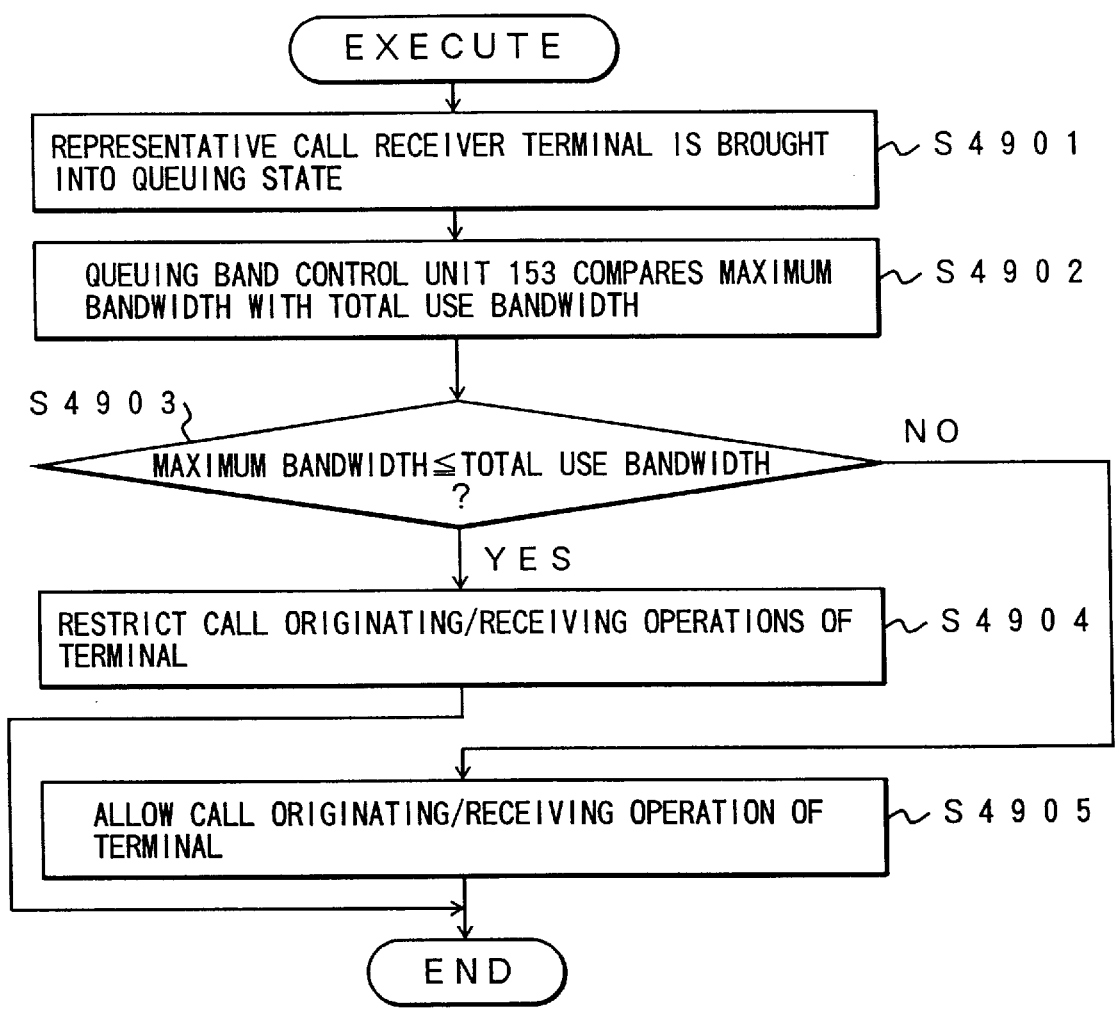
FIG. 49 is a flow chart for showing operations performed in the thirteenth embodiment.

FIG. 49 is a flow chart for denoting operations performed in the thirteenth embodiment.

First, it is now assumed that the representative call receiver terminal set to the incoming call equally distributing management data unit 117 is brought into the queuing state (step 4901).

Subsequently, the queuing band control unit 153 performs the following process operations 1) to 2) at a step 4902. 1). The bandwidth used by such a call under queuing state is read out from the use queuing band data unit 154. 2). The maximum bandwidth set to the queuing maximum band data unit 155 is compared with the summation value of the bandwidths read at the item 1) (total use bandwidth).

In such a case that as a comparison result obtained at a step 4902, it becomes "maximum bandwidth"≦"total use bandwidth" (namely, a route of "YES" at step 4903), the call originating/receiving operation of the terminal is restricted (step 4904).

In such a case that as a comparison result obtained at the step 4902, it becomes "maximum bandwidth">"total use bandwidth" (namely, a route of "NO" at step 4903), the call originating/receiving operation of the terminal is allowed (step 4905).

EMBODIMENT 14

(ARRANGEMENT OF FOURTEENTH EMBODIMENT)

Figure 50:
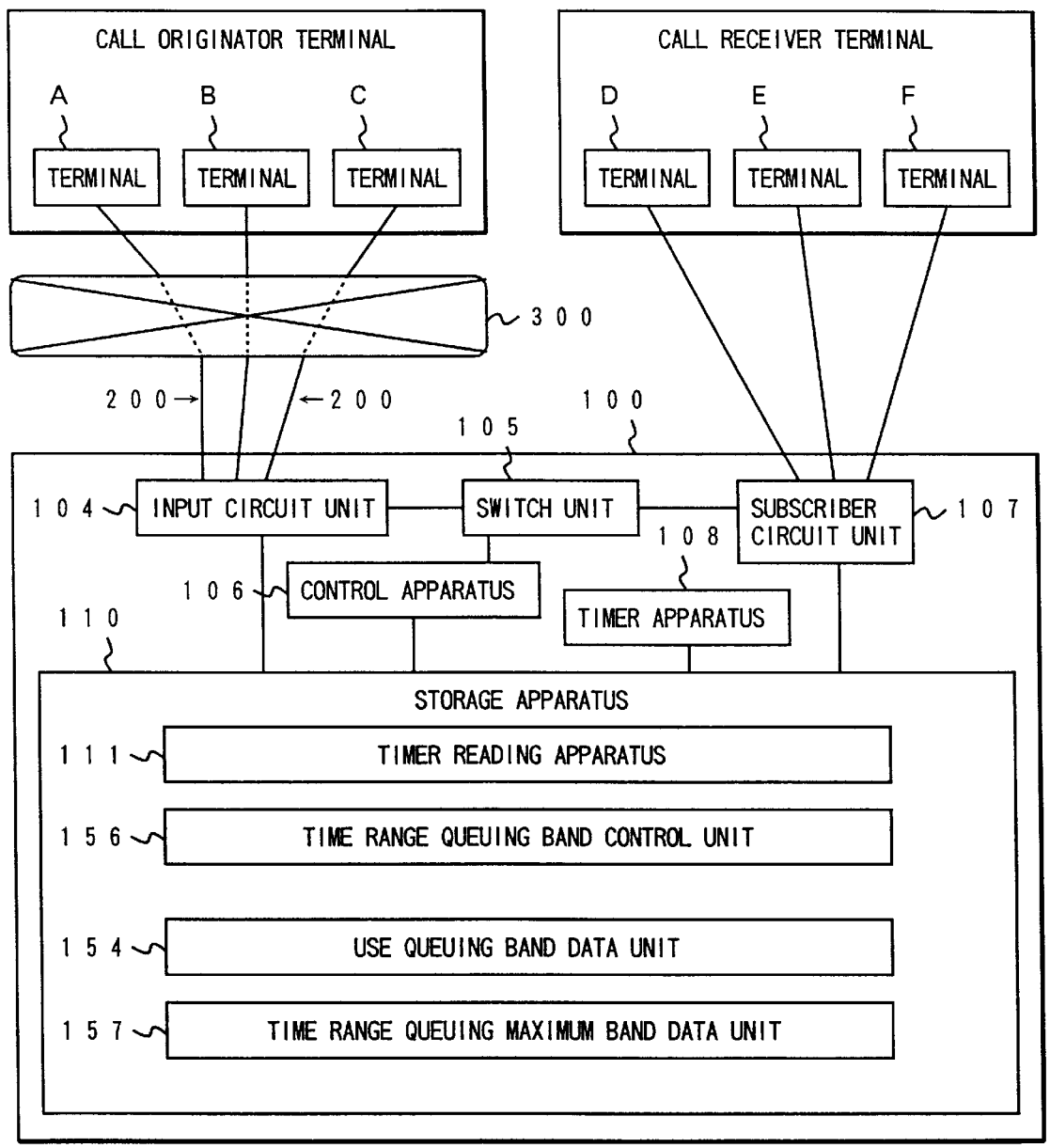
FIG. 50 is a structural diagram of a fourteenth embodiment mode.

An ATM switching system according to a fourteenth embodiment is arranged by adding functions to those of the fourteenth embodiment. FIG. 50 is a diagram for showing an arrangement of the fourteenth embodiment. It should be noted that although the constructive elements of the thirteenth embodiment are partially omitted in this drawing, the functions thereof are provided. Also, the same reference numerals of FIG. 46 employed in the thirteenth embodiment are used to denote the same or similar constructive elements in this embodiment.

An ATM switching apparatus 100 stores therein a timer reading apparatus 111, and a time range queuing band control unit 156 which are accomplished as a program, and also stores therein a time range use queuing band data unit 154 and a time range queuing maximum band data unit 157, which are accomplished as data.

The time range queuing band control unit 156 controls so that the maximum bandwidth is variable. The information used in this control is set to the time range queuing maximum band data unit 157.

The time range queuing band control unit 156 performs the below-mentioned process operations 1) to 3). That is, 1) a bandwidth used by a call under queuing state is read out from the use queuing band data unit 154. 2). A comparison is made between the maximum bandwidth set to the time range queuing maximum band data unit 157 and a summation value of the bandwidths read in the item 1) (namely, total use bandwidth). 3) When it becomes "maximum bandwidth">"total use bandwidth" as a comparison result of the item 2), the call originating/receiving operation of the terminal is restricted. Conversely, the call originating/receiving operation of the terminal is allowed.

In this case, FIG. 51 represents a data structure of the time range queuing maximum band data unit 157. As indicated in this drawing, the bandwidths used in the incoming call groups are set into the time range queuing maximum band data unit 157 after the time indicated by "hour" and "minute", and also "hour" and "minute" are set therein.

(OPERATIONS BY FOURTEENTH EMBODIMENT)

Operations executed in the ATM switching system according to the fourteenth embodiment will now be explained.

Figure 52:
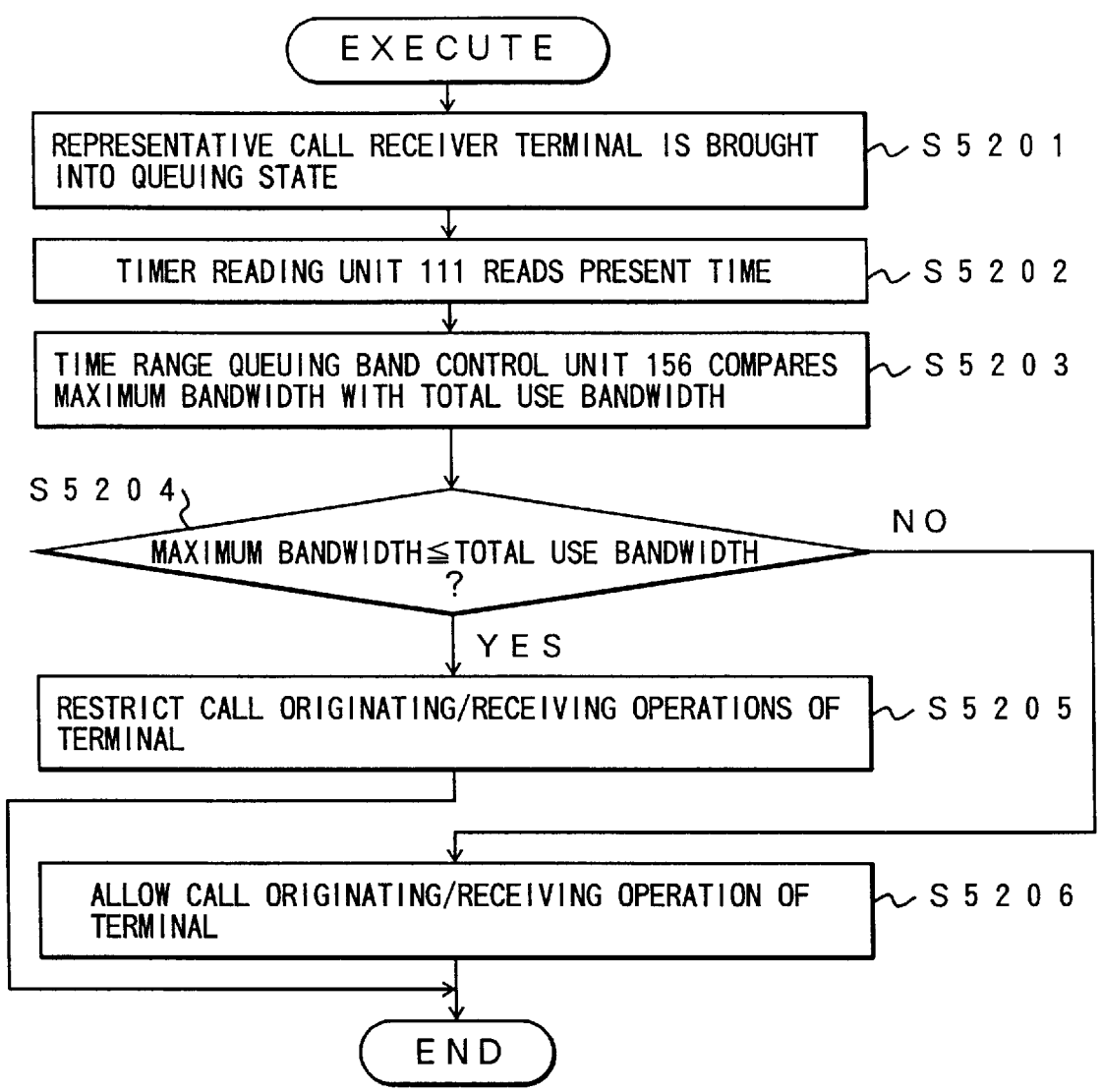
FIG. 52 is a flow chart for showing operations performed in the fourteenth embodiment.

FIG. 52 is a flow chart for denoting operations performed in the fourteenth embodiment.

First, it is now assumed that the representative call receiver terminal set to the incoming call equally distributing management data unit 117 is brought into the queuing state (step 5201).

Next, the timer reading unit 111 reads out the present time from the timer apparatus 108 (step 5202).

Subsequently, the time range queuing band control unit 156 performs the following process operations 1) to 2) at a step 5203. 1). The bandwidth used by such a call under queuing state is read out from the use queuing band data unit 154. 2). The maximum bandwidth set to the queuing maximum band data unit 155 is compared with the summation value of the bandwidth read at the item 1) (total use bandwidth).

In such a case that as a comparison result obtained at a step 5203, it becomes "maximum bandwidth"≦"total use bandwidth" (namely, a route of YES at step 5204),the call originating/receiving operation of the terminal is restricted (step 5205).

In such a case that as a comparison result obtained at the step 5203, it becomes "maximum bandwidth">"total use bandwidth" (namely, a route of NO at step 5204 ), the call originating/receiving operation of the terminal is allowed (step 5206).

EMBODIMENT 15

(ARRANGEMENT OF FIFTEENTH EMBODIMENT)

Figure 53:
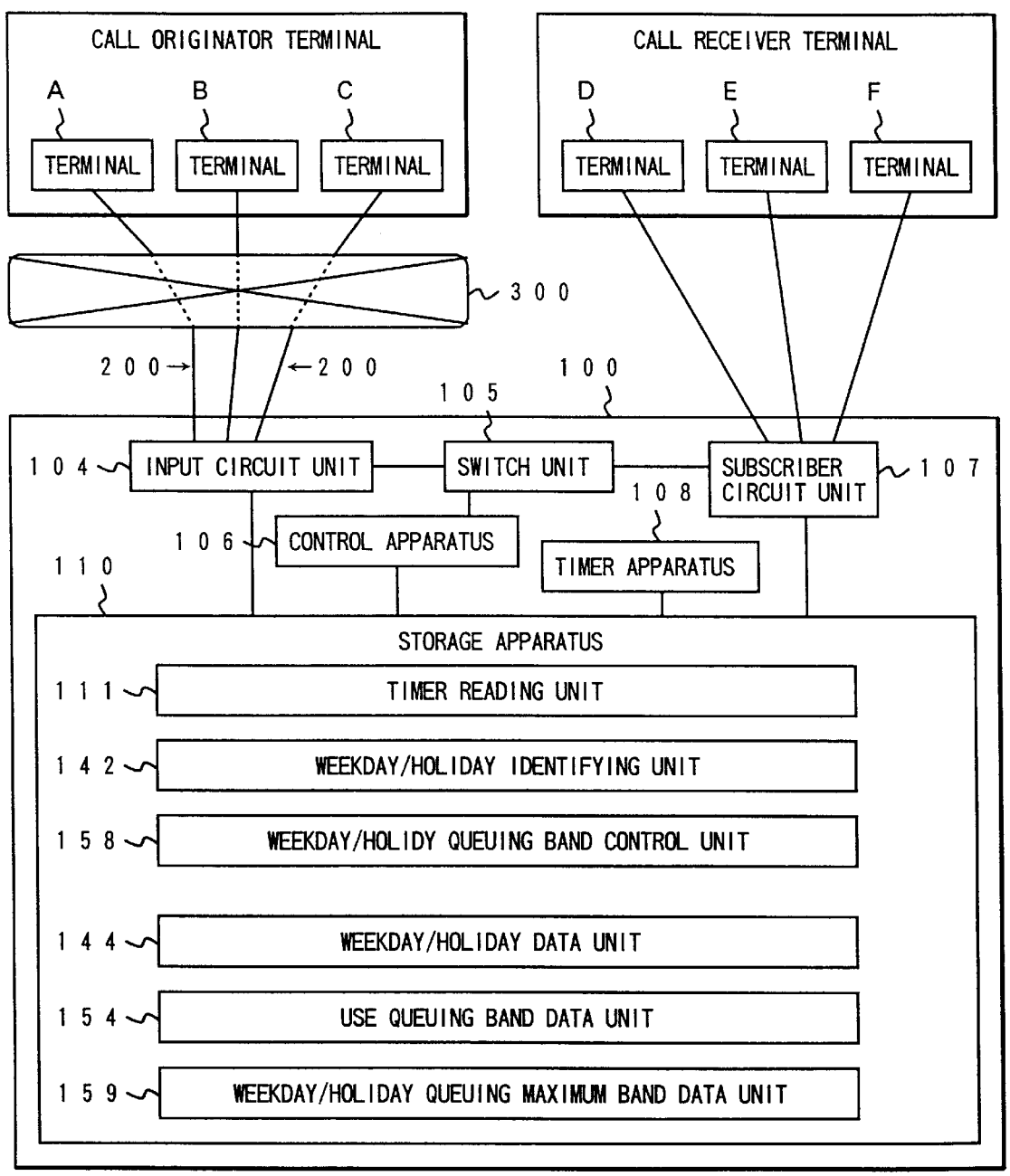
FIG. 53 is a structural diagram of a fifteenth embodiment mode.

An ATM switching system according to a fifteenth embodiment is arranged by adding functions to that of the thirteenth embodiment. FIG. 53 is a diagram for showing an arrangement of the fifteenth embodiment. It should be noted that although the constructive elements of the thirteenth embodiment are partially omitted in this drawing, the functions thereof are provided. Also, the same reference numerals of FIG. 46 employed in the thirteenth embodiment are used to denote the same or similar constructive elements in this embodiment.

The ATM switching apparatus 100 stores therein a timer reading unit 111, a weekday/holiday queuing band control unit 158, and a weekday/holiday identifying unit 142, which are realized as a program, and further stores therein a weekday/holiday use queuing band data unit 154, a weekday/holiday data unit 144, and a weekday/holiday queuing maximum band data unit 159 which are realized as data.

The weekday/holiday queuing band control unit 158 performs the process operations of the following items 1) to 5). 1). When the weekday/holiday identifying unit 142 identifies that the read date corresponds to the weekday, the maximum bandwidth set for the weekday is read out from the weekday/holiday queuing maximum band data unit 159. 2). When the weekday/holiday identifying unit 142 identifies that the read date corresponds to the holiday, the maximum bandwidth set for the holiday is read out from the weekday/holiday queuing maximum band data unit 159. 3) a bandwidth used by such a call under queuing state is read out from the use queuing band data unit 154. 4). A comparison is made between the maximum bandwidth read in the item 1) or 2) between a summation value of the bandwidth read in the item 1) (namely, total use bandwidth). 5) When as a comparison result of the item 4), it becomes maximum bandwidth>total use bandwidth, the call originating/receiving operation of the terminal is restricted. Conversely, the call originating/receiving operation of the terminal is allowed.

Figure 54:
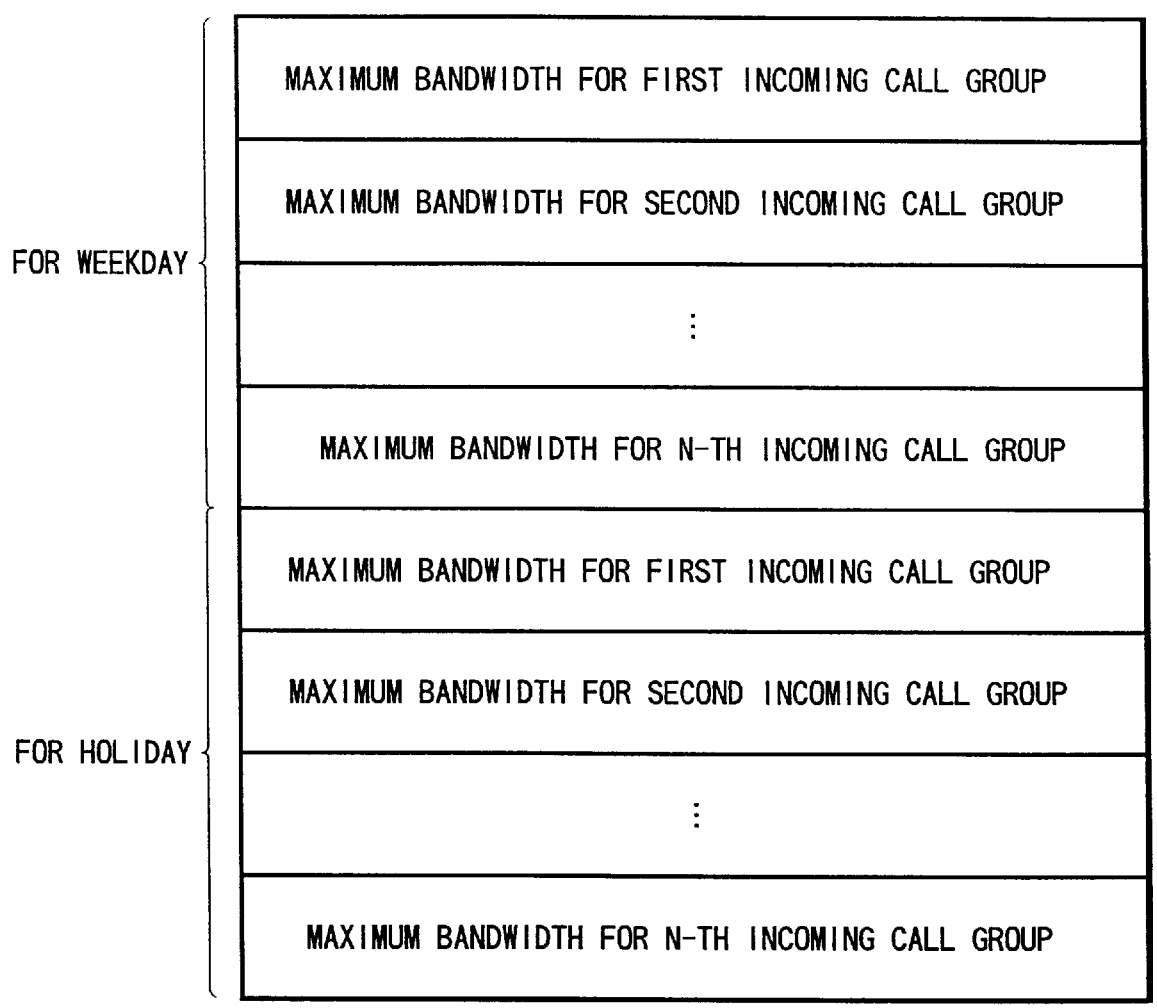
FIG. 54 is a data structural diagram for a weekday/holiday queuing maximum band data unit of the fifteenth embodiment.

FIG. 54 represents a data structure of the weekday/holiday queuing maximum band data unit 159. As shown in this drawing, the maximum bandwidth useable in the call receiver terminals are subdivided into the maximum bandwidth for the weekday and the maximum bandwidth for the holiday, which are then set into the weekday/holiday queuing maximum band data unit 159.

(OPERATIONS BY FIFTEENTH EMBODIMENT)

Operations executed in the fifteenth embodiment will now be described.

Figure 55:
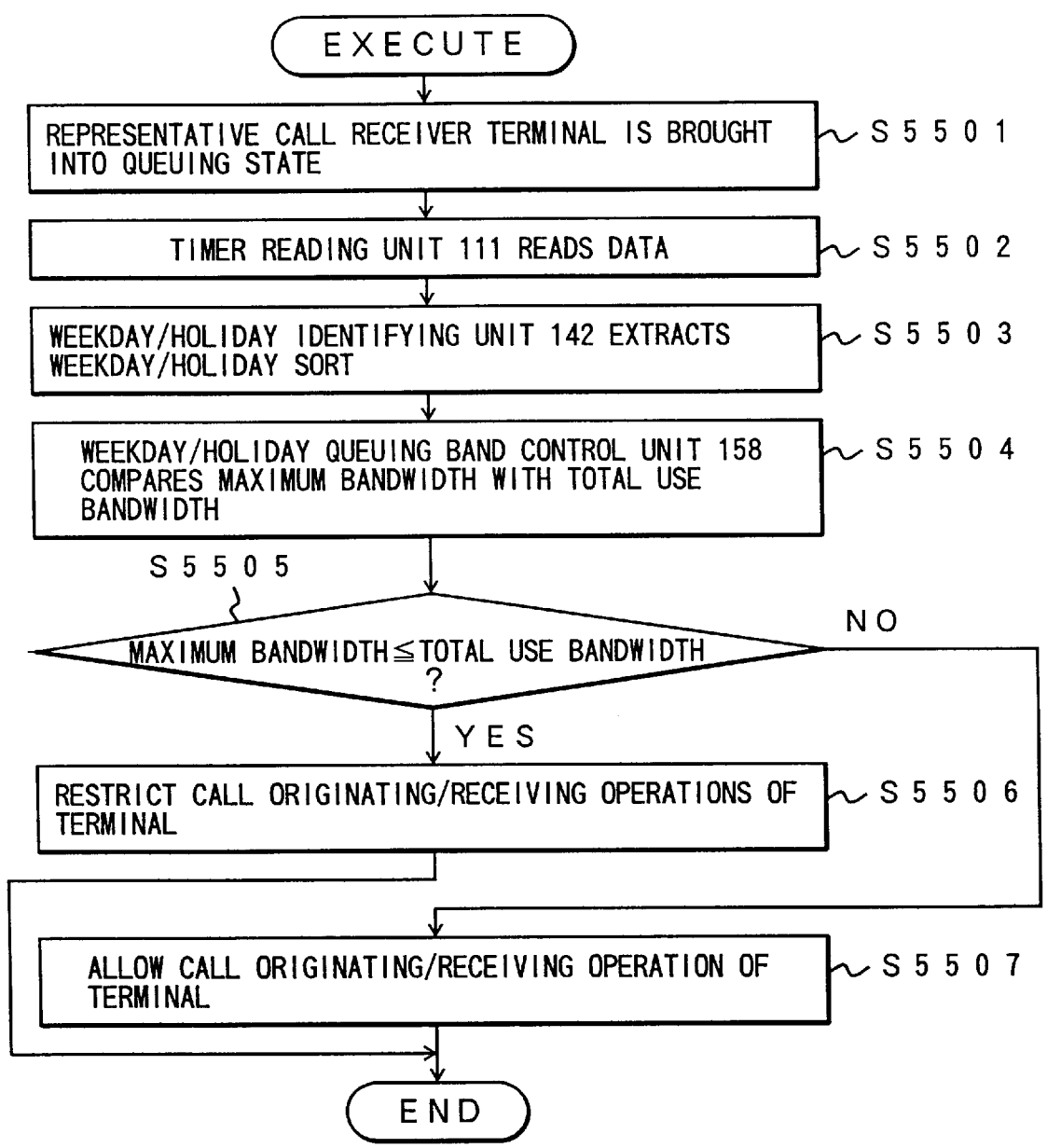
FIG. 55 is a flow chart for showing operations performed in the fifteenth embodiment.

FIG. 55 is a flow chart for indicating operations executed in the fifteenth embodiment.

First, it is now assumed that the call originating/receiving request is issued from the terminal other than the incoming call group set to the incoming call equally distributing management data unit 117 (step 5501). Next, the timer reading unit 111 reads out the present time from the timer apparatus 108 (step 5502).

Subsequently, the weekday/holiday identifying unit 142 retrieves the weekday/holiday data unit 144 by employing the date as an index to thereby extract the weekday/holiday sort (step 5503).

The weekday/holiday queuing band control unit 158 performs the process operations of the following items 1) to 4) at a step 5504. 1). When the weekday/holiday identifying unit 142 identifies that the read date corresponds to the weekday, the maximum bandwidth set for the weekday is read out from the weekday/holiday queuing maximum band data unit 159. 2). When the weekday/holiday identifying unit 142 identifies that the read date corresponds to the holiday, the maximum bandwidth set for the holiday is read out from the weekday/holiday queuing maximum band data unit 159. 3) a bandwidth used by such a call under queuing state is read out from the use queuing band data unit 154. 4). A comparison is made between the maximum bandwidth read in the item 1) or 2) and a summation value of the bandwidth read in the item 3) (namely, total use bandwidth).

In such a case that as a comparison result obtained at a step 5504, it becomes "maximum bandwidth"≦"total use bandwidth" (namely, a route of "YES" at step 5505), the call originating/receiving operation of the terminal is restricted (step 5506).

In such a case that as a comparison result obtained at the step 5504, it becomes "maximum bandwidth">"total use bandwidth" (namely, a route of "NO" at step 5505), the call originating/receiving operation of the terminal is allowed (step 5507).

EMBODIMENT 16

(ARRANGEMENT OF SIXTEENTH EMBODIMENT)

Figure 56:
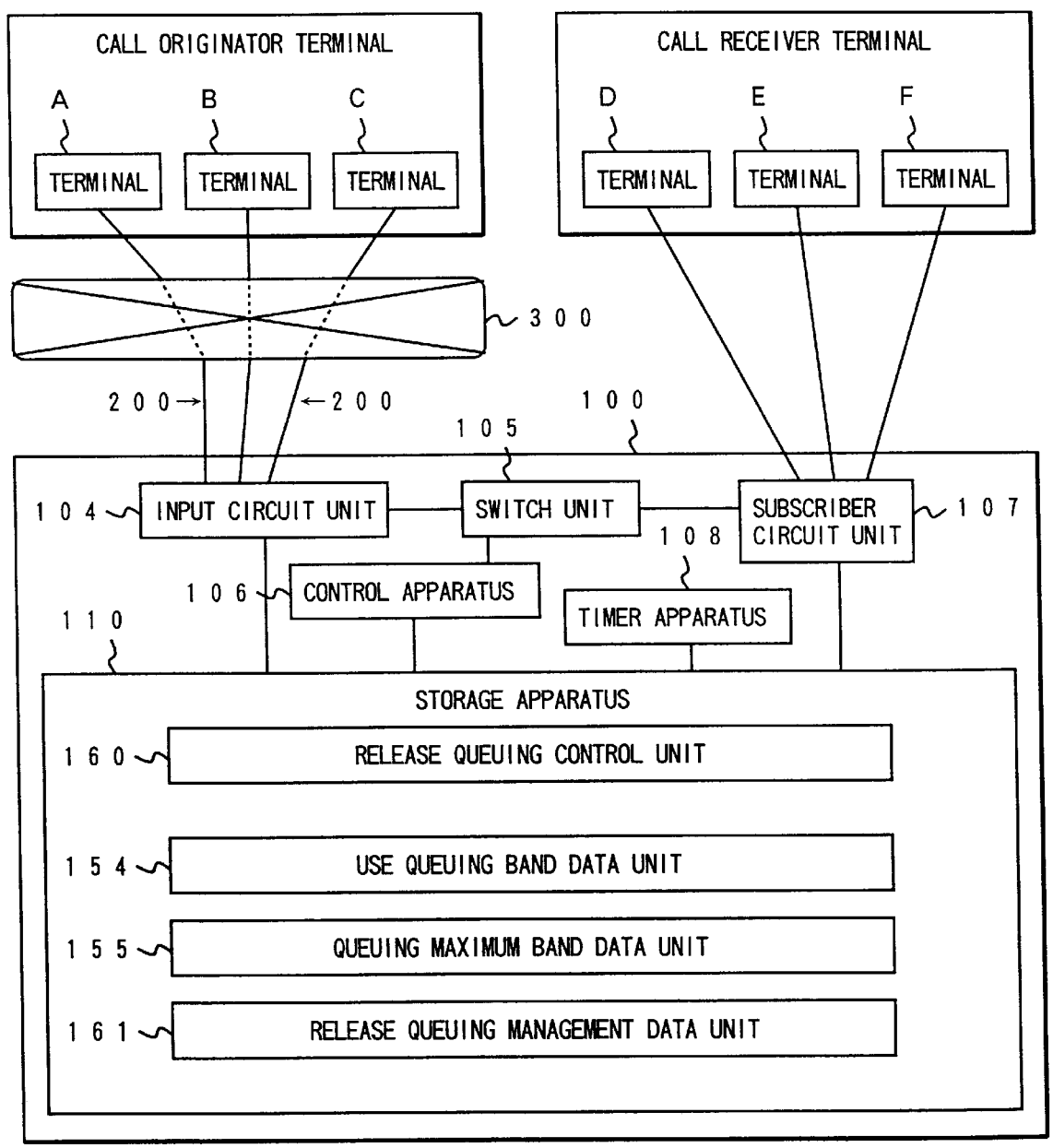
FIG. 56 is a structural diagram of a sixteenth embodiment mode.

An ATM switching system according to a sixteenth embodiment is arranged by adding functions to that of the sixth embodiment. FIG. 56 is a diagram for showing an arrangement of the sixteenth embodiment. It should be noted that although the constructive elements of the sixth embodiment are partially omitted in this drawing, the functions thereof are provided. Also, the same reference numerals of FIG. 22 employed in the sixth embodiment are used to denote the same or similar constructive elements in this embodiment.

The ATM switching apparatus 100 stores therein a release queuing control unit 160, which is realized as a program, and furthermore stores therein a use queuing band data unit 154, a queuing maximum band data unit 155, and a release queuing management data unit 161.

The release queuing control unit 160 executes the below-mentioned process operations 1) to 5) when the queuing request is issued and then the queuing restriction caused by a shortage of a band occurs. 1). The terminal ID of the call originator terminal, the terminal ID of the representative call receiver terminal for the call receiving destination, and the use bandwidth are set to the release queuing management data unit 161, and further the call originator terminal is released. 2) Such a bandwidth used by the call under queuing condition is read out from the use queuing band data unit 154. 3) Such a value obtained by subtracting a summation value of the bandwidth read at the item 2) (total use bandwidth) from the maximum bandwidth set to the queuing maximum band data unit 155 is calculated as a remaining bandwidth. 4). The remaining bandwidth calculated at the item 3) is periodically compared with the use bandwidth set to the release queuing management data unit 161, so that a check is made as to whether or not an empty bandwidth is produced. 5). When it is detected such that the empty bandwidth is produced, the band is secured, and then the call originator terminal is called based upon the terminal ID to thereby be brought into the queuing state.

Figure 57:
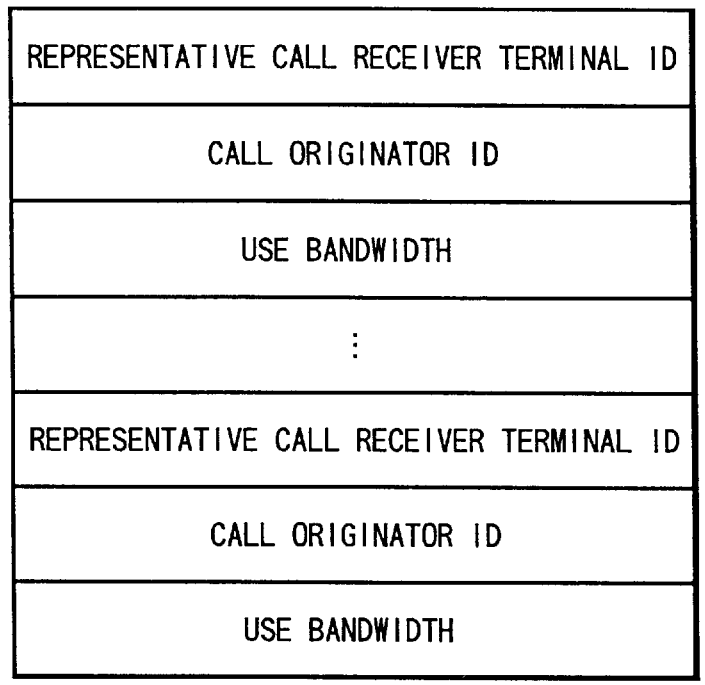
FIG. 57 is a data structural diagram for a release queuing management data unit of the sixteenth embodiment.

In this case, FIG. 57 shows a data structure of a release queuing management data unit 161. As indicated in this drawing, the representative call receiver terminal ID, the call originator terminal ID, and the use bandwidth are set in correspondence with the call originator terminal ID are set to the release queuing management data unit 161.

(OPERATIONS BY SIXTEENTH EMBODIMENT)

A description will now be made of operations performed in the sixteenth embodiment, and also overall operation.

Figure 58:
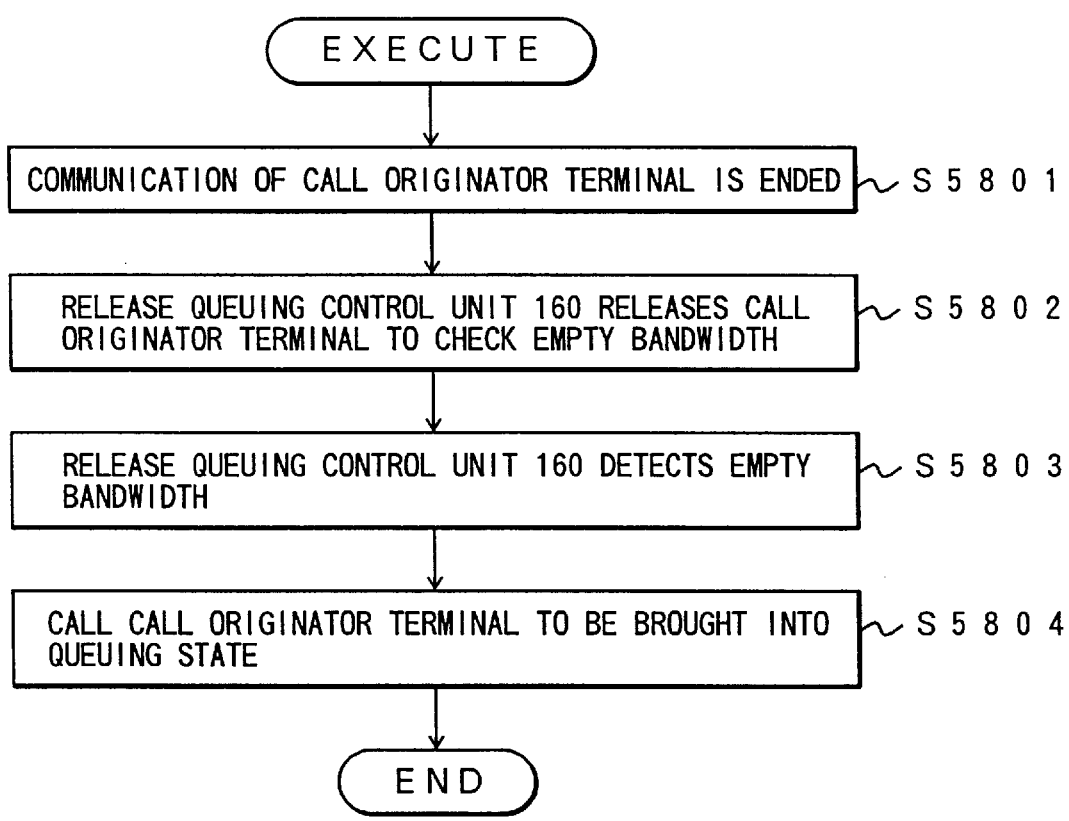
FIG. 58 is a flow chart for showing operations executed in the sixteenth embodiment.

FIG. 58 is a flow chart for representing operations executed in the sixteenth embodiment.

Now, it is first assumed that the queuing restrictions caused by a shortage of bands are produced (step 5801).

The release queuing control unit 160 executes the following process operations 1) to 4) at a step 5802.

1) The terminal ID of the call originator terminal, the terminal ID of the representative call receiver terminal for the call receiving destination, and the use bandwidth are set to the release queuing management data unit 161, and further the call originator terminal is released. 2) Such a bandwidth used by the call under queuing condition is read out from the use queuing band data unit 154. 3) Such a value obtained by subtracting a summation value of the bandwidth read at the item 2) (total use bandwidth) from the maximum bandwidth set to the queuing maximum band data unit 155 is calculated as a remaining bandwidth. 4). The remaining bandwidth calculated at the item 3) is periodically compared with the use bandwidth set to the release queuing management data unit 161, so that a check is made as to whether or not an empty bandwidth is produced.

In this case, it is assumed that a detection is made such that an empty bandwidth is produced (step 5803).

As a consequence, the release queuing control unit 160 secures the band, and calls the call originator terminal based on the terminal ID to be brought into the queuing state (step 5804).

Next, the overall operation will be explained.

Figure 59:
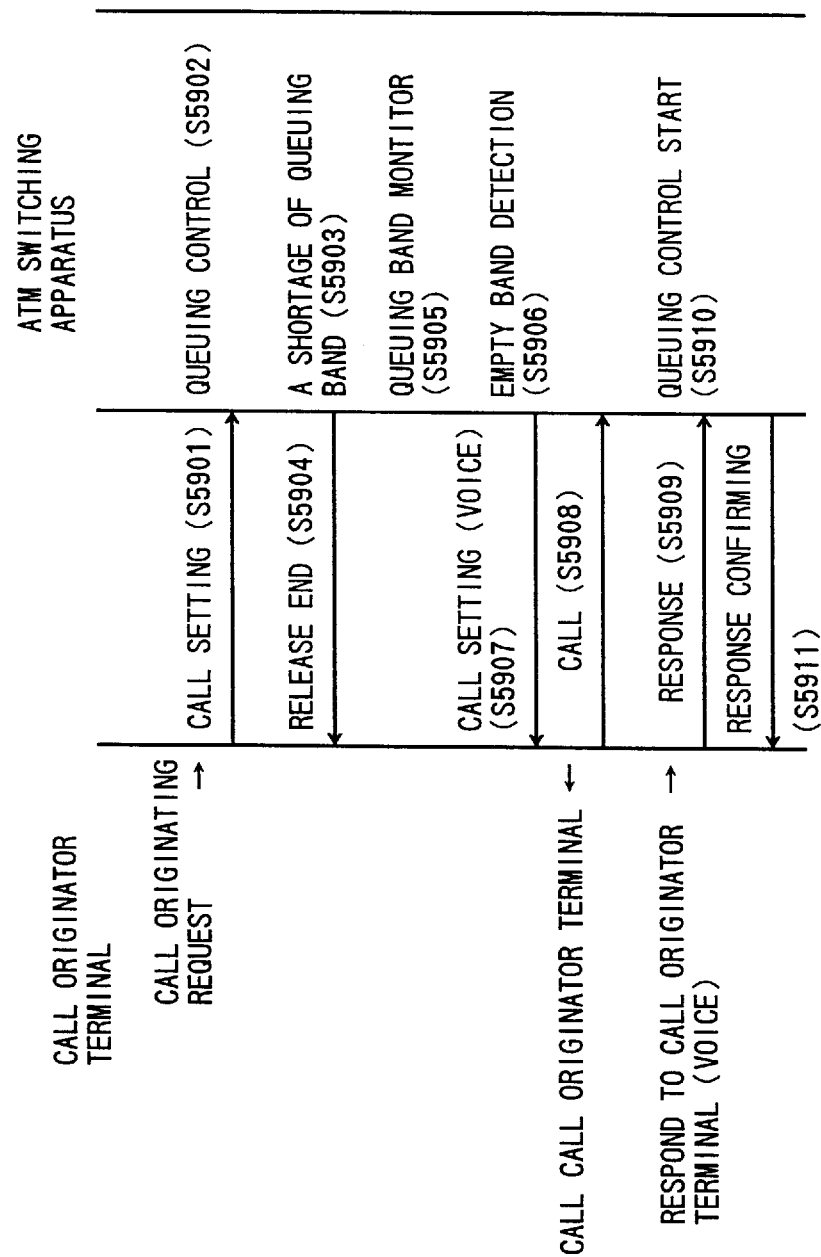
FIG. 59 is a sequence diagram of the sixteenth embodiment mode.

FIG. 59 is a sequence diagram for showing the overall operation.

First, the call originator terminal transmits a "call setting" message related to voice to the ATM switching apparatus 100 in order to commence the call setting operation (step 5901).

When the "call setting" message is transmitted from the call originating terminal, the ATM switching apparatus 100 performs the queuing control if all of the call receiver terminals are under use (step 5902). In this case, if the present condition is a shortage of the queuing band (step 5903), the ATM switching apparatus 100 transmits a "release completion" message for indicating that no call setting operation can be accepted to the call originating terminal (step 5904). Furthermore, the ATM switching apparatus 100 monitors the queuing band (step 5905), and transmits the "call setting" message related to the voice to the call originator terminal (step 5901) when the empty band is detected (step 5906).

When the "call setting" message is transmitted from the ATM switching apparatus 100, the call originator terminal transmits such a "calling" message for indicating that the calling operation is commenced to the ATM switching apparatus 100 (step 5908). The call originator terminal transmits such a "response" (message) for indicating that the call is accepted to the ATM switching apparatus 100 (step 5909).

When the "response" message is transmitted from the call originator terminal, the ATM switching apparatus 100 commences the queuing control (step 5910), and transmits a "response confirming" message for indicating that the "response" message is accepted to the call originator terminal (step 5911).

EMBODIMENT 17
(ARRANGEMENT OF SEVENTEENTH EMBODIMENT)

Figure 60:
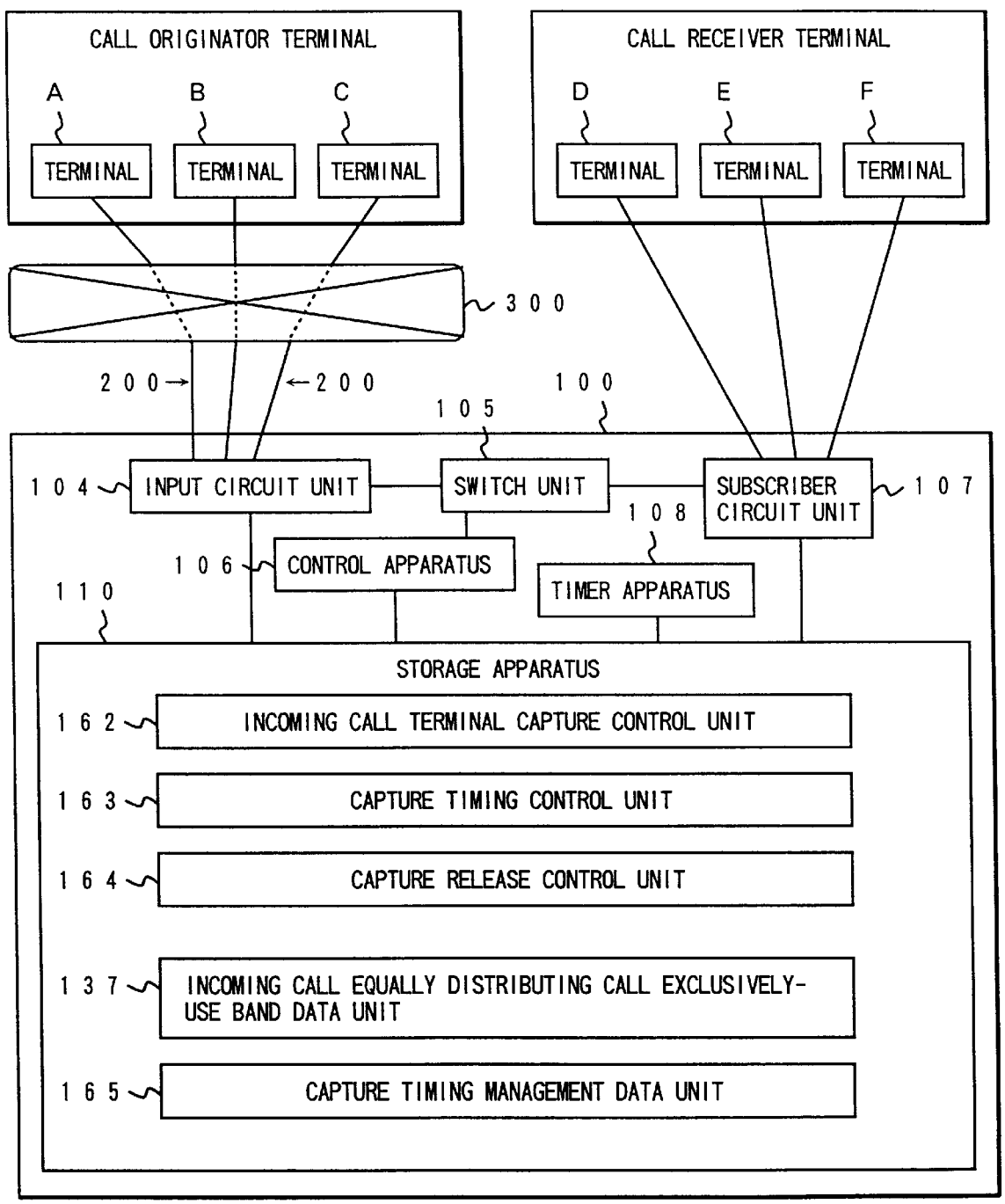
FIG. 60 is a structural diagram of a seventeenth embodiment mode.

An ATM switching system according to a seventeenth embodiment is arranged by adding functions to that of the sixth embodiment. FIG. 60 is a diagram for showing an arrangement of the seventeenth embodiment. It should be noted that although the constructive elements of the sixth embodiment are partially omitted in this drawing, the functions thereof are provided. Also, the same reference numerals of FIG. 22 employed in the sixth embodiment are used to denote the same or similar constructive elements in this embodiment.

The ATM switching apparatus 100 stores therein an incoming call terminal capture control unit 162, a capture timing control unit 163, and a capture release control unit 164, which are realized as a program, and further stores therein an incoming call equally distributing call exclusively-used band data unit 137, and a capture timing management data unit 165, which are realized as data.

The incoming call terminal capture control unit 162 erases an exclusive used bandwidth corresponding to such a call receiver terminal which is set to the incoming call equally distributing call exclusively-used band data unit 137 when the communication by the call receiver terminal is accomplished. As a consequence, the call receiving operation to this call receiver terminal is restricted.

The capture timing control unit 163 sets a timing value corresponding to the call receiver terminal to the capture timing management data unit 165 when the communication by this call receiver terminal is accomplished, and then periodically reduces this timing value. FIG. 61 indicates a data structure of the capture timing management data unit 165. As indicated in this drawing, the capture timing value is set to the capture timing management data unit 165. The information set therein is retrieved by using the terminal number as the index.

In such a case that the capture timing value set to the capture timing management data unit 165 becomes "0", the capture release control unit 164 sets the exclusively used bandwidth to the incoming call equally distributing call exclusively-used band data unit 137, so that the band is released.

(OPERATIONS OF SEVENTEENTH EMBODIMENT)

An explanation of operations according to the seventeenth embodiment will now be made.

Figure 62:
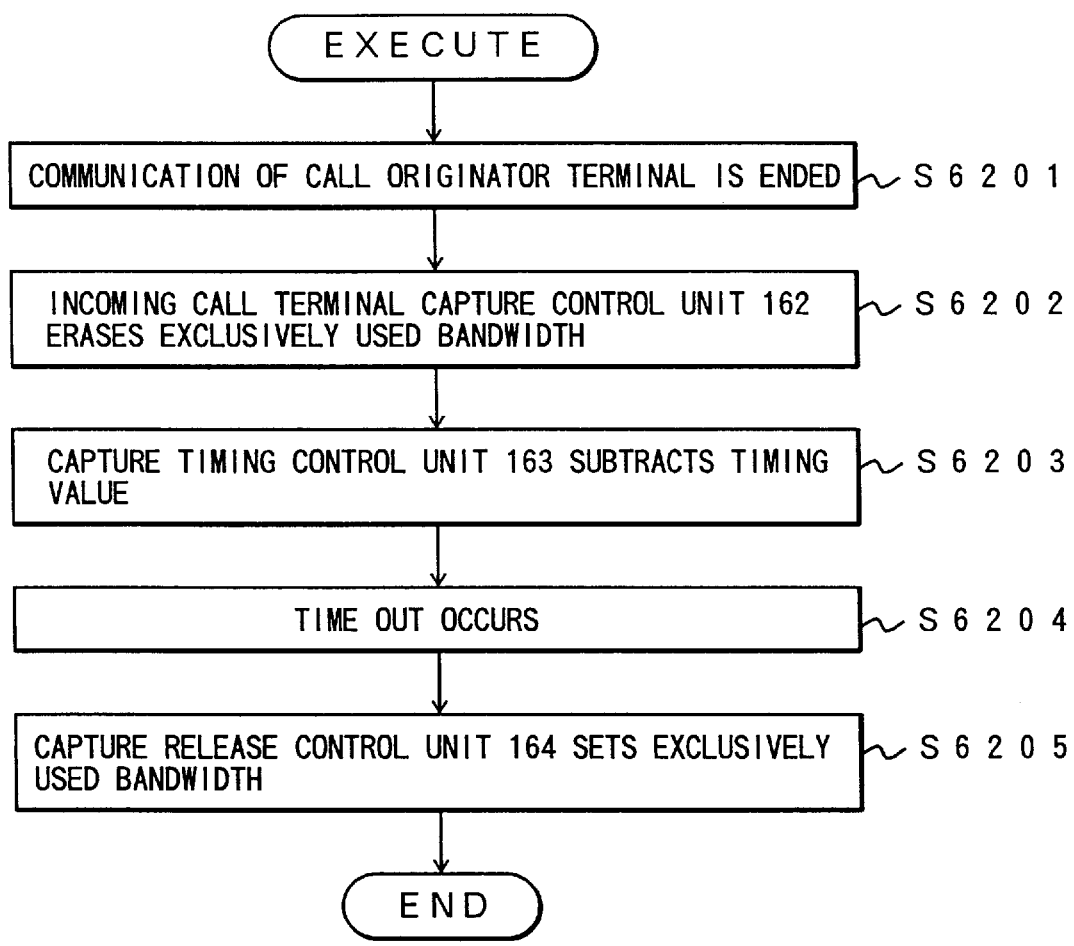
FIG. 62 is a flow chart for showing operations executed in the seventeenth embodiment.

FIG. 62 is a flow chart for indicating operations of the seventeenth embodiment.

First, it is now assumed that the communication by the call receiver terminal is ended (step 6201).

The incoming call terminal capture control unit 162 erases an exclusively used bandwidth corresponding to such a call receiver terminal which is set to the incoming call equally distributing call exclusively-used band data unit 137 (step 6202).

The capture timing control unit 163 sets a timing value corresponding to the call receiver terminal to the capture timing management data unit 165 when the communication by this call receiver terminal is accomplished, and then periodically reduces this timing value (step 6203).

In this case, it is now assumed that the timing value set to the capture timing management data unit 165 becomes "0", so that a time out will occur (step 6204).

Then, the capture release control unit 164 sets the exclusively used bandwidth to the incoming call equally distributing call exclusively-used band data unit 137 to thereby release the band (step 6205).

EMBODIMENT 18
(ARRANGEMENT OF EIGHTEENTH EMBODIMENT)

Figure 63:
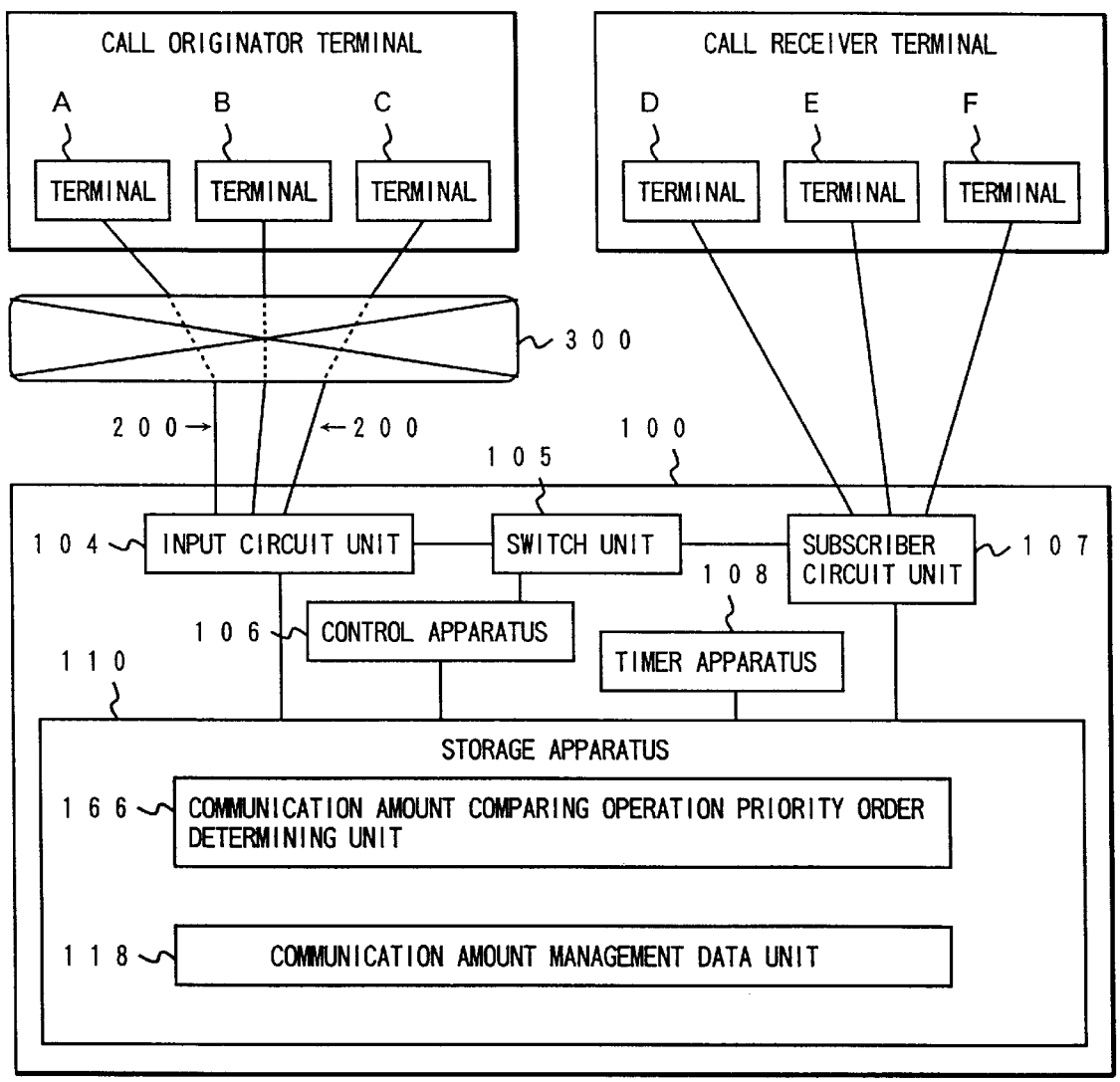
FIG. 63 is a structural diagram of an eighteenth embodiment mode.

An ATM switching system according to an eighteenth embodiment is arranged by adding functions to that of the sixth embodiment. FIG. 63 is a diagram for showing an arrangement of the eighteenth embodiment. It should be noted that although the constructive elements of the sixth embodiment are partially omitted in this drawing, the functions thereof are provided. Also, the same reference numerals of FIG. 22 employed in the sixth embodiment are used to denote the same or similar constructive elements in this embodiment.

The ATM switching apparatus 100 stores therein a communication amount comparing priority order determining unit 166 which is accomplished as a program, and also stores therein a communication amount management data unit 118 which is accomplished as data.

The communication amount comparing priority order determining unit 166 executes the below-mentioned process operations 1) to 2). 1). When the communication by the call originator terminal is accomplished, the communication amount corresponding to the call originator terminal ID is set to the communication amount management data unit 118. 2) When the call originating request is issued from such a call originator terminal having the call originator terminal ID set at the item 1), a comparison is made between the communication amount of this call originator terminal and the communication amount of another call originator terminal under queuing state, so that the queuing priority order is determined.

(OPERATIONS BY EIGHTEENTH EMBODIMENT)

Next, a description will now be made of operations executed in the eighteenth embodiment.

Figure 64:
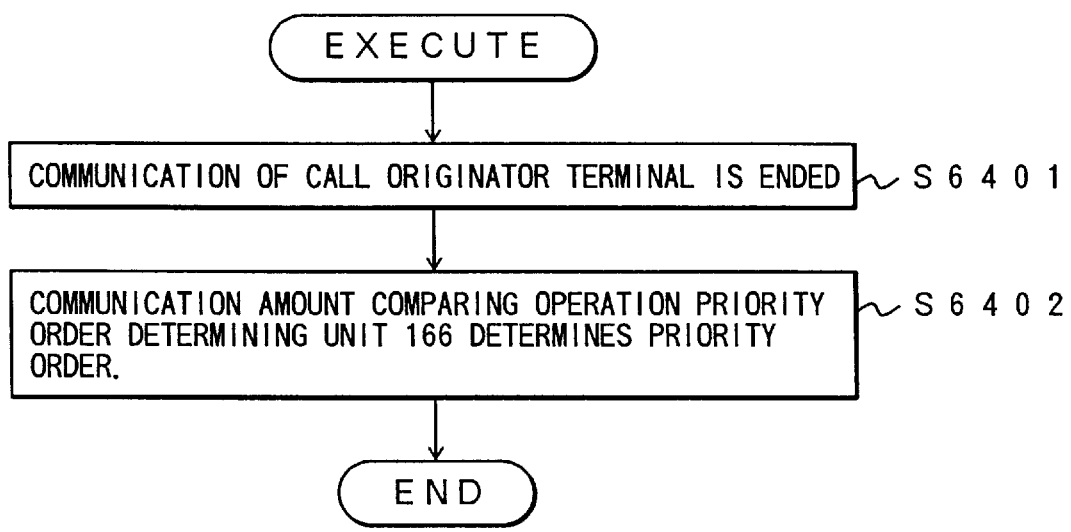
FIG. 64 is a flow chart for indicating operations executed in the eighteenth embodiment.

FIG. 64 is a flow chart for indicating operations executed in the eighteenth embodiment.

Now, it is firstly assumed that the communication by the call originator terminal is ended (step 6401).

Then the communication amount comparing priority order determining unit 166 executes the below-mentioned process operations 1) to 2) at a step 6402. 1). When the communication by the call originator terminal is accomplished, the communication amount corresponding to the call originator terminal ID is set to the communication amount management data unit 118. 2) When the call originating request is issued from such a call originator terminal having the call originator terminal ID set at the item 1), a comparison is made between the communication amount of this call originator terminal and the communication amount of another call originator terminal under queuing state, so that the queuing priority order is determined.

EMBODIMENT 19
(ARRANGEMENT OF NINETEENTH EMBODIMENT)

Figure 65:
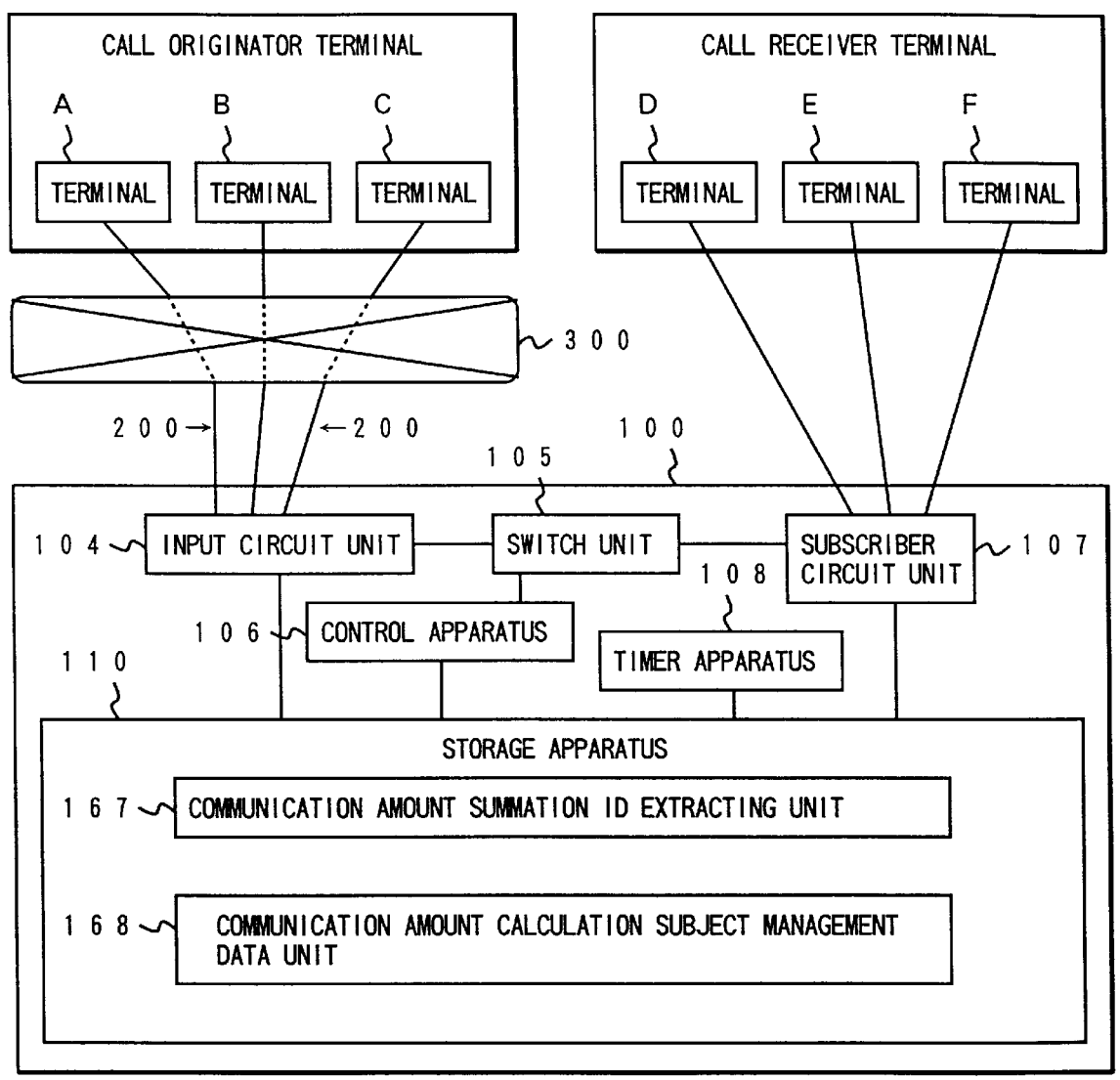
FIG. 65 is a structural diagram of a nineteenth embodiment mode.

An ATM switching system according to a nineteenth embodiment is arranged by adding functions to that of the first embodiment. FIG. 65 is a diagram for showing an arrangement of the nineteenth embodiment. It should be noted that although the constructive elements of the first embodiment are partially omitted in this drawing, the functions thereof are provided. Also, the same reference numerals of FIG. 3 employed in the first embodiment are used to denote the same or similar constructive elements in this embodiment.

The ATM switching apparatus 100 stores therein a communication amount summation ID extracting unit 167 which is realized as a program, and also stores therein a communication amount calculation subject management data unit 168 which is realized as data.

Figure 66:
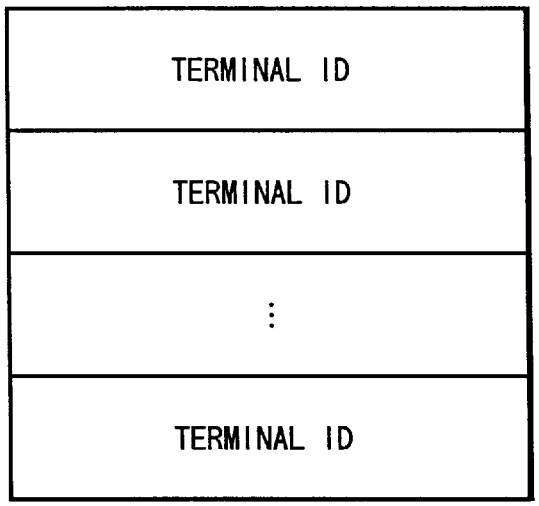
FIG. 66 is a data structural diagram for a communication amount calculation subject management data unit of the nineteenth embodiment.

The communication amount summation ID extracting unit 167 compares a terminal ID set to the communication amount calculation subject management data unit 168 with such a call originator terminal ID whose communication amount is calculated. When these terminal IDs are not coincident with each other, this communication summation ID extracting unit 167 controls the communication amount accumulating unit 115 in such a manner that the communication amounts are not accumulated. FIG. 66 indicates a data structure of the communication amount calculation subject management data unit 168. As indicated in this drawing, the terminal ID is set to the communication amount calculation subject management data unit 168.

(OPERATIONS BY NINETEENTH EMBODIMENT)

Thereafter, operations executed in the nineteenth embodiment will now be explained.

Figure 67:
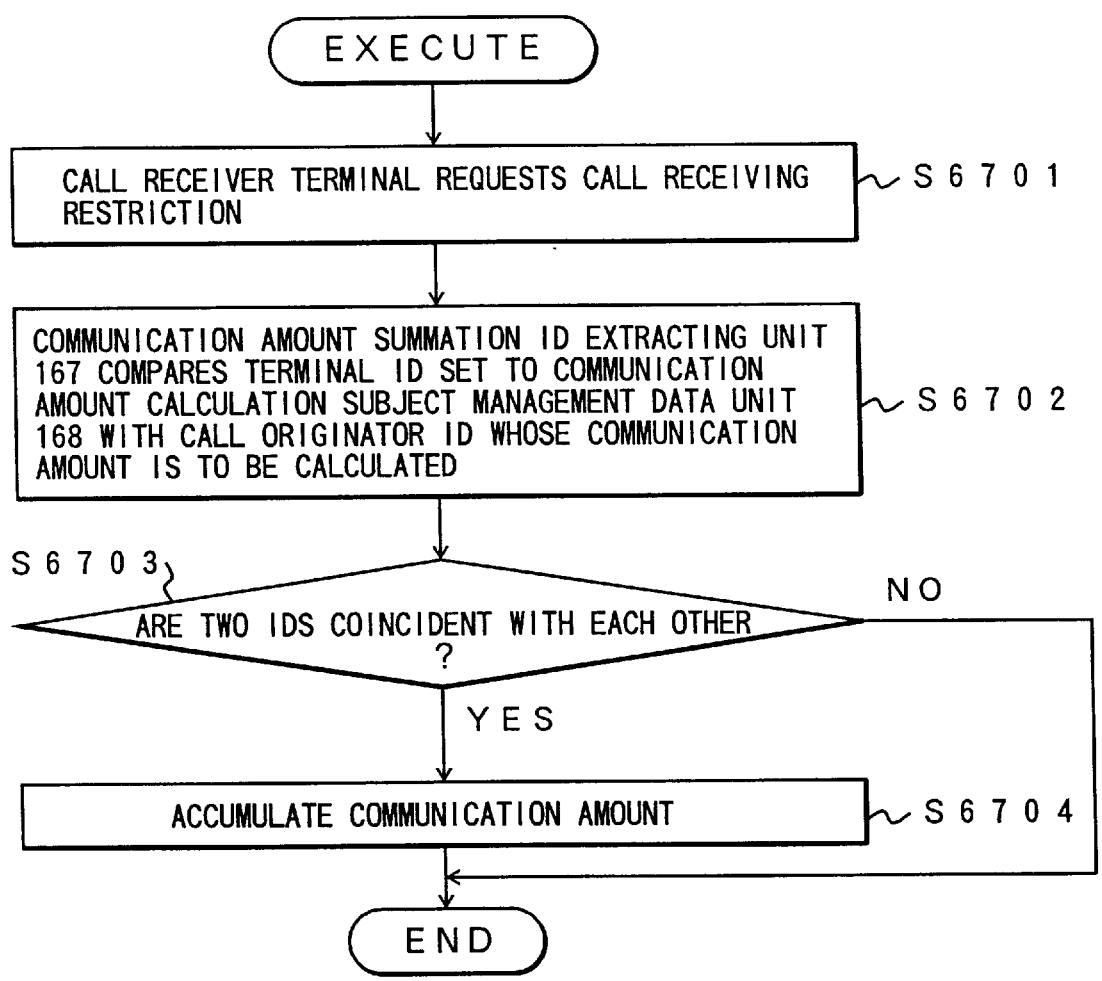
FIG. 67 is a flow chart for showing operations executed in the nineteenth embodiment.

FIG. 67 is a flow chart for representing operations performed in the nineteenth embodiment.

First, a request to accumulate the communication amount is issued to the communication amount accumulation unit 115 (step 6701).

Accordingly, the communication amount summation ID extracting unit 167 compares the terminal ID set to the communication amount calculation subject management data unit 168 with the call originator terminal ID whose communication amount is calculated (step 6702).

When the terminal IDs are coincident with each other (namely, a route of "YES" at step 6703) at the step 6702, the communication amount is accumulated in the communication amount accumulating unit 115 (step 6704).

To the contrary, when the terminal IDs are not coincident with each other (namely, a route of "NO" at step 6703) at the step 6702, the communication amount is not accumulated in the communication amount accumulating unit 115.

EMBODIMENT 20
(ARRANGEMENT OF TWENTIETH EMBODIMENT)

Figure 68:
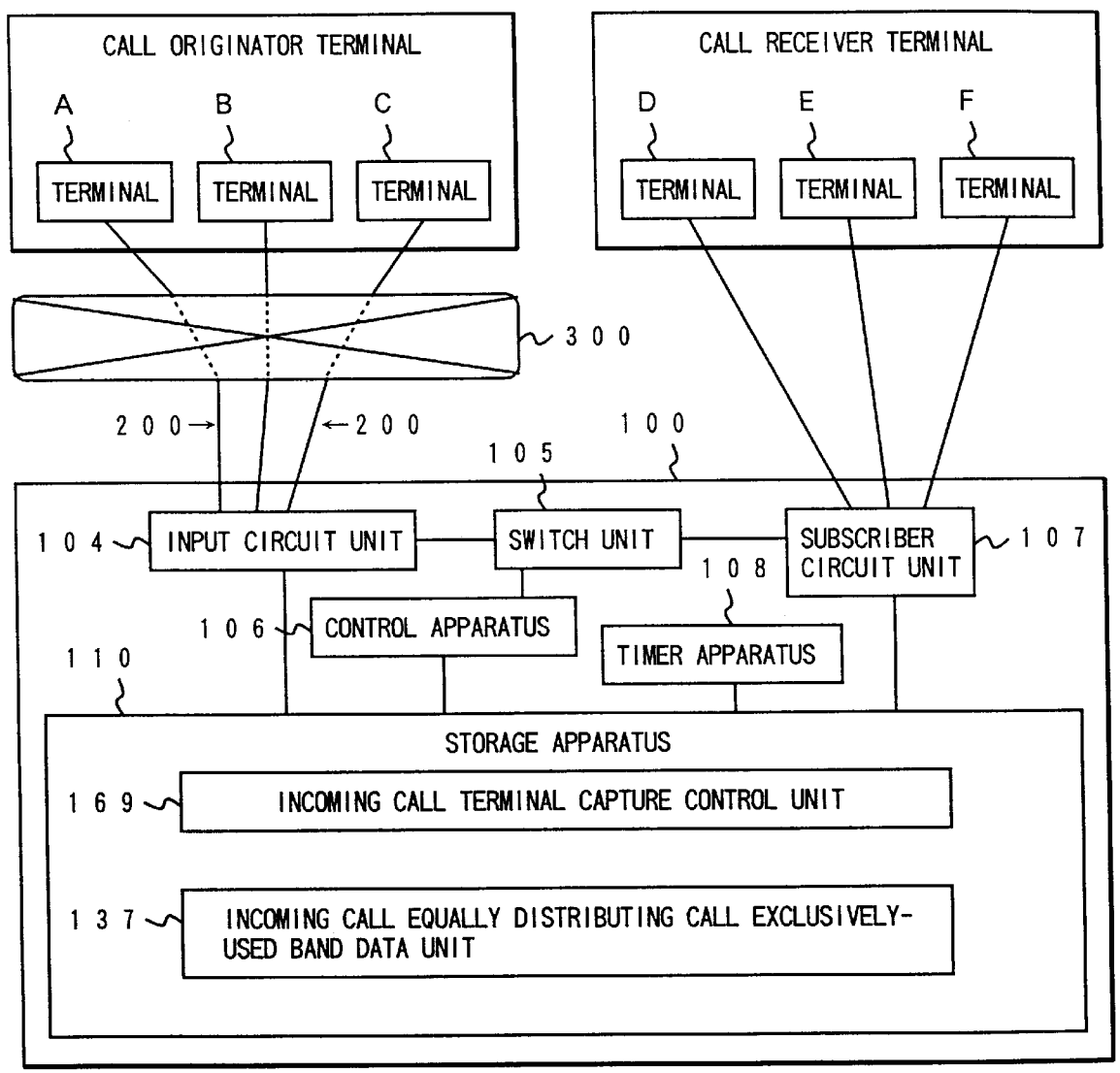
FIG. 68 is a structural diagram of a twentieth embodiment mode.

An ATM switching system according to a twentieth embodiment is arranged by adding functions to that of the first embodiment. FIG. 68 is a diagram for showing an arrangement of the sixth embodiment. It should be noted that although the constructive elements of the sixth embodiment are partially omitted in this drawing, the functions thereof are provided. Also, the same reference numerals of FIG. 22 employed in the first embodiment are used to denote the same or similar constructive elements in this embodiment.

The ATM switching apparatus 100 stores therein an incoming call terminal capture control unit 169 which is realized as a program, and further stores therein an incoming call equally distributing call exclusively-used band data unit 117 which is realized as data.

The incoming call terminal capture control unit 169 erases an exclusively used bandwidth corresponding to the call receiver terminal ID set to the incoming call equally distributing call exclusively-used band data unit 117 when the incoming call restriction request is issued from the call receiver terminal. As a result, the call receiving operation to the call receiver terminal is restricted.

(OPERATIONS BY TWENTIETH EMBODIMENT)

Next, a description will be made of operations executed in the twentieth embodiment.

Figure 69:
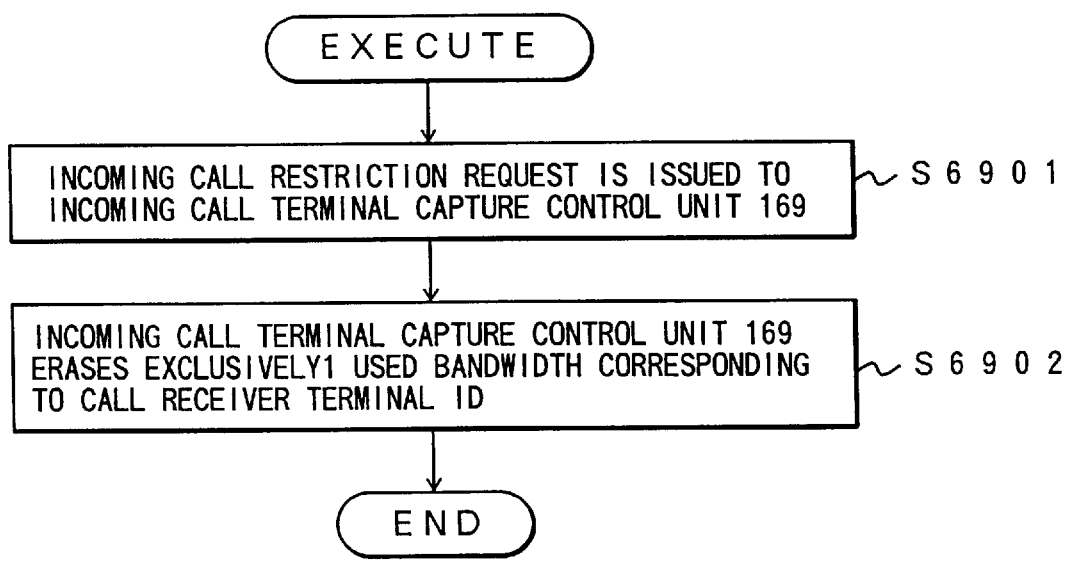
FIG. 69 is a flow chart for indicating operations executed in the twentieth embodiment.

FIG. 69 is a flow chart for representing operations performed in the twentieth embodiment.

First, the call receiver terminal requests the incoming call restriction (step 6901).

As a consequence, the incoming call terminal capture control unit 169 erases an exclusively used bandwidth corresponding to the call receiver terminal ID set to the incoming call equally distributing call exclusively-used band data unit 117(step 6902).

In accordance with the first to seventeenth ATM switching apparatuses, since the terminal whose accumulated communication amount is the lowest one is selected as the terminal for call receiving destination, the calls can be more equally distributed than those in the conventional ATM switching apparatus.

More specifically, in accordance with the fourth, fifth, tenth to twelfth, and thirteenth ATM switching apparatuses, only the voice line band is secured to the first terminal under queuing state. When any one of the second terminals can be operated for the communication, the video line band is secured to the first terminal under queuing condition. As a consequence, such a waste line band under queuing state is released, so that the call loss rate can be lowered.

Also, in accordance with the sixth to ninth ATM switching apparatuses, the call originating/receiving operations are restricted with respect to the first terminal, the second terminal, and the third terminal based upon the comparison result between the bandwidth exclusively secured to the terminal group and the summation value of the bandwidth used in the third terminal. Accordingly, the waste line band is released, and thus the call loss rate can be reduced.

Furthermore, in accordance with the thirteenth ATM switching apparatus, since no incoming call reception is performed for preselected time with respect to the second terminal selected as the call receiving destination, the call loss rate can be lowered.

What is claimed is:

1. An ATM switching system comprising:
    transmission path storing means for storing therein a transmission path to which a first terminal is connected;
    means for storing therein identifications of a plurality of second terminals which constitute a group and the representative of which group is predetermined;
    communication time calculating means for calculating communication time by subtracting a communication start time between said first terminal and said second terminals from a communication end time between said first terminal and a second terminal;

communication amount calculating means for calculating a communication amount by multiplying the communication time calculated in said communication time calculating unit by a use bandwidth; and communication amount accumulating means for accumulating the communication amount calculated in said communication amount calculating means with respect to each of said second terminals, wherein such a second terminal the accumulated communication amount of which is the lowest among said second terminals is selected as a terminal for call receiving destination.

2. An ATM switch system comprising:

transmission path storing means for storing therein a transmission path to which a first terminal is connected;

means for storing therein identifications of a plurality of second terminals which constitute a group and the representative of which group is predetermined;

communication time calculating means for calculating communication time by subtracting a communication start time between said first terminal and said second terminals from a communication end time between said first terminal and a second terminal;

communication amount calculating means for calculating a communication amount by multiplying the communication time calculated in said communication time calculating unit by a use bandwidth; and communication amount accumulating means for accumulating the communication amount calculated in said communication amount calculating means with respect to each of said second terminals wherein such a second terminal the accumulated communication amount of which is the lowest among said second terminals is selected as a terminal for call receiving destination, and wherein said ATM switching system further comprises a holding time managing means for managing such holding time during which said first terminal holds the communication, and said communication time calculating means subtracts the holding time, which is managed in said holding time managing means, from the calculated communication time to thereby obtain time as new communication time.

3. An ATM switching system comprising:

transmission path storing means for storing therein a transmission path to which a first terminal is connected;

means for storing therein identification of a plurality of second terminals which constitute a group and the representative of which group is predetermined;

communication amount calculating means for calculating a communication amount based upon a counted value of a quantity of an ATM cell transmitted from said first terminal to said second terminals; and communication amount accumulating means for accumulating the communication amount calculated in said communication amount calculating means with respect to each of said second terminals, wherein such a second terminal the accumulated communication amount of which is the lowest among said second terminals is selected as a terminal for call receiving destination.

4. An ATM switching system comprising:

transmission path storing means for storing therein a transmission path to which a first terminal is connected;

means for storing therein identifications of a plurality of second terminals which constitute a group and the representative of which group is predetermined;

communication time calculating means for calculating communication time by subtracting a communication start time between said first terminal and said second terminals from a communication end time between said first terminal and a second terminal;

communication amount calculating means for calculating a communication amount by multiplying the communication time calculated in said communication time calculating unit by a use bandwidth; and communication amount accumulating means for accumulating the communication amount calculated in said communication amount calculating means with respect to each of said second terminals, wherein such a second terminal the accumulated communication amount of which is the lowest among said second terminals is selected as a terminal for call receiving destination, and wherein in the case that all of said second terminals are operating under communication, said first terminal is brought into a queueing state, and only a voice line band is secured for said first terminal under queueing state, and in the case that any one of said second terminals is operable for communication, a video line band is secured for said first terminal under queueing state.

5. An ATM switching system as claimed in claim 4, wherein in such a case that the summation value of the bandwidth secured to said first terminal under queueing state is larger than, or equal to a predetermined value, the call originating operation from said first terminal is cut off.

6. An ATM switching system as claimed in claim 5, wherein said predetermined value is variably attached to the first terminal in unit of day or time.

7. An ATM switching system as claimed in claim 4, wherein in such a case that the summation value of the bandwidth secured to said first terminal under queueing state is larger than, or equal to a predetermined value, the call originating operation from said first terminal is once cut off, whereas when said summation value is equal to or less than a constant value, said first terminal the call originating operation of which has been cut off is called so as to be brought into the queueing state.

8. An ATM switching system as claimed in claim 4, wherein a sequential order to release the queueing state is determined based upon the communication amount for each of said first terminals with respect to said plurality of first terminals under queueing state.

9. An ATM switching system comprising:

transmission path storing means for storing therein a transmission path to which a first terminal is connected;

means for storing therein identifications of a plurality of second terminals which constitute a group and the representative of which group is predetermined;

communication amount calculating means for calculating a communication amount based upon a counted value of a quality of an ATM cell transmitted from said first terminal to said second terminals; and communication amount accumulating means for accumulating the communication amount calculated in said communication amount calculating means with respect to each of said second terminals wherein such a second terminal the accumulated communication amount of which is the lowest among said second terminals is selected as a terminal for call receiving destination, and wherein in the case that all of said second terminals are operating under communication, said first terminal is brought into a queueing state, and only a voice line band is secured for said first terminal under queueing state, and in the case that any one of said second terminals is operable for communication, a video line band is secured for said first terminal under queueing state.

10. An ATM switching system as claimed in claim 9, wherein in such a case that the summation value of the bandwidth secured to said first terminal under queueing state is larger than, or equal to a predetermined value, the call originating operation from said first terminal is once cut off, whereas when said summation value is equal to or less than a constant value, said first terminal the call originating operation of which has been cut off is called so as to be brought into the queueing state.

11. An ATM switching system as claimed in claim 9, wherein a sequential order to release the queueing state is determined based upon the communication amount for each of said first terminals with respect to said plurality of first terminals under queueing state.

12. An ATM switching system comprising:
transmission path storing means for storing therein a transmission path to which a first terminal is connected;
means for storing therein identifications of a plurality of second terminals which constitute a group and the representative of which group is predetermined;
communication time calculating means for calculating communication time by subtracting a communication start time between said first terminal and said second terminals from a communication end time between said first terminal and a second terminal;
communication amount calculating means for calculating a communication amount by multiplying the communication time calculated in said communication time calculated unit by a use bandwidth; and
communication amount accumulating means for accumulating the communication amount calculated in said communication amount calculating means with respect to each of said second terminals, wherein such a second terminal the accumulated communication amount of which is the lowest among said second terminals is selected as a terminal for call receiving destination, and
wherein said storing means stores therein identification of a third terminal which does not belong to the group constituted by said second terminals, in such a case that a summation value of bandwidths used in said third terminal is subtracted from the bandwidth exclusively used to the group constituted by said second terminals, and then a subtraction result is smaller than, or equal to a preselected value, the call originating/receiving operations are restricted with respect to said first terminal, said second terminals, and said third terminal.

13. An ATM switching system as claimed in claim 12, wherein the bandwidths exclusively secured to the group constituted by said second terminals are variably set in unit of day or time.

14. An ATM switching system as claimed in claim 12, wherein an urgent communication identifier for indicating that an urgent communication is available is attached to any of said first terminals, and the call originating/receiving operations are not restricted to said first terminal to which the urgent communication identifier is attached.

15. An ATM switching system as claimed in claim 14, wherein said urgent communication identifier is variably attached to the first terminal in unit of day or time.

16. An ATM switching system comprising:
transmission path storing means for storing therein a transmission path to which a first terminal is connected;
means for storing therein identifications of a plurality of second terminals which constitute a group and the representative of which group is predetermined;

communication time calculating means for calculating communication time by subtracting a communication start time between said first terminal and said second terminals from a communication end time between said first terminal and a second terminal;
communication amount calculating means for calculating a communication amount by multiplying the communication time calculated in said communication time calculating unit by a use bandwidth; and
communication amount accumulating means for accumulating the communication amount calculated in said communication amount calculating means with respect to each of said second terminals, wherein such a second terminal the accumulated communication amount of which is the lowest among said second terminals is selected as a terminal for call receiving destination, and
wherein no call receiving operation is carried out for a given time with respect to said second terminal which is selected as a call receiving destination.

17. An ATM switching system comprising:
transmission path storing means for storing therein a transmission path to which a first terminal is connected;
means for storing therein identifications of a plurality of second terminals which constitute a group and the representative of which group is predetermined;
communication time calculating means for calculating communication time by subtracting a communication start time between said first terminal and said second terminals from a communication end time between said first terminal and a second terminal;
communication amount calculating means for calculating a communication amount by multiplying the communication time calculated in said communication time calculating unit by a use bandwidth; and
communication amount accumulating means for accumulating the communication amount calculated in said communication amount calculating means with respect to each of said second terminals. wherein such a second terminal the accumulated communication amount of which is the lowest among said second terminals is selected as a terminal for call receiving destination, and
wherein said ATM switching system further comprises a communication amount clear means for clearing the communication amount accumulated in said communication amount accumulating means.

18. An ATM switching system comprising:
transmission path storing means for storing therein a transmission path to which a first terminal is connected;
means for storing therein identifications of a plurality of second terminals which constitute a group and the representative of which group is predetermined;
communication time calculating means for calculating communication time by subtracting a communication start time between said first terminal and said second terminals from a communication end time between said first terminal and a second terminal;
communication amount calculating means for calculating a communication amount by multiplying the communication time calculated in said communication time calculating unit by a use bandwidth; and
communication amount accumulating means for accumulating the communication amount calculated in said communication amount calculating means with respect to each of said second terminals, wherein such a second terminal the accumulated communication amount of which is the lowest among said second terminals is selected as a terminal for call receiving destination, and wherein exclusively used identifiers are attached to said first terminals, said communication amount calculating means manages such an identifier used to calculate the communication amount and also utilizes said identifier to thereby judge as to whether or not said first terminal operated under communication corresponds to such a terminal the communication amount of which is to be calculated; and when said communication amount calculating means judges that the first terminal operated under communication corresponds to such a terminal the communication amount of which is to be calculated, said communication amount calculating means calculates the communication amount.

19. An ATM switching system comprising:

transmission path storing means for storing therein a transmission path to which a first terminal is connected;

means for storing therein identifications of a plurality of second terminals which constitute a group and the representative of which group is predetermined;

communication time calculating means for calculating communication time by subtracting a communication start time between said first terminal and said second terminals from a communication end time between said first terminal and a second terminal;

communication amount calculating means for calculating a communication amount by multiplying the communication time calculated in said communication time calculating unit by a use bandwidth; and communication amount accumulating means for accumulating the communication amount calculated in said communication amount calculating means with respect to each of said second terminals, wherein such a second terminal the accumulated communication amount of which is the lowest among said second terminals is selected as a terminal for call receiving destination, and wherein said ATM switching system further comprises an incoming call terminal capture control unit for restricting the call reception to said second terminal which has requested the call receiving operation restriction when the call receiving operation restriction is issued from said second terminal.

* * * * *